United States Patent
Yun et al.

(10) Patent No.: US 11,431,109 B2
(45) Date of Patent: Aug. 30, 2022

(54) ANTENNA USING MULTI-FEEDING AND ELECTRONIC DEVICE INCLUDING SAME

(71) Applicant: Samsung Electronics Co., Ltd., Suwon-si (KR)

(72) Inventors: Sumin Yun, Suwon-si (KR); Sehyun Park, Suwon-si (KR); Myunghun Jeong, Suwon-si (KR); Jehun Jong, Suwon-si (KR); Jaehoon Jo, Suwon-si (KR); Jinwoo Jung, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/970,177

(22) PCT Filed: Feb. 14, 2019

(86) PCT No.: PCT/KR2019/001811
§ 371 (c)(1),
(2) Date: Aug. 14, 2020

(87) PCT Pub. No.: WO2019/160346
PCT Pub. Date: Aug. 22, 2019

(65) Prior Publication Data
US 2020/0412022 A1 Dec. 31, 2020

(30) Foreign Application Priority Data
Feb. 14, 2018 (KR) .................. 10-2018-0018594

(51) Int. Cl.
*H01Q 21/22* (2006.01)
*H01Q 9/26* (2006.01)
(Continued)

(52) U.S. Cl.
CPC .............. *H01Q 21/22* (2013.01); *H01Q 9/26* (2013.01); *H04B 1/0064* (2013.01); *H01Q 21/0025* (2013.01)

(58) Field of Classification Search
CPC .. H01Q 15/006; H01Q 1/243; H01Q 21/0025; H01Q 21/065; H01Q 21/08;
(Continued)

(56) References Cited

U.S. PATENT DOCUMENTS 6,147,648 A * 11/2000 Granholm ............ H01Q 21/065
343/700 MS
6,295,030 B1 * 9/2001 Kozakai ................ H01Q 1/243
343/700 MS
(Continued)

FOREIGN PATENT DOCUMENTS

EP 0 721 678 7/1996
EP 1 830 485 A1 9/2007
(Continued)

OTHER PUBLICATIONS

European Search Report dated Feb. 22, 2021, issued in European Application No. 19754999.1.
(Continued)

*Primary Examiner* — Tan H Trinh
(74) *Attorney, Agent, or Firm* — Jefferson IP Law, LLP

(57) ABSTRACT

According to various embodiments, an electronic device may comprise: a housing including a first plate, a second plate oriented in a direction opposite to the first plate, and a side member surrounding a space between the first plate and the second plate; and, as an antenna structure including at least one plane parallel to the second plate, wherein the antenna structure includes a first element disposed on the plane, a second element spaced apart from the first element on the plane when viewed from above the plane, and a third
(Continued)

element spaced apart from the second element on the plane when viewed from above the plane, the second element being disposed between the first element and the third element, a wireless communication circuit electrically configured to transmit and receive a signal having a frequency range of 10 GHz-100 GHz, wherein the wireless communication circuit includes a first electrical path connected to the first element, a second electrical path connected to a first point on the second element, the first point being closer to the first element than to the third element, a third electrical path connected to a second point on the second element, the second point being closer to the third element than to the first element, and a fourth electrical path connected to the third element, and the wireless communication circuit is configured to provide a phase difference between a first signal from the first point and a second signal from the second point. Various other embodiments may also be possible.

14 Claims, 45 Drawing Sheets

(51) Int. Cl.
*H04B 1/00* (2006.01)
*H01Q 21/00* (2006.01)

(58) Field of Classification Search
CPC .......... H01Q 21/22; H01Q 21/28; H01Q 3/34; H01Q 9/0435; H01Q 9/045; H01Q 9/0457; H01Q 9/26; H04B 1/0064
USPC ........... 455/557; 375/219; 343/700 MS, 702, 343/770
See application file for complete search history.

(56) References Cited

U.S. PATENT DOCUMENTS

| | | | |
|---|---|---|---|
| 2003/0050094 A1* | 3/2003 | Boyle | H01Q 1/245 455/557 |
| 2004/0051668 A1* | 3/2004 | Chang | H01Q 5/357 343/702 |
| 2006/0066497 A1* | 3/2006 | Fischer | H01Q 21/08 343/770 |
| 2006/0214853 A1 | 9/2006 | Hori | |
| 2008/0136734 A1 | 6/2008 | Manholm et al. | |
| 2010/0111143 A1* | 5/2010 | Nishikido | H01Q 21/06 375/219 |
| 2013/0099006 A1 | 4/2013 | Hong et al. | |
| 2014/0139399 A1 | 5/2014 | Miyake | |
| 2015/0155615 A1* | 6/2015 | Liu | H01Q 21/30 343/702 |
| 2016/0352013 A1* | 12/2016 | Fan | H01Q 1/243 |
| 2017/0077614 A1* | 3/2017 | Lin | H01Q 1/36 |
| 2017/0294717 A1* | 10/2017 | Zhang | H01Q 19/005 |
| 2017/0346164 A1* | 11/2017 | Kim | H01Q 1/48 |
| 2018/0248251 A1* | 8/2018 | Son | H01Q 5/328 |
| 2018/0269561 A1* | 9/2018 | Kim | H01Q 1/48 |
| 2018/0277929 A1* | 9/2018 | Seo | H01Q 5/20 |
| 2018/0277934 A1* | 9/2018 | Kim | H01Q 1/38 |
| 2018/0287431 A1* | 10/2018 | Liu | H02J 50/20 |
| 2018/0294548 A1* | 10/2018 | Kang | H01Q 1/243 |
| 2018/0299929 A1* | 10/2018 | Kim | G06F 1/1658 |
| 2018/0301792 A1* | 10/2018 | Park | H01Q 1/243 |
| 2018/0342793 A1* | 11/2018 | Lee | H01Q 13/106 |
| 2018/0359845 A1* | 12/2018 | Park | H01P 3/081 |
| 2018/0366812 A1* | 12/2018 | Kim | H01Q 5/378 |
| 2019/0013568 A1* | 1/2019 | Won | H01Q 7/00 |
| 2019/0027807 A1* | 1/2019 | Choi | H01Q 1/243 |
| 2019/0074576 A1* | 3/2019 | Bae | H01Q 13/10 |
| 2019/0165478 A1 | 5/2019 | Jo et al. | |
| 2019/0166686 A1 | 5/2019 | Jo et al. | |
| 2019/0246511 A1* | 8/2019 | Huang | H04M 1/0277 |

FOREIGN PATENT DOCUMENTS

| | | |
|---|---|---|
| EP | 2 946 441 | 11/2015 |
| JP | 2014-103532 A | 6/2014 |
| KR | 10-2005-0066342 A | 6/2005 |
| KR | 10-2013-0042909 A | 4/2013 |
| KR | 10-1803208 B1 | 11/2017 |
| KR | 10-1803208 B1 | 12/2017 |
| KR | 10-2019-0061936 A | 6/2019 |
| KR | 10-2019-0062022 A | 6/2019 |
| WO | 95/09455 A1 | 4/1995 |
| WO | 2005/064744 A1 | 7/2005 |
| WO | 2013/149347 A1 | 10/2013 |
| WO | 2014/113513 A2 | 7/2014 |
| WO | 2016/190907 A2 | 12/2016 |

OTHER PUBLICATIONS

Korean Office Action dated Mar. 17, 2022, issued in Korean Application No. 10-2018-0018594.

* cited by examiner

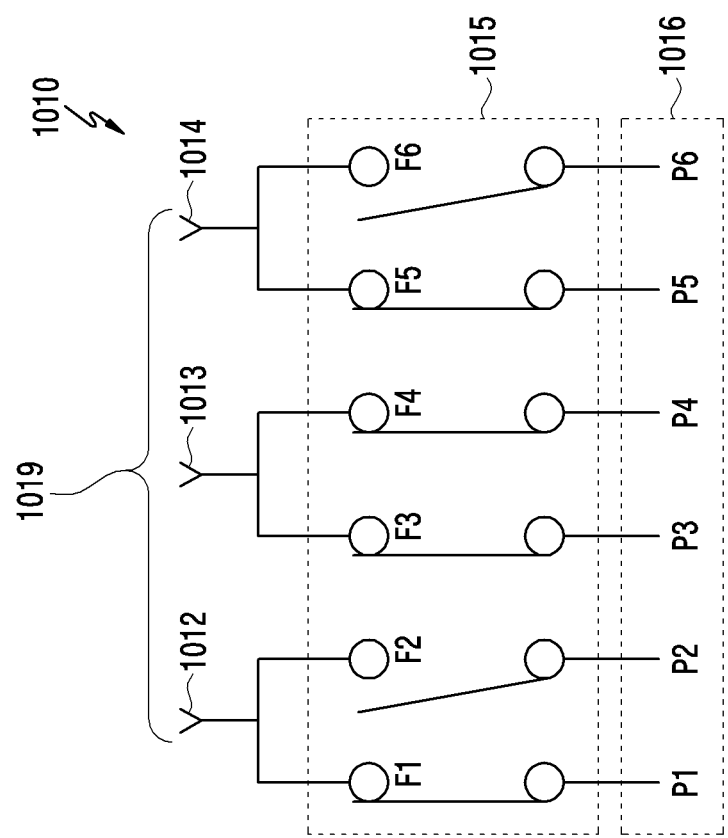

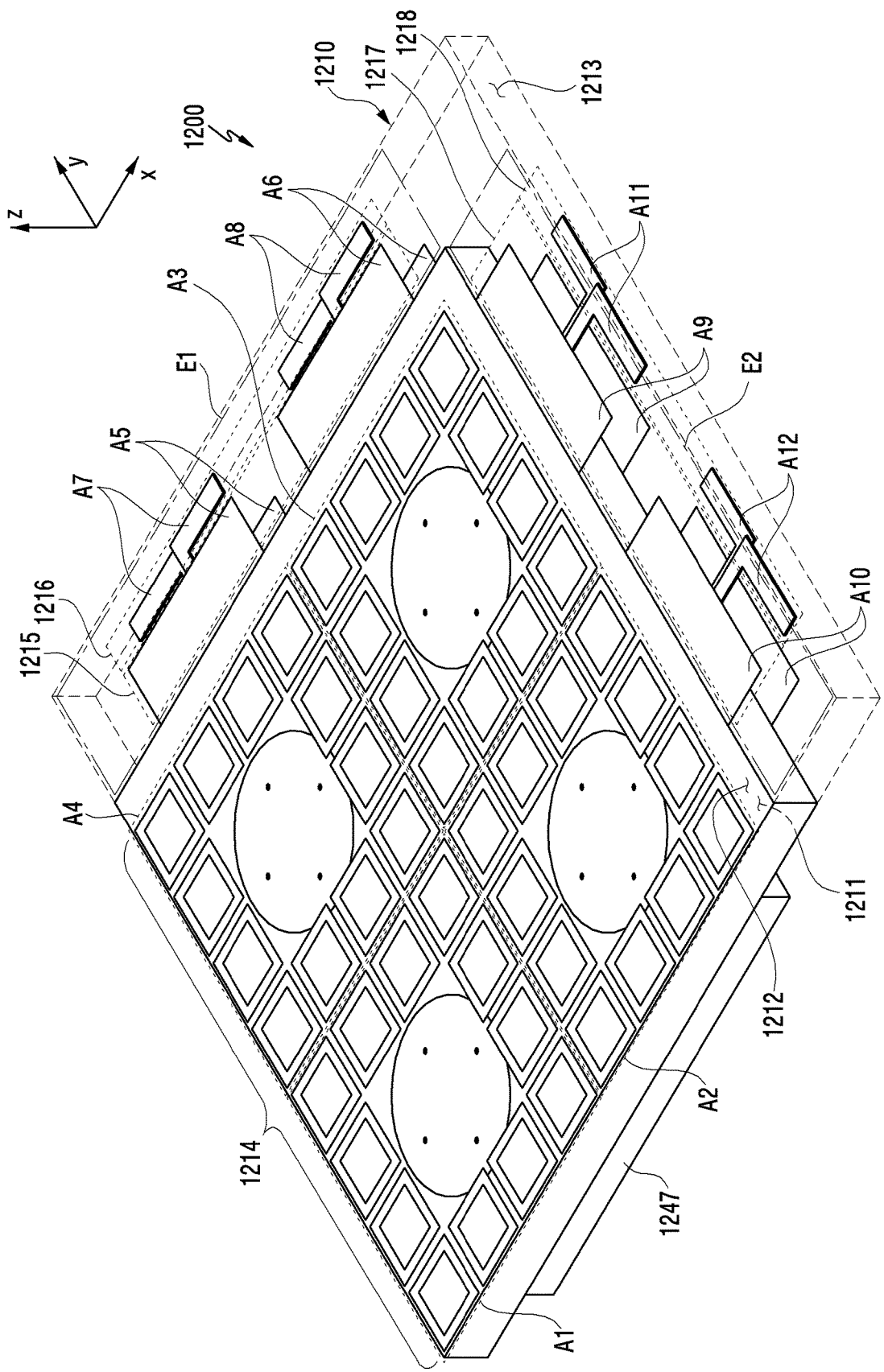

ANTENNA USING MULTI-FEEDING AND ELECTRONIC DEVICE INCLUDING SAME

TECHNICAL FIELD

Various embodiments of the disclosure relate to an antenna using multi-feeding and an electronic device including same.

BACKGROUND ART

Through the development of wireless communication technologies, electronic devices (e.g. an electronic device for communication) have been commonly used in everyday life, and accordingly, the use of contents has been grown exponentially. According to the rapid growth in use of contents, network capacity has reached a limit, and in response to a demand of low latency data communication, high speed wireless communication technologies such as wireless gigabit alliance (WIGIG) (e.g. 802.11AD) or a next generation wireless communication technology (e.g. 5G communication) has been developed.

DISCLOSURE OF INVENTION

Technical Problem

In the next generation wireless communication technology, millimeter waves having a frequency of 20 GHz or higher may be substantially used, and an array structure in which a plurality of antenna elements are arranged at predetermined intervals may be used so as to increase antenna gain and overcome high free space loss due to frequency characteristics. The larger the number of unit antenna elements, the greater the gain of the array antenna. However, the volume of the antenna increases, and thus mounting of the antenna in an electronic device may involve difficulties.

In order to reduce the volume of the antenna, the intervals between the antenna elements may be reduced to reduce the antenna electronic volume. However, in the method, since the intervals between the antenna elements are reduced, mutual interference is increased, and thus the entire gain of the antenna may be reduced. In addition, the antenna elements are mounted on several surfaces of a substrate so as to maintain the number of the antenna elements and reduce the size of the antenna. However, the antenna has different directivities, and thus the effects of an array antenna, caused by constructive interference, are hard to obtain.

Various embodiments of the disclosure may provide an antenna using multi-feeding and an electronic device including same.

Various embodiments of the disclosure may provide an antenna using multi-feeding and an electronic device including same, which can reduce a decline in antenna gain and reduce a space in which the antenna is mounted.

Solution to Problem

According to various embodiments, an electronic device may include: a housing including a first plate, a second plate oriented in a direction opposite to the first plate, and a side member surrounding a space between the first plate and the second plate; an antenna structure including at least one plane parallel to the second plate, wherein the antenna structure includes a first element disposed on the plane, a second element spaced apart from the first element on the plane when viewed from above the plane, and a third element spaced apart from the second element on the plane when viewed from above the plane, the second element being disposed between the first element and the third element; and a wireless communication circuit electrically configured to transmit and receive a signal having a frequency range of 10 GHz-100 GHz, wherein the wireless communication circuit includes a first electrical path connected to the first element, a second electrical path connected to a first point on the second element, the first point being closer to the first element than to the third element, a third electrical path connected to a second point on the second element, the second point being closer to the third element than to the first element, and a fourth electrical path connected to the third element, and wherein the wireless communication circuit is configured to provide a phase difference between a first signal from the first point and a second signal from the second point.

According to various embodiments, an electronic device may include: a housing including a first plate, a second plate oriented in a direction opposite to the first plate, and a side member surrounding a space between the first plate and the second plate; an antenna structure including at least one plane parallel to the first plate and including a first antenna element disposed on the plane; and a wireless communication circuit electrically configured to transmit and receive a signal having a frequency range of 10 GHz-100 GHz, wherein the wireless communication circuit includes electrical paths electrically connected to a plurality of points spaced apart from each other on the first antenna element, respectively, and wherein the wireless communication circuit provides at least one phase difference between at least two signals from the plurality of points.

Advantageous Effects of Invention

According to various embodiments of the disclosure, while the number of feeding ports is identically maintained, the number of antenna elements is reduced through multi-feeding. Therefore, gain degradation is minimized, and the entire volume of an antenna is reduced so that the volume of an electronic device can be reduced.

BRIEF DESCRIPTION OF DRAWINGS

FIGS. 10A to 10H are diagrams illustrating a communication device that is multi-fed with power by using a switching device according to various embodiments of the disclosure;

FIG. 12 is a perspective view of a communication device according to various embodiments of the disclosure;

BEST MODE FOR CARRYING OUT THE INVENTION

Figure 1:
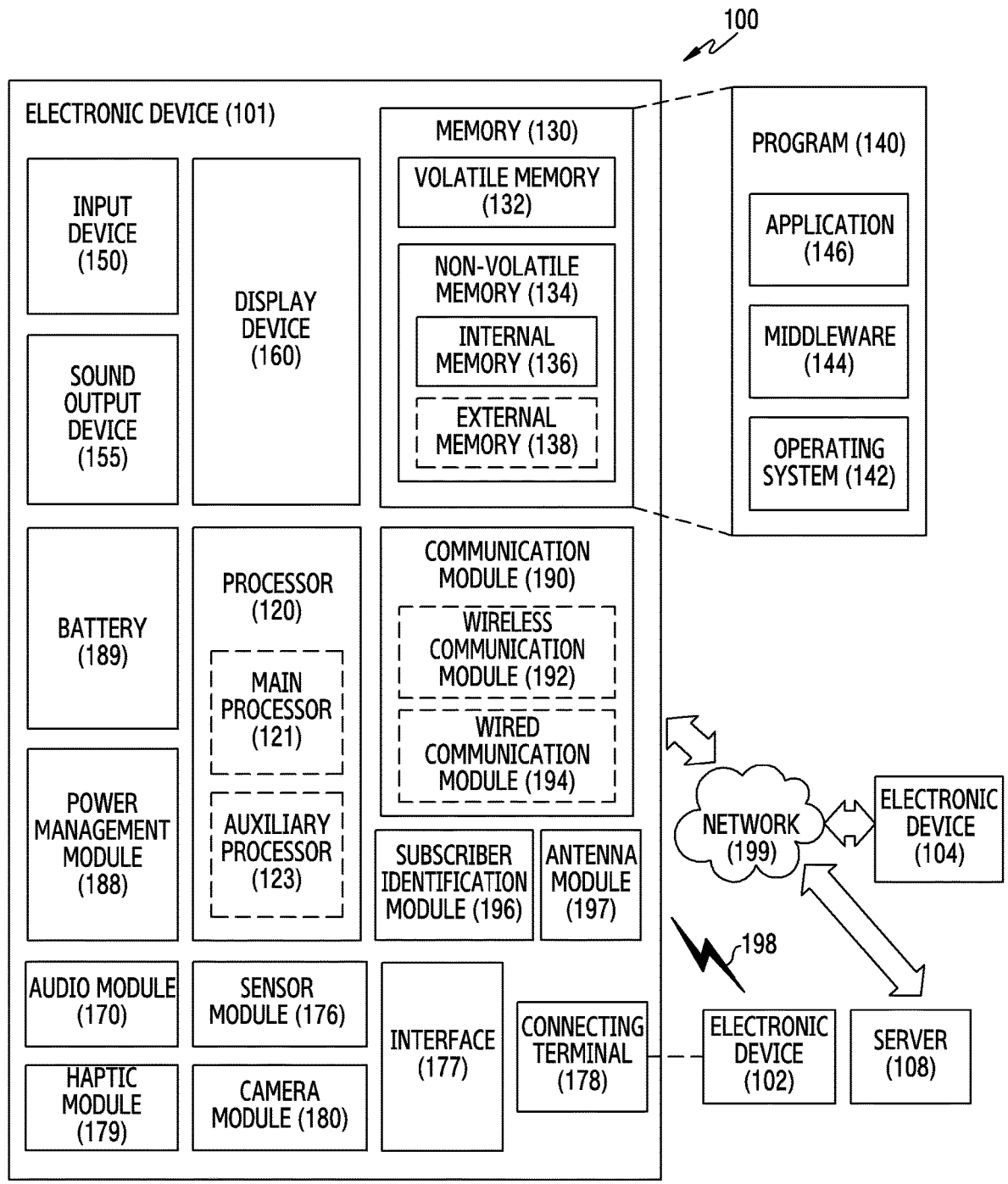
FIG. 1 is a block diagram of an electronic device in a network environment according to various embodiments of the disclosure.

FIG. 1 is a block diagram of an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
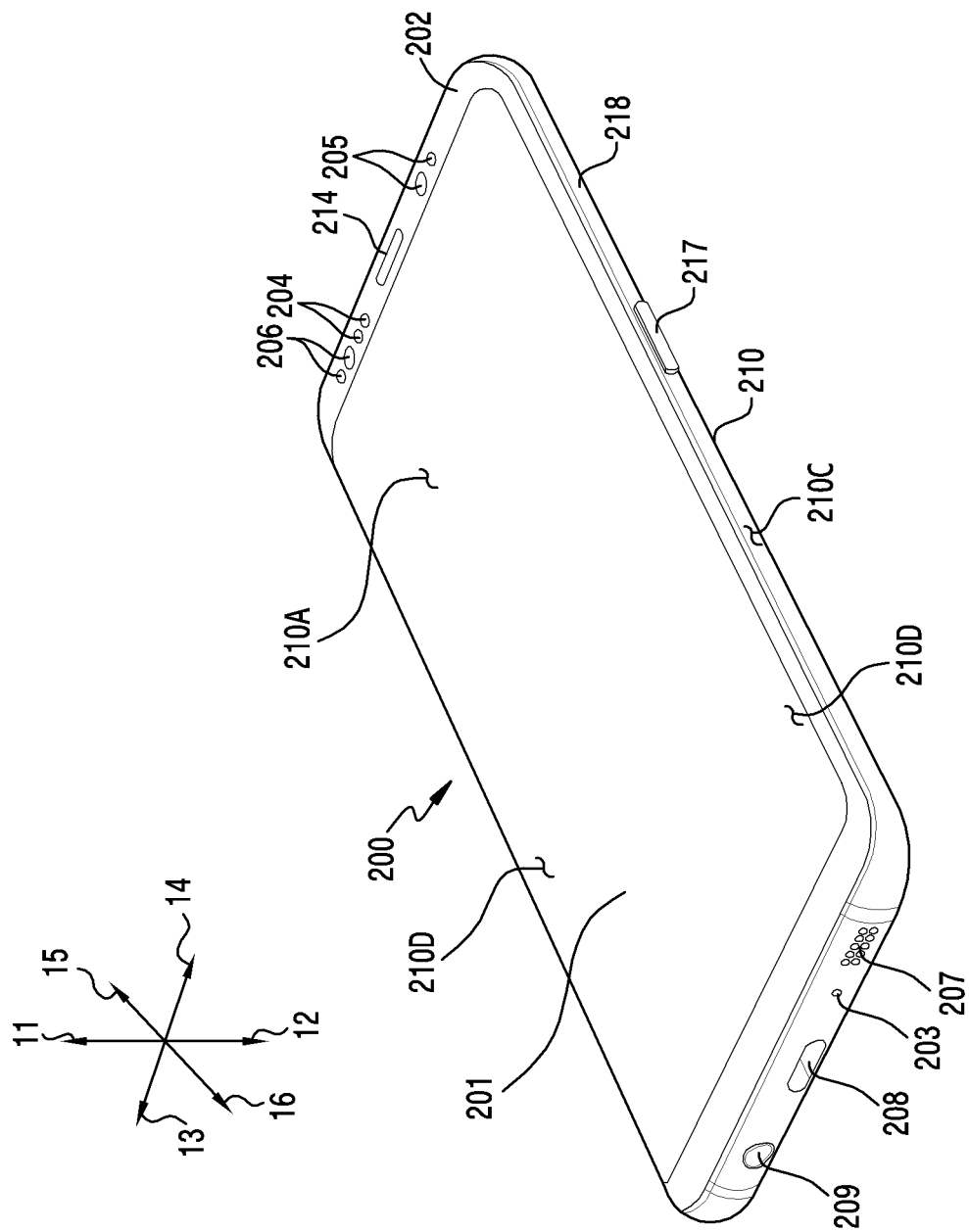
FIG. 2A is a perspective view of a mobile electronic device according to various embodiments of the disclosure.
Figure 2B:
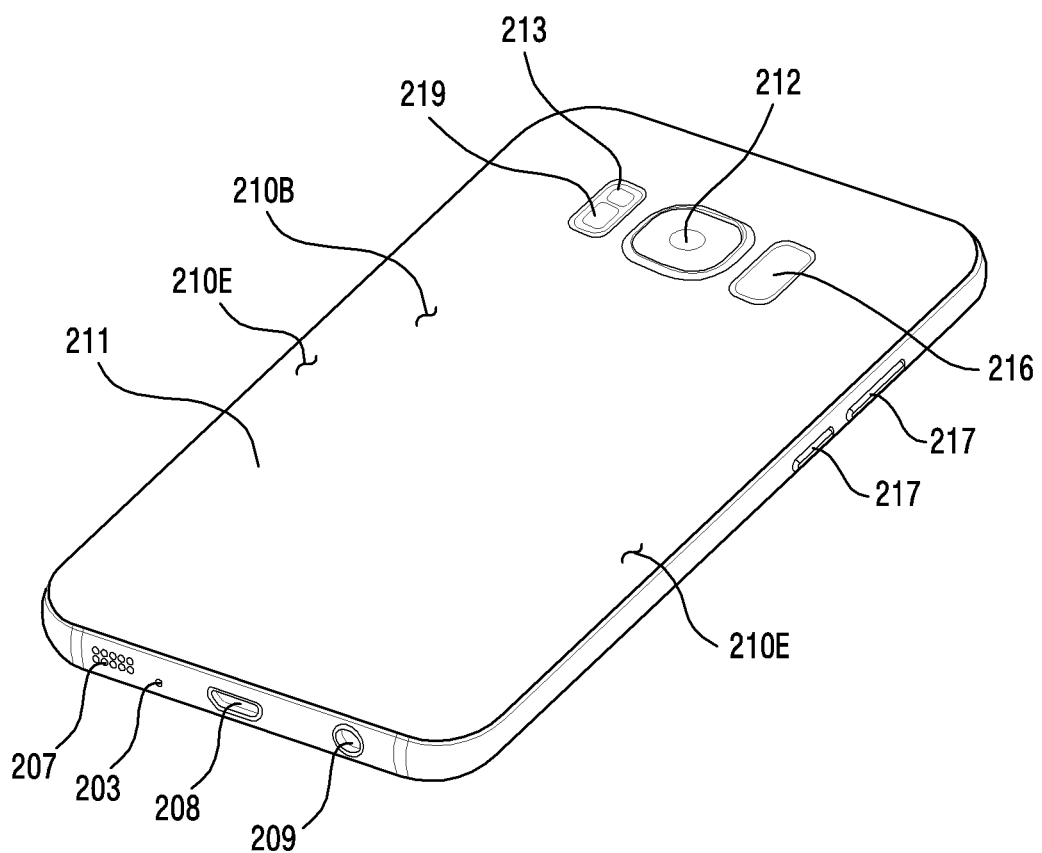
FIG. 2B is a rear perspective view of the electronic device illustrated in FIG. 2A according to various embodiments of the disclosure.

FIG. 2A is a perspective view of a front surface of a mobile electronic device 200 according to various embodiments of the disclosure. FIG. 2B is a perspective view of a rear surface of the mobile electronic device 200 illustrated in FIG. 2A according to various embodiments of the disclosure.

Referring to FIGS. 2A and 2B, the mobile electronic device 200 according to an embodiment may include a housing 210 including a first surface (or front surface) 210A, a second surface (or rear surface) 210B, and a side surface 210C surrounding a space between the first surface 210A and the second surface 210B. In another embodiment (not illustrated), the housing may indicate a structure configuring a part of the first surface 210A, the second surface 210B, and the side surface 210C illustrated in FIG. 1. According to an embodiment, the first surface 210A may be configured by a front plate 202 (e.g. a glass plate including various coating layers, or a polymer plate) 202, at least a part of which is substantially transparent. The second surface 210B may be configured by a back plate 211 that is substantially opaque. The back plate 211 may be formed of, for example, coated or colored glass, ceramic, polymer, metal (e.g. aluminum, stainless steel (STS), or magnesium), or a combination of at least two of the materials. The side surface 210C may be configured by a side bezel structure (or a "side member") 218 that is coupled to the front plate 202 and the back plate 211 and includes metal and/or polymer. In an embodiment, the back plate 211 and the side bezel structure 218 may be integrally configured, and may include an identical material (e.g. a metal material such as aluminum).

In the illustrated embodiment, the front plate 202 may include two first areas 210D seamlessly extending from the first surface 210A to be bent toward the back plate 211 on both long edges of the front plate 202. In the illustrated embodiment (see FIG. 2B), the back plate 211 may include two second areas 210E seamlessly extending from the second surface 210B to be bent toward the front plate 202 on both long edges of the back plate. In an embodiment, the front plate 202 (or the back plate 211) may include only one of the first areas 210D (or the second areas 210E). In another embodiment, a part of the first areas 210D or the second areas 210E may not be included. In the embodiments, when viewed in the side of the electronic device 200, the side bezel structure 218 may have a first thickness (or width) in the side surface at which a first area 210D or a second area 210E described above is not included, and may have a second thickness smaller than the first thickness in the side surface at which the first area 210D or the second area 210E is included.

According to an embodiment, the electronic device 200 may include at least one of a display 201, audio modules 203, 207, and 214, sensor modules 204, 216, and 219, camera modules 205, 212, and 213, a key input device 217, a light emitting element 206, and connector holes 208 and 209. In an embodiment, the electronic device 200 may omit at least one (e.g. the key input device 217 or the light emitting element 206) of the elements or additionally include another element.

The display 201 may be, for example, exposed through a significant portion of the front plate 202. In an embodiment, at least a part of the display 201 may be exposed through the front plate 202 configuring the first surface 210A and the first area 210D positioned at the side surface 210C. In an embodiment, an edge of the display 201 may be configured to be substantially identical to the shape of an outer portion of the front plate 202 adjacent to the edge. In another embodiment (not illustrated), in order to extend the area by which the display 201 is exposed, an interval between an outer portion of the display 201 and an outer portion of the front plate 202 may be configured to be substantially identical to each other.

In another embodiment (not illustrated), a recess or an opening may be disposed at a part of a screen display area of the display 201, and at least one of the audio module 214, the sensor module 204, the camera module 205, and the light emitting element 206 may be included to be aligned with the recess or the opening. In another embodiment (not illustrated), at least one of the audio module 214, the sensor module 204, the camera module 205, a fingerprint sensor 216, and the light emitting element 206 may be included on a rear surface of the screen display area of the display 201. In another embodiment (not illustrated), the display 201 may be coupled to or disposed to be adjacent to a touch sensing circuit, a pressure sensor capable of measuring the strength (pressure) of a touch, and/or a digitizer that detects a stylus pen using a magnetic field. In an embodiment, at least a part of the sensor module 204 and 219 and/or at least a part of the key input device 217 may be disposed in the first area 210D and/or the second area 210E.

The audio modules 203, 207, and 214 may include a microphone hole 203 and speaker holes 207 and 214. A microphone configured to obtain external sound may be disposed in the microphone hole 203, and in an embodiment, a plurality of microphones may be arranged therein to sense the direction of sound. The speaker holes 207 and 214 may include an external speaker hole 207 and a call receiver hole 214. In an embodiment, the speaker holes 207 and 214 and the microphone hole 203 may be implemented as a single hole, or a speaker may be included without the speaker holes 207 and 214 (e.g. a piezoelectric speaker).

The sensor modules 204, 216, and 219 may generate an electrical signal or a data value corresponding to an internal operation state or an external environment state of the electronic device 200. The sensor modules 204, 216, and 219 may include, for example, a first sensor module 204 (e.g. a proximity sensor) and/or a second sensor module (not illustrated) (e.g. a fingerprint sensor) disposed on the first surface 210A of the housing 210, and/or a third sensor module 219 (e.g. an HRM sensor) and/or a fourth sensor module 216 (e.g. a fingerprint sensor) disposed on the second surface 210B of the housing 210. The fingerprint sensor may be disposed on the second surface 210B of the housing 210 as well as the first surface 210A (e.g. the display 201). The electronic device 200 may further include a sensor module which is not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200 and a second camera device 212 and/or a flash 213 disposed on the second surface 210B. The camera modules 205 and 212 may include one or a plurality of lenses, an image sensor, and/or an image signal processor. The flash 213 may include, for example, a light emitting diode or a xenon lamp. In an embodiment, two or more lenses (an infrared camera, and wide-angle and telephoto lenses) and image sensors may be arranged on one surface of the electronic device 200.

The key input device 217 may be disposed on the side surface 210C of the housing 210. In another embodiment, the electronic device 200 may not include a part or all of key input devices 217 described above, and a key input device 217 that is not included may be implemented in a different type such as a soft key on the display 201. In an embodiment, the key input device may include the sensor module 216 disposed on the second surface 210B of the housing 210.

The light emitting element 206 may be, for example, disposed on the first surface 210A of the housing 210. The light emitting element 206 may provide, for example, state information of the electronic device 200 by using light. In another embodiment, the light emitting element 206 may provide, for example, a light source interworking with an operation of the camera module 205. The light emitting element 206 may include an LED, an IR LED, and a xenon lamp, for example.

The connector holes 208 and 209 may include a first connector hole 208 capable of receiving a connector (e.g. a USB connector) configured to transmit or receive power and/or data to or from an external electronic device, and/or a second connector hole (e.g. an earphone jack) 209 capable of receiving a connector configured to transmit or receive an audio signal to or from an external electronic device.

Figure 2C:
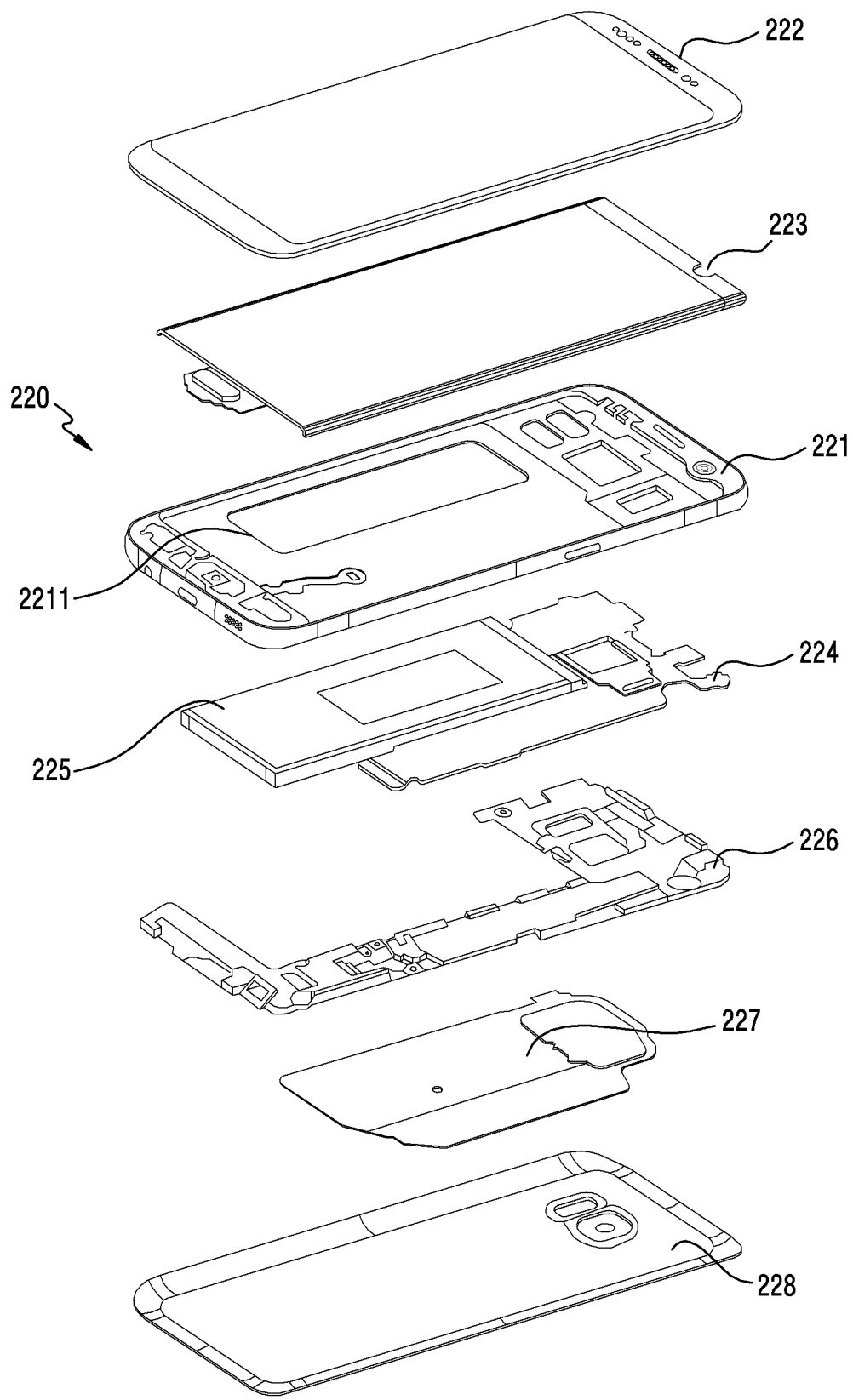
FIG. 2C is an exploded perspective view of an electronic device according to various embodiments of the disclosure.

FIG. 2C is an exploded perspective view of the mobile electronic device (e.g. the mobile electronic device 200 in FIG. 2A) illustrated in FIG. 2A according to various embodiments of the disclosure.

Referring to FIG. 2C, a mobile electronic device 220 may include a side bezel structure 221, a first support member 2211 (e.g. a bracket), a front plate 222, a display 223, a printed circuit board 224, a battery 225, a second support member 226 (e.g. a rear case), an antenna 227, and a back plate 228. In an embodiment, the electronic device 220 may omit at least one (e.g. the first support member 2211 or the second support member 226) of the elements or additionally include another element. At least one of the elements of the electronic device 220 may be identical or similar to at least one of the elements of the electronic device 200 illustrated in FIG. 2A or 2B. Hereinafter, duplicate descriptions will be omitted.

The first support member 2211 may be disposed in the electronic device 220 to be connected to the side bezel structure 221, or may be integrally formed with the side bezel structure 221. The first support member 2211 may be, for example, made of a metal material and/or a non-metal (e.g. polymer) material. The display 223 may be coupled to one surface of the first support member 2211, and the printed circuit board 224 may be coupled to the other surface. A processor, a memory, and/or an interface may be mounted on the printed circuit board 224. The processor may include, for example, one or more of a central processing device, an application processor, a graphics processing device, an image signal processor, a sensor hub processor, or a communication processor.

The memory may include, for example, a volatile memory or a non-volatile memory.

The interface may include, for example, a high definition multimedia interface (HDMI), a universal serial bus (USB) interface, an SD card interface, and/or an audio interface. The interface may, for example, electrically or physically connect the electronic device 220 to an external electronic device, and may include a USB connector, an SD card/MMC connector, or an audio connector.

The battery 225 is a device configured to supply power to at least one element of the electronic device 220, and may include, for example, a non-rechargeable primary battery, a rechargeable secondary battery, or a fuel cell. At least a part of the battery 225 may be substantially disposed on, for example, a plane identical to the printed circuit board 224. The battery 225 may be integrally disposed in the electronic device 220, and may be detachably attached to the electronic device 220.

The antenna 227 may be disposed between the back plate 228 and the battery 225. The antenna 227 may include, for example, a near field communication (NFC) antenna, a wireless charging antenna, and/or a magnetic secure transmission (MST) antenna. The antenna 227 may, for example, perform near field communication with an external device, or wirelessly transmit or receive power required for charging. In another embodiment, an antenna structure may be configured by a part of the side bezel structure 221 and/or the first support member 2211, or a combination thereof.

Figure 3A:
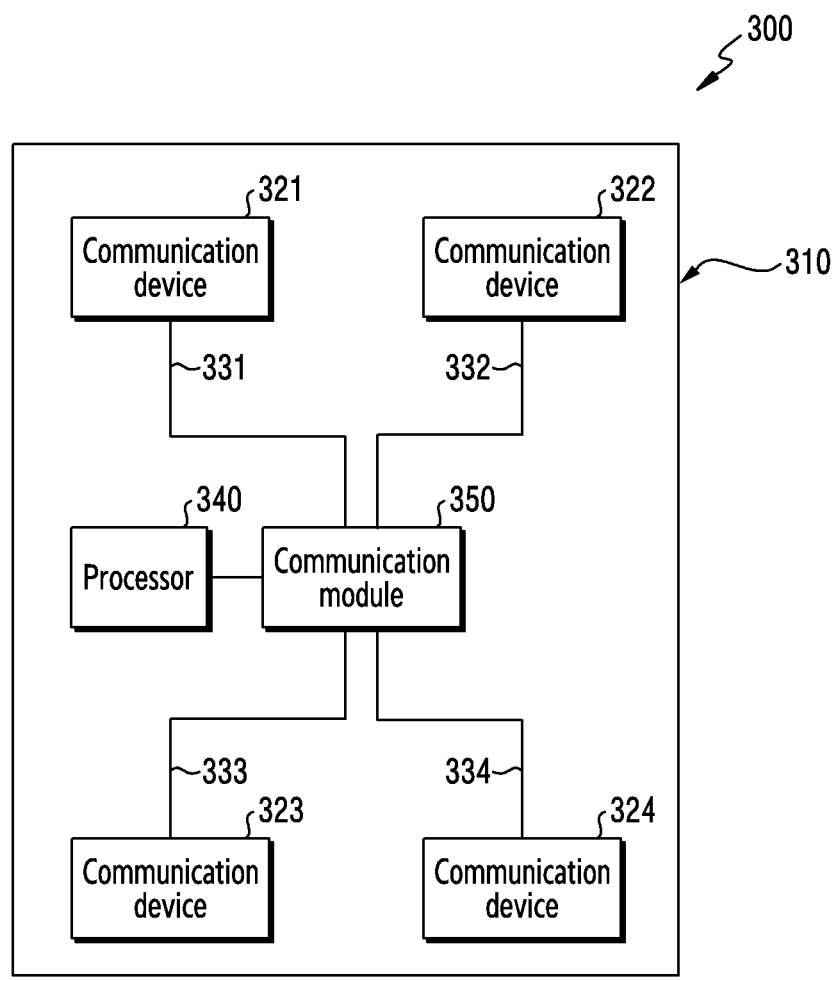
FIG. 3A is a diagram illustrating an example of an electronic device supporting 5G communication according to various embodiments of the disclosure.

FIG. 3A is a diagram illustrating an example of an electronic device 300 supporting 5G communication.

Referring to FIG. 3A, the electronic device 300 (e.g. the electronic device 200 in FIG. 2A) may include a housing 310, a processor 340, a communication module 350 (e.g. the communication module 190 in FIG. 1), a first communication device 321, a second communication device 322, a third communication device 323, a fourth communication device 324, a first conductive line 331, a second conductive line 332, a third conductive line 333, or a fourth conductive line 334.

According to an embodiment, the housing 310 may protect the other elements of the electronic device 300. The housing 310 may include, for example, a front plate, a back plate oriented in the opposite direction to the front plate, and a side member (or a metal frame) that is attached to the back plate or integrally configured with the back plate, and surrounds a space between the front plate and the back plate.

According to an embodiment, the electronic device 300 may include the first communication device 321, the second communication device 322, the third communication device 323, or the fourth communication device 324.

According to an embodiment, the first communication device 321, the second communication device 322, the third communication device 323, or the fourth communication device 324 may be disposed in the housing 310. According to an embodiment, when viewed from above the back plate of the electronic device, the first communication device 321 may be disposed at an upper left of the electronic device 300, the second communication device 322 may be disposed at an upper right of the electronic device 300, the third communication device 323 may be disposed at a lower left of the electronic device 300, and the fourth communication device 324 may be disposed at a lower right of the electronic device 300.

According to an embodiment, the processor 340 may include one or more of a central processing device, an application processor, a graphic processing unit (GPU), an image signal processor of a camera, or a baseband processor (or a communication processor (CP)). According to an embodiment, the processor 340 may be implemented as a system on chip (SoC) or a system in package (SiP).

According to an embodiment, the communication module 350 may be electrically connected to the first communication device 321, the second communication device 322, the third communication device 323, or the fourth communication device 324 by using the first conductive line 331, the second conductive line 332, the third conductive line 333, or the fourth conductive line 334. The communication module 350 may include, for example, a baseband processor or at least one communication circuit (e.g. an IFIC or an RFIC). The communication module 350 may include, for example, a separate baseband processor in addition to the processor 340 (e.g. an application processor (AP)). The first conductive line 331, the second conductive line 332, the third conductive line 333, or the fourth conductive line 334 may include, for example, a coaxial cable or an FPCB.

According to an embodiment, the communication module 350 may include a first baseband processor (BP) (not illustrated) or a second baseband processor (BP) (not illustrated). The electronic device 300 may further include one or more interfaces to support inter-chip communication between the first BP (or the second BP) and the processor 340. The processor 340 and the first BP or the second BP may transmit or receive data by using the inter-chip interface (an inter processor communication channel).

According to an embodiment, the first BP or the second BP may provide an interface configured to perform communication with other entities. The first BP may support, for example, wireless communication for a first network (not illustrated). The second BP may support, for example, wireless communication for a second network (not illustrated).

According to an embodiment, the first BP or the second BP and the processor 340 may configure a single module. For example, the first BP or the second BP may be integrally formed with the processor 340. As another example, the first BP or the second BP may be disposed in a single chip or may be configured as an independent chip. According to an embodiment, the processor 340 and at least one baseband processor (e.g. the first BP) may be integrally formed in a single chip (an SoC chip), and another baseband processor (e.g. the second BP) may be configured as an independent chip.

According to an embodiment, the first network (not illustrated) or the second network (not illustrated) may correspond to the network 199 illustrated in FIG. 1. According to an embodiment, the first network (not illustrated) or the second network (not illustrated) may include a 4th generation (4G) network and a 5th generation (5G) network, respectively. The 4G network may support, for example, a long term evolution (LTE) protocol defined in the 3GPP. The 5G network may support, for example, a new radio (NR) protocol defined in the 3GPP.

Figure 3B:
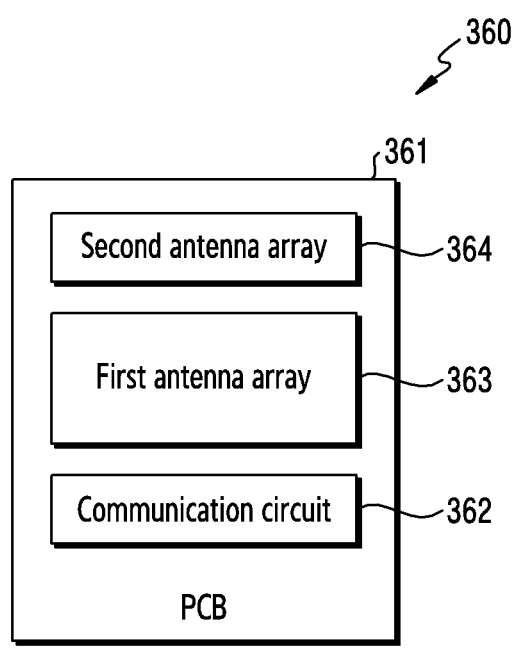
FIG. 3B is a block diagram of a communication device according to various embodiments of the disclosure.

FIG. 3B is a block diagram of a communication device 360 according to an embodiment.

Referring to FIG. 3B, the communication device 360 (e.g. the first communication device 321, the second communication device 322, the third communication device 323, or the fourth communication device 324 in FIG. 3A) may include a communication circuit 362 (e.g. an RFIC), a printed circuit board (PCB) 361, a first antenna array 363, or a second antenna array 364.

According to an embodiment, the communication circuit 362, the first antenna array 363, or the second antenna array 364 may be arranged on the PCB 361. For example, the first antenna array 363 or the second antenna array 364 may be disposed on a first surface of the PCB 361, and the communication circuit 362 may be disposed on a second surface of the PCB 361. The PCB 361 may include a connector (e.g. a coaxial cable connector or a board to board (B-to-B) connector) configured to perform electrical connection to another PCB (e.g. a PCB on which the communication module 350 in FIG. 3A is disposed) by using a transmission wire (e.g. the first conductive line 331 in FIG. 3A, and a coaxial cable). For example, the PCB 361 may be connected to a PCB, on which the communication module 350 is disposed, through a coaxial cable by using a coaxial cable connector, and the coaxial cable may be used to transfer transmission and reception IF signals or RF signals. As another example, power or other control signals may be transferred through a B-to-B connector.

According to an embodiment, the first antenna array 363 or the second antenna array 364 may include a plurality of antenna elements. The antenna elements may include a patch antenna, a loop antenna, or a dipole antenna. For example, an antenna element included in the first antenna array 363 may be a patch antenna to form a beam toward a back plate of the electronic device 360. As another example, an antenna element included in the second antenna array 364 may be a dipole antenna or a loop antenna to form a beam toward a side member of an electronic device (e.g. the electronic device 200 in FIG. 2A).

According to an embodiment, the communication circuit 362 may support at least a partial band (e.g. 24 GHz to 30 GHz, or 37 GHz to 40 GHz) in a band of 3 GHz to 100 GHz. According to an embodiment, the communication circuit 362 may upconvert or downconvert frequency. For example, the communication circuit 362 included in the communication device 360 (e.g. the first communication device 321 in FIG. 3A) may upconvert, into an RF signal, an IF signal received through a conductive line (e.g. the first conductive line 331 in FIG. 3A) from a communication module (e.g. the communication module 350 in FIG. 3A). As another example, the communication circuit 362 included in the communication device 360 (e.g. the first communication device 321 in FIG. 3A) may downconvert, into an IF signal, an RF signal (e.g. a millimeter wave signal) received through the first antenna array 363 or the second antenna array 364, and may transmit the IF signal to the communication module through the conductive line.

Figure 4A:
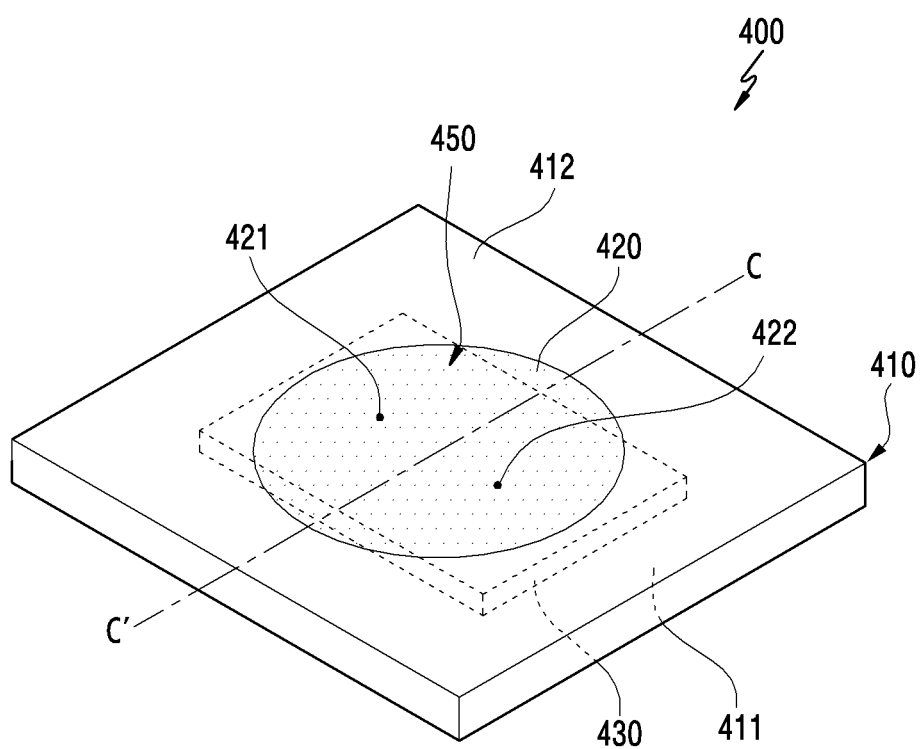
FIG. 4A is a perspective view of a communication device according to various embodiments of the disclosure.

FIG. 4A is a perspective view of a communication device 400 according to various embodiments of the disclosure.

The communication device 400 in FIG. 4A may be at least partially similar to the communication devices 321, 322, 323, and 324 in FIG. 3A, or may include other embodiments of the communication devices.

Referring to FIG. 4A, the communication device 400 may include a substrate 410. According to an embodiment, the substrate 410 may include a first surface 411 and a second surface 412 oriented in the opposite direction to the first surface 411. According to an embodiment, the substrate 410 may be disposed such that the second surface 412 is oriented toward a back plate (e.g. the back plate 211 in FIG. 2B) of an electronic device (e.g. the electronic device 200 in FIG. 2B). However, the disclosure is not limited thereto, and the substrate 410 may be disposed such that the second surface 412 is oriented toward a side member (e.g. the side member 216 in FIG. 2A) or a front plate (e.g. the front plate 202 in FIG. 2A) of an electronic device. According to an embodiment, the communication device 400 may include an antenna 450 disposed on the second surface 412 of the substrate 410. According to an embodiment, an antenna structure may include the antenna 450 and at least one plane of the substrate 410, parallel to a second plate of an electronic device (e.g. the electronic device 300 in FIG. 3A). According to an embodiment, the antenna 450 may include an antenna element 420 (e.g. a conductive plate or a conductive patch) disposed on the second surface 412 of the substrate 410. However, the disclosure is not limited thereto, and the antenna element 420 may be interposed between a plurality of insulation layers included in the substrate 410.

According to various embodiments, the antenna element 420 may have a shape which is symmetric with respect to line C-C' crossing the center of the antenna element. According to an embodiment, the antenna element 420 may include a pair of feed parts 421 and 422. According to an embodiment, the pair of feed parts 421 and 422 may be arranged to be symmetric with (e.g. are facing) each other with respect to symmetrical line C-C'. According to an embodiment, the pair of feed parts 421 and 422 may be electrically connected to a wireless communication circuit 430 disposed on the first surface 411 of the substrate 410. According to an embodiment, the wireless communication circuit 430 may be configured to transmit or receive at least one signal having a frequency band of 10 GHz-100 GHz through the antenna element 420. According to an embodiment, the pair of feed parts 421 and 422 may be electrically connected to the wireless communication circuit 430 through a conductive via electrically connecting the first surface 411 of the substrate 410 and the second surface 412. According to an embodiment, the pair of feed parts 421 and 422 may be electrically connected to the wireless communication circuit 430 via coupling feeding. According to an embodiment, the antenna element 420 may include a conductive pattern disposed in a substrate. According to an embodiment, the antenna element 420 may include a metal plate, a flexible printed circuit board (FPCB), or a conductive paint, which is attached to the substrate 410.

According to various embodiments, the communication device 400 may be configured such that two feeding ports of the wireless communication circuit 430 are electrically connected to one antenna element 420 used as an antenna element. For example, the communication device 400 has input ports, the number of which is doubled, and thus input power applied to the antenna element 420 is increased, so that the output power of the communication device 400 can be increased.

Figure 4B:
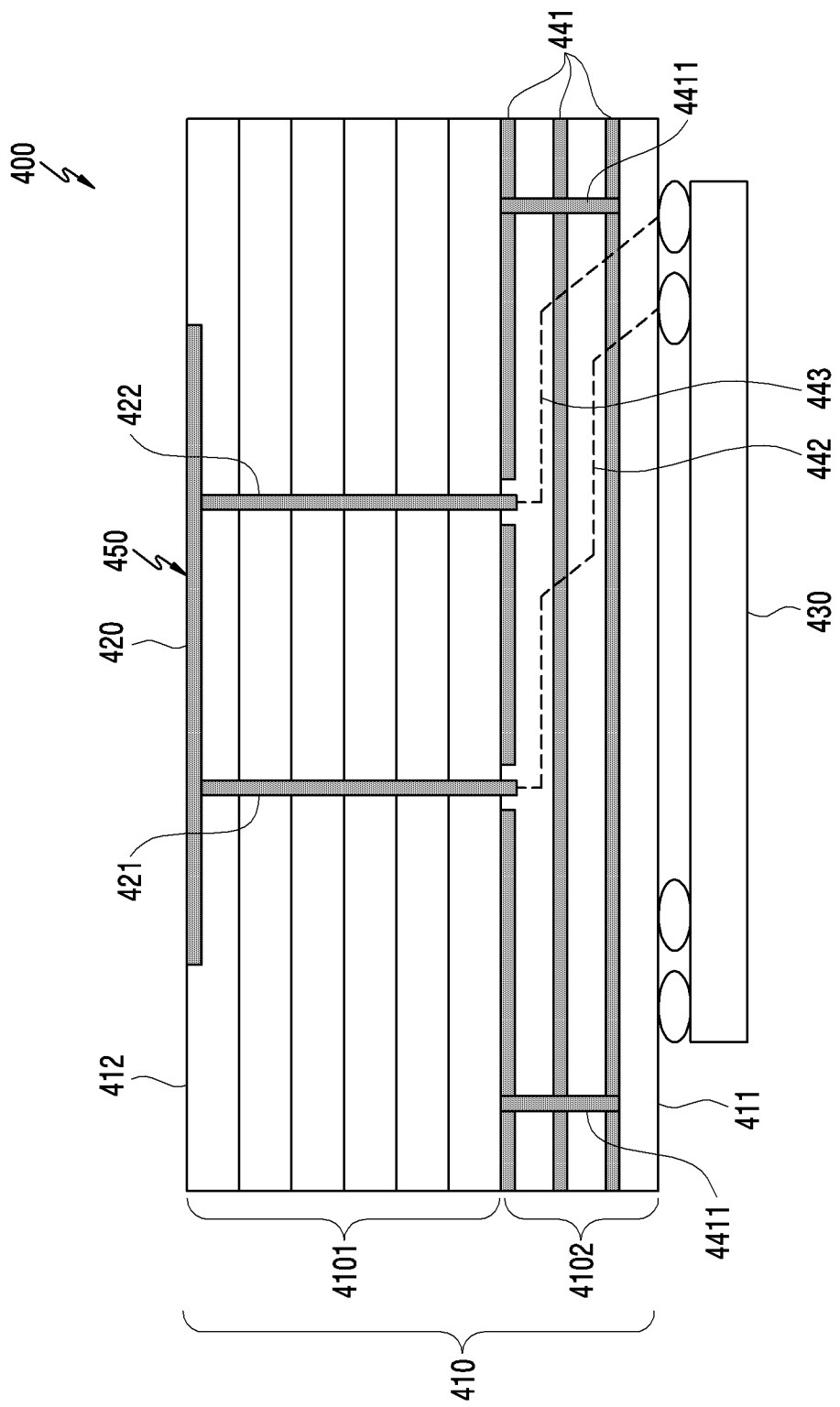
FIG. 4B is a cross-sectional view of a stacked structure of the communication device illustrated in FIG. 4A according to various embodiments of the disclosure.

FIG. 4B is a cross-sectional view of a stacked structure of the communication device 400 illustrated in FIG. 4A according to various embodiments of the disclosure.

Referring to FIG. 4B, the substrate 410 may include a plurality of insulation layers. According to an embodiment, the substrate 410 may include a first layer area 4101 including at least one insulation layer, or a second layer area 4102 neighboring the first layer area 4101 and including at least another insulation layer. According to an embodiment, the first layer area 4101 may include an antenna 450. According to an embodiment, the antenna 450 may include an antenna element 420 (e.g. a conductive plate or a conductive patch). According to an embodiment, the first layer area 4101 may include a first feed part 421 and a second feed part 422 that extend from the antenna element 420 to the second layer area 4102 at mutually symmetrical positions, and are electrically connected to the wireless communication circuit 430. According to an embodiment, each of the first feed part 421 and the second feed part 422 may include a conductive via extending through the first layer area 4101 in the thickness-wise direction of the substrate 410. According to an embodiment, the first feed part 421 may be electrically connected to the wireless communication circuit 430 through a first feeding wire 442 disposed in the second layer area 4102. According to an embodiment, the second feed part 422 may be electrically connected to the wireless communication circuit 430 through a second feeding wire 443 disposed in the second layer area 4102. According to an embodiment, the first feeding wire 442 and the second feeding wire 443 may be configured to be electrically disconnected from at least one of ground planes 441 arranged in the second layer area 4102. According to an embodiment, the ground planes 441 may be one or more in number. According to an embodiment, the antenna element 420 may be disposed on the uppermost surface (e.g. a second surface 412) in the first layer area 4101 of the substrate 410. However, the disclosure is not limited thereto. For example, the antenna element 420 may be disposed on an insulation layer in the first layer area 4101.

According to various embodiments, the second layer area 4102 may include ground planes 441 arranged on different insulation layers, respectively. According to an embodiment, the wireless communication circuit 430 may be mounted on the first surface 411 of the substrate 410 in a ball grid array (BGA) scheme. According to an embodiment, the ground planes 441 may be electrically connected to each other through a conductive via 4411. According to an embodiment, the conductive via 4411 may be one or more in number.

Figure 4C:
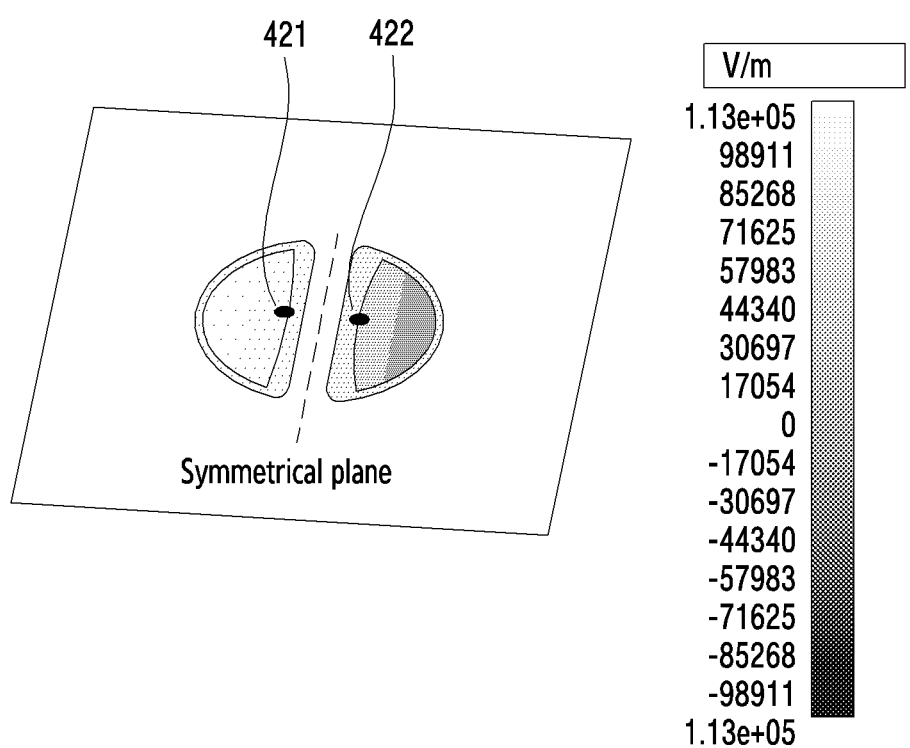
FIG. 4C is a diagram illustrating an electric field distribution of the communication device illustrated in FIG. 4A according to various embodiments of the disclosure.

FIG. 4C is a diagram illustrating an electric field distribution of the communication device 400 in FIG. 4A according to various embodiments of the disclosure, and as illustrated in FIG. 4C, it may be noted that an electric field distribution having bilateral symmetry with respect to symmetrical line C-C' illustrated in FIG. 4A is formed. Therefore, even if the feed parts 421 and 422 are arranged to be symmetric with (are facing) each other in respective areas with respect to symmetrical line C-C', the radiation characteristics of the antenna element 420 are unchanged, and output power can be increased.

Figure 4D:
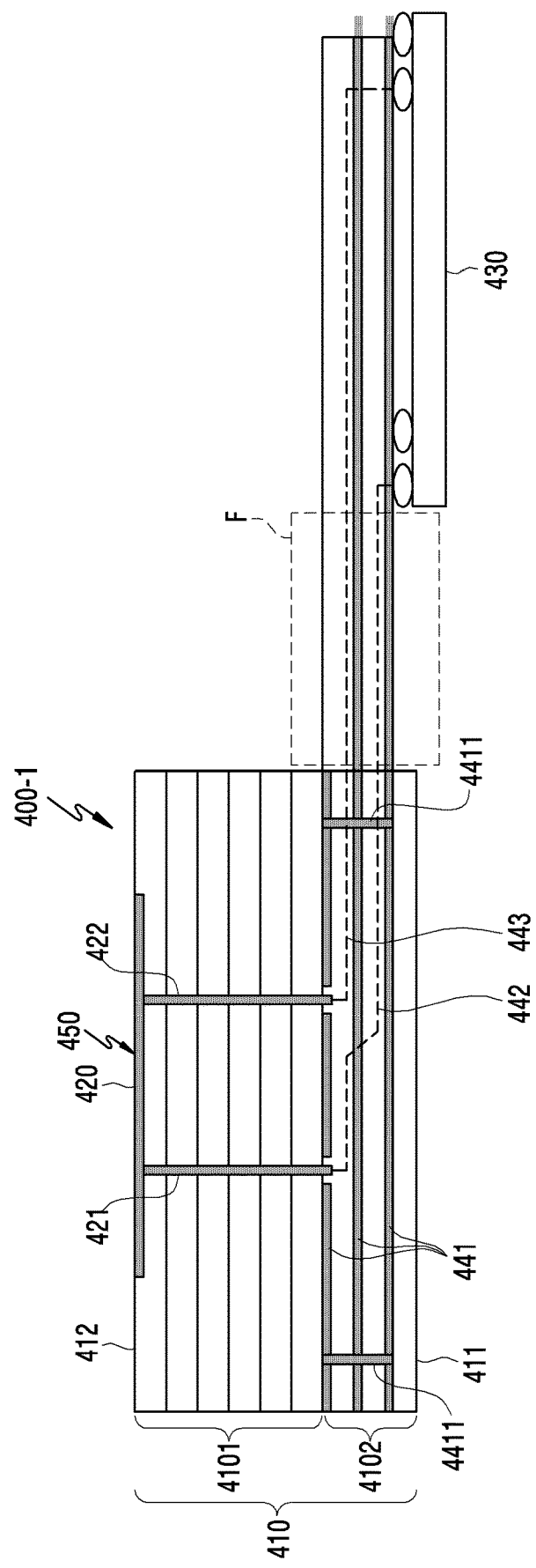
FIGS. 4D to 4F are cross-sectional views of various stacked structures of a communication device according to various embodiments of the disclosure.
Figure 4E:
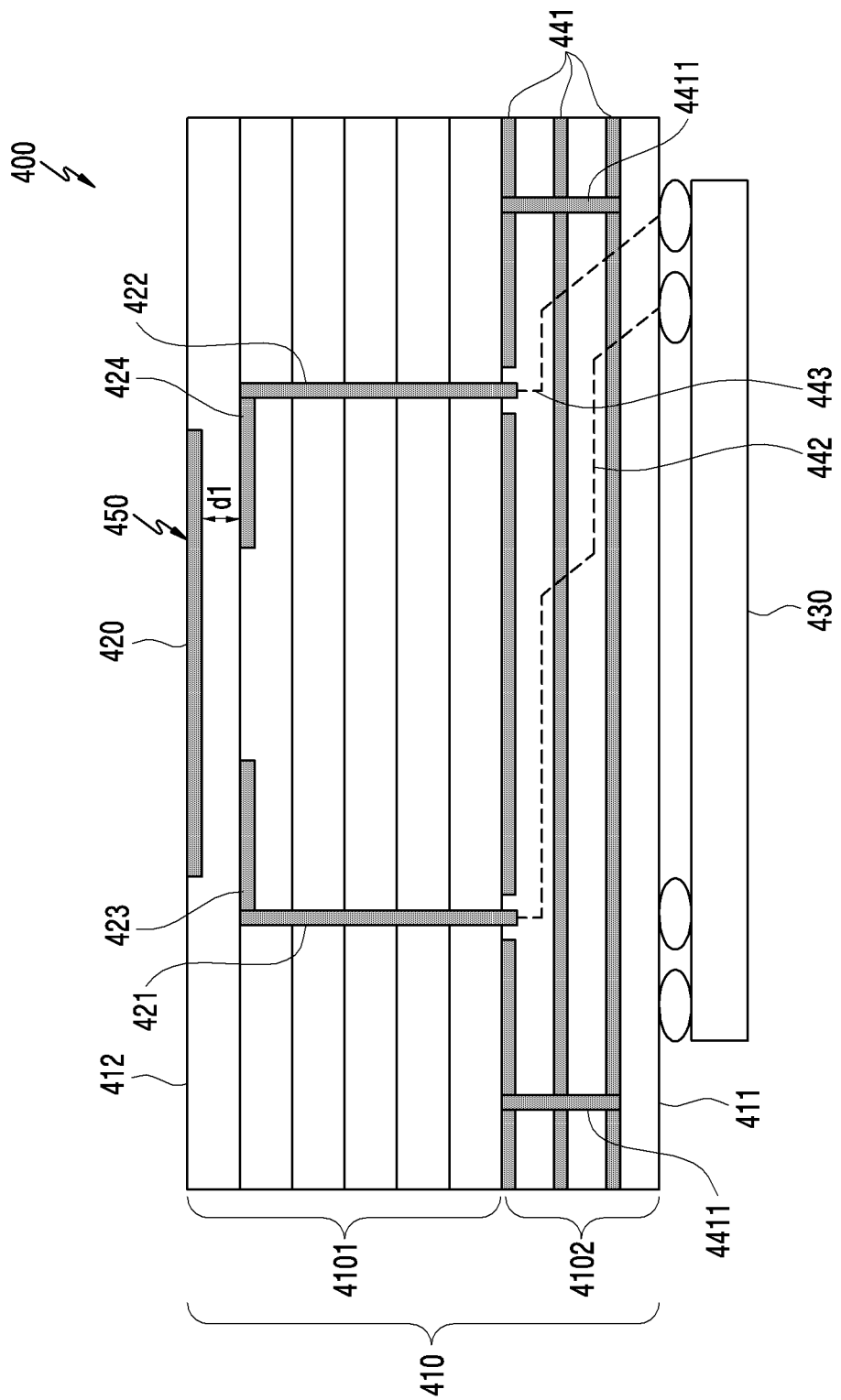
Figure 4F:
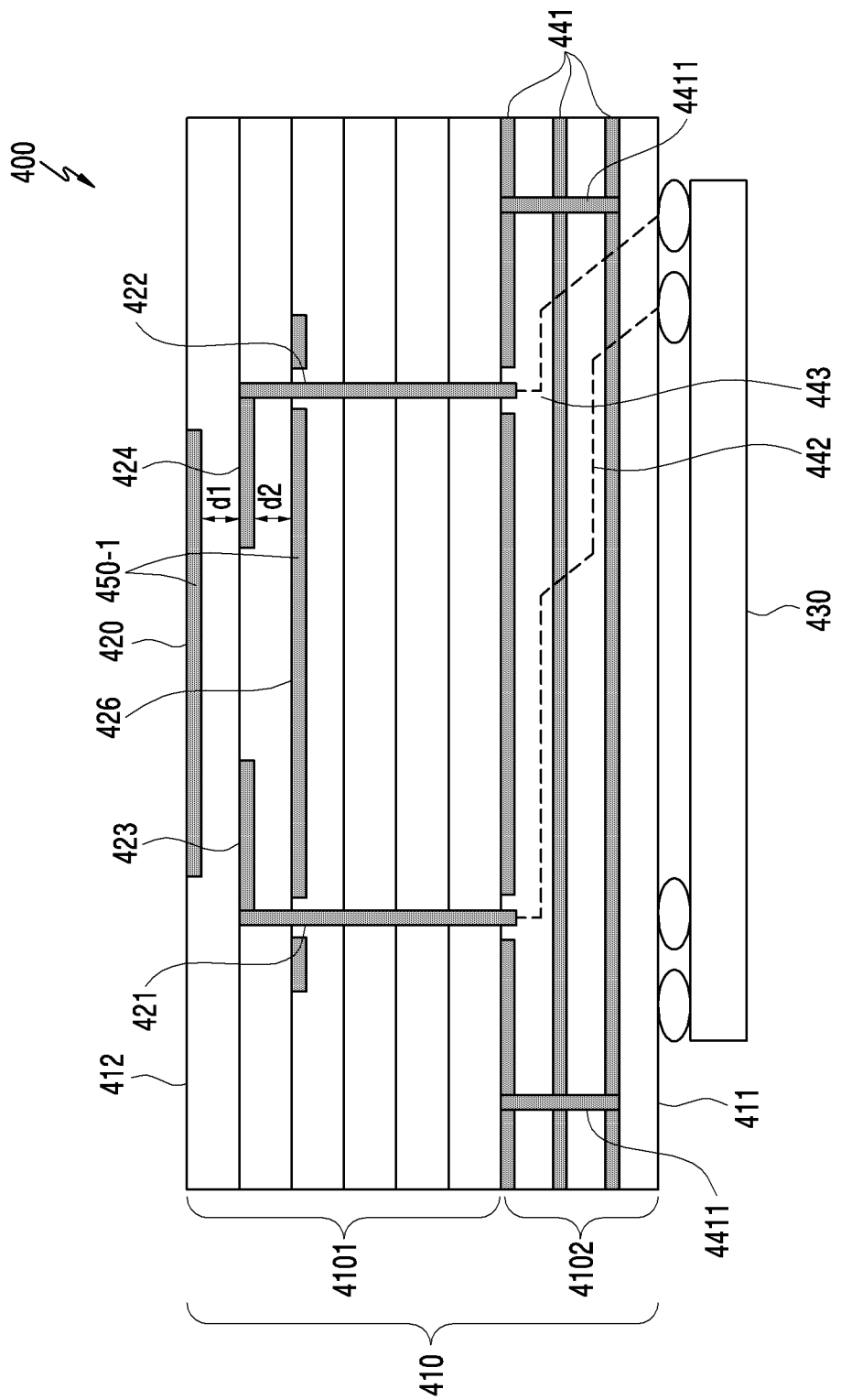

FIGS. 4D to 4F are cross-sectional views of various stacked structures of a communication device according to various embodiments of the disclosure.

Referring to FIG. 4D, a communication device 400-1 may include a substrate 410. According to an embodiment, the substrate 410 may include a first layer area 4101 including at least one insulation layer, or a second layer area 4102 neighboring the first layer area 4101 and including at least another insulation layer. According to an embodiment, the first layer area 4101 may include an antenna 450. According to an embodiment, the antenna 450 may include an antenna element 420. According to an embodiment, the first layer area 4101 may include a first feed part 421 and a second feed part 422 that extend from the antenna element 420 to the second layer area 4102 at mutually symmetrical positions, and are electrically connected to a wireless communication circuit 430. According to an embodiment, each of the first feed part 421 and the second feed part 422 may include a conductive via extending through the first layer area 4101 in the thickness-wise direction of the substrate 410. According to an embodiment, the first feed part 421 may be electrically connected to the wireless communication circuit 430 through a first feeding wire 442 disposed in the second layer area 4102. According to an embodiment, the second feed part 422 may be electrically connected to the wireless communication circuit 430 through a second feeding wire 443 disposed in the second layer area 4102.

According to an embodiment, the second layer area 4102 may include an extension area F extending without overlapping when viewed from above a second surface 412.

According to an embodiment, the extension area F may be flexibly extended. At least a part of the extension area F may extend from a first surface 411, and may include the wireless communication circuit 430 mounted on the first surface. According to an embodiment, the extension area F may be as short as possible to accomplish low loss. According to an embodiment, the extension area F may be made of a high frequency low loss material. According to an embodiment, the communication device 400-1 may be mounted at various positions of an electronic device (e.g. positions from a side surface (e.g. the side surface 210C in FIG. 2A) to a back plate (e.g. the back plate 210B in FIG. 2C) of an electronic device (e.g. the electronic device 200 in FIG. 2A)) by using the extension area F, so that the availability of a mounting space can be maximized.

Referring to FIG. 4E, a communication device 400-2 may include a substrate 410. According to an embodiment, the substrate 410 may include a first layer area 4101 including at least one insulation layer, or a second layer area 4102 neighboring the first layer area 4101 and including at least another insulation layer. According to an embodiment, the first layer area 4101 may include an antenna 450. According to an embodiment, the antenna 450 may include an antenna element 420. According to an embodiment, the first layer area 4101 may include a first conductive pad 423 and a second conductive pad 424 which are spaced a first distance (d1) apart from the antenna element 420, and are arranged at positions at which the first conductive pad and the second conductive pad are symmetric with each other. According to an embodiment, the first conductive pad 423 and the second conductive pad 424 may be electrically connected to the antenna element 420 so as to be capacitively coupled thereto. According to an embodiment, the first layer area 4101 may include a first feed part 421 and a second feed part 422 that extend from the first feeding pad 423 and the second feeding pad 424 to the second layer area 4102, and are electrically connected to a wireless communication circuit 430. According to an embodiment, each of the first feed part 421 and the second feed part 422 may include a conductive via extending through the first layer area 4101 in the thickness-wise direction of the substrate 410. According to an embodiment, the first feed part 421 may be electrically connected to the wireless communication circuit 430 through a first feeding wire 442 disposed in the second layer area 4102. According to an embodiment, the second feed part 422 may be electrically connected to the wireless communication circuit 430 through a second feeding wire 443 disposed in the second layer area 4102.

Referring to FIG. 4F, a communication device 400-3 may include a substrate 410. According to an embodiment, the substrate 410 may include a first layer area 4101 including at least one insulation layer, or a second layer area 4102 neighboring the first layer area 4101 and including at least another insulation layer. According to an embodiment, the communication device may include an antenna 450-1 disposed at different positions in the first layer area 4101. According to an embodiment, the antenna 450-1 may include a first antenna element 420 disposed in the first layer area 4101. According to an embodiment, the first layer area 4101 may include a first conductive pad 423 and a second conductive pad 424 which are spaced a first distance (d1) apart from the first antenna element 420, and are arranged at positions at which the first conductive pad and the second conductive pad are symmetric with each other. According to an embodiment, the antenna 450-1 may include a second antenna element 426 spaced a second distance (d2) apart from the first conductive pad 423 and the second conductive pad 424 in the first layer area 4101. According to an embodiment, the first conductive pad 423 and the second conductive pad 424 may be electrically connected to the first antenna element 420 and the second antenna element 426 between the first antenna element 420 and the second antenna element 426, so as to be capacitively coupled thereto. According to an embodiment, the first layer area 4101 may include a first feed part 421 and a second feed part 422 that extend from the first feeding pad 423 and the second feeding pad 424 to the second layer area 4202, and are electrically connected to a wireless communication circuit 430. According to an embodiment, each of the first feed part 421 and the second feed part 422 may include a conductive via extending through the first layer area 4101 in the thickness-wise direction of the substrate 410. According to an embodiment, the first feed part 421 may be electrically connected to the wireless communication circuit 430 through a first feeding wire 442 disposed in the second layer area 4102. According to an embodiment, the second feed part 422 may be electrically connected to the wireless communication circuit 430 through a second feeding wire 443 disposed in the second layer area 4102.

According to an embodiment, the wireless communication circuit 430 may transmit or receive a wireless signal having a first frequency band through the first antenna element 420. According to an embodiment, the wireless communication circuit 430 may transmit or receive a wireless signal having a second frequency band through the second antenna element 426. According to an embodiment, a first frequency may be configured to be higher than a second frequency. However, the disclosure is not limited thereto, and according to the sizes of the first antenna element 420 and the second antenna element 426, the first frequency may be configured to be relatively lower than the second frequency.

Figure 5:
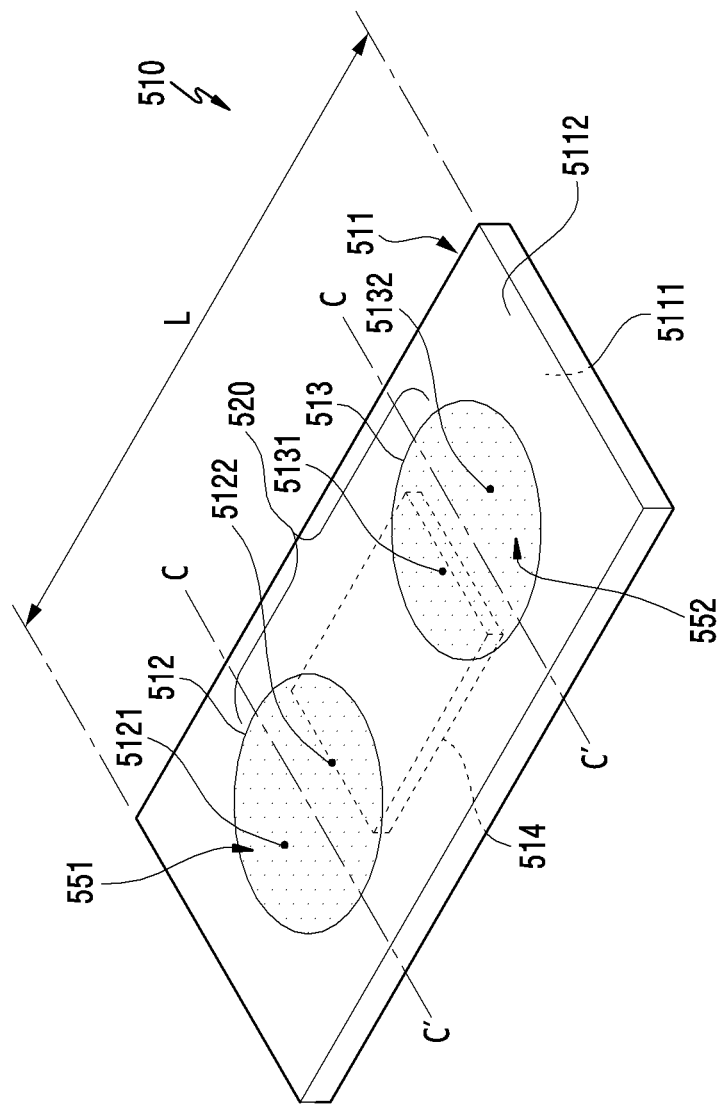
FIG. 5 is a perspective view of a communication device according to various embodiments of the disclosure.

FIG. 5 is a perspective view of a communication device 510 according to various embodiments of the disclosure.

The communication device 510 in FIG. 5 may be at least partially similar to the communication devices 321, 322, 323, and 324 in FIG. 3A, or may include other embodiments of the communication devices.

FIG. 5 illustrates a communication device having a relatively reduced size compared to a conventional communication device through multi-feeding (e.g. double-feeding) applied to an antenna element according to an exemplary embodiment of the disclosure.

Referring to FIG. 5, the communication device 510 may include a substrate 511, an antenna array 520 disposed in the substrate 511, and a wireless communication circuit 514 electrically connected to the antenna array 520. According to an embodiment, the antenna array 520 may include a first antenna 551 and a second antenna 552 spaced a predetermined interval from each other. According to an embodiment, the first antenna 551 may include a first antenna element 512. According to an embodiment, the second antenna 552 may include a second antenna element 513. According to an embodiment, the wireless communication circuit 514 may be configured to transmit or receive at least one signal having a frequency band of 10 GHz-100 GHz through the first antenna element 512 and the second antenna element 513.

According to various embodiments, the antenna elements 512 and 513 arranged at a predetermined interval on a second surface 5112 of the substrate 511 may be electrically connected to the wireless communication circuit 514 disposed on a first surface 5111 of the substrate 511. According to an embodiment, the communication device 510 may include the wireless communication circuit 514 having four feeding ports and the antenna elements 512 and 513 arranged in the substrate 511. According to an embodiment, the antenna elements 512 and 513 may be electrically connected to the wireless communication circuit 514 in a manner identical or similar to the configurations illustrated in FIGS. 4A and 4B, which are described above. For example, the wireless communication circuit 514 may be electrically connected to a first feed part 5121 and a second feed part 5122 of the first antenna element 512 through two feeding ports, respectively, and may be electrically connected to a third feed part 5131 and a fourth feed part 5132 of the second antenna element 513 through the remaining two feeding ports, respectively. According to an embodiment, the first feed part 5121 and the second feed part 5122 of the first antenna element 512, or the third feed part 5131 and the fourth feed part 5132 of the second antenna element 513 may be arranged to be symmetric with (are facing) each other with respect to line C-C' crossing the center of each of the first antenna element 512 and the second antenna element 513.

According to various embodiments, in the communication device 510, the same number of feeding ports are used but the number of antenna elements (e.g. conductive plates) is reduced through multi-feeding (e.g. double-feeding), so that the volume of the communication device can be reduced. For example, if the wireless communication circuit 514 having four feeding ports are electrically connected to the first antenna element 512 and the second antenna element 513 through double-feeding, the length (L) of the substrate 511 may be reduced to be smaller than the length (e.g. 2 L) of a substrate of a case in which the wireless communication circuit 514 are electrically connected to four antenna elements in a single-feeding type. Therefore, the mounting space in an electronic device (e.g. the electronic device 200 in FIG. 2A), in which the communication device is mounted, is efficiently used, so that the electronic device can be slim.

According to various embodiments, in a case where the number of antenna elements is unavoidably limited in consideration of a mounting space for the communication device 510 in an electronic device (e.g. the electronic device 200 in FIG. 2A), if a multi-feeding configuration is applied to the antenna elements 512 and 513, the number of which is reduced, the reduced number of antenna elements (conductive plates) leads to decreasing of a gain somewhat. However, the number of ports is increased compared to a single-feeding configuration applied to the reduced number of antenna elements. Therefore, effective isotropically radiated power (EIRP) can be relatively increased. For example, if a communication device having four antenna elements fed with power by four feeding ports of the wireless communication circuit 514 has only two antenna elements due to installation space constraint, and is changed to a single-feeding type, EIRP may be reduced significantly. However, even though the communication device 510 has only two antenna elements 512 and 513, a multi-feeding (double-feeding) configuration is applied according to an embodiment of the disclosure. Therefore, the number of feeding ports is maintained, and thus EIRP drop can be reduced.

For example, <Table 1> below shows various electrical connection relationships of an antenna element (e.g. the first antenna element 512 or the second antenna element 513) electrically connected to the wireless communication circuit 514 having four feeding ports. For example, "Single 1×4" may imply single-feeding of four antenna elements by four feeding ports (case (a)), "Dual 1×2" may imply double-feeding of two antenna elements by four feeding ports (case (b)) (e.g. the case illustrated in FIG. 5), and "Dual 1×3" may imply double-feeding of one of three antenna elements by two feeding ports among four feeding ports (case (c)) (e.g. the case illustrated in FIG. 7A).

TABLE 1

|  | (a) Single 1 × 4 | (b) Dual 1 × 2 | (c) Dual 1 × 3 |
| --- | --- | --- | --- |
| Port Number | 4 | 4 | 4 |
| Single PA Output Power | 10 dBm | 10 dBm | 10 dBm |
| Total PA Output Power | 16 dBm | 16 dBm | 16 dBm |
| Element Ant. Gain | 5 dBi | 5 dBi | 5 dBi |
| Array Ant. Gain | 11 dBi | 8 dBi | 9.78 dBi |
| Peak EIRP | 27 dBm | 24 dBm | 25.78 dBm |

Referring to <Table 1> above, when a gain of each antenna element is 5 dBi and the input power of one feeding port is 10 dBm, in a comparison of the communication device of (b) against the communication device of (a), a gain is reduced from 11 dBi to 8 dBi somewhat. However, the number of feeding ports is maintained, and thus it is noted that EIRP is decreased from 27 dBm to 24 dBm, the drop of which is reduced.

Figure 6:
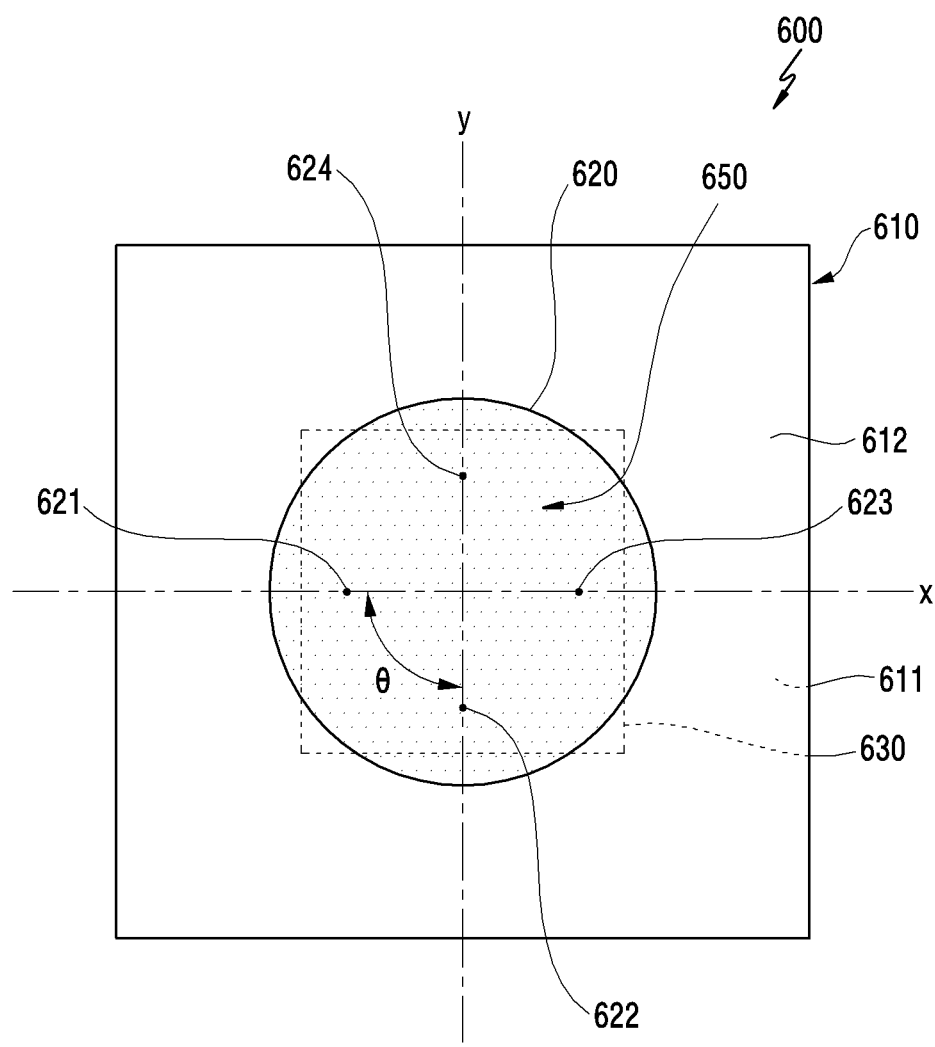
FIG. 6 is a diagram illustrating a configuration of a communication device according to various embodiments of the disclosure.

FIG. 6 is a diagram illustrating a configuration of a communication device 600 according to various embodiments of the disclosure.

The communication device 600 in FIG. 6 may be at least partially similar to the communication devices 310, 320, 330, and 340 in FIG. 3, or may include other embodiments of the communication devices.

Referring to FIG. 6, the communication device 600 may include a substrate 610, an antenna 650 disposed on a second surface 612 of the substrate 610, and a wireless communication circuit 630 disposed on a first surface 611 of the substrate 610 to be electrically connected to an antenna element 620. The antenna 650 may include the antenna element 620. According to an embodiment, the antenna element 620 may be symmetrically configured with respect to at least two virtual lines (e.g. x-axis and y-axis) which cross the center of the antenna element and are perpendicular to each other. According to an embodiment, the antenna element 620 may be configured to be circular. However, the disclosure is not limited thereto, and the antenna element 620 may be configured to be a square or a regular octagon.

According to various embodiments, the antenna element 620 may be electrically connected to the wireless communication circuit 630 in a multi-feeding type. According to an embodiment, the antenna element 620 may be fed with power at four points of the antenna element 620 by four feeding ports of the wireless communication circuit 630. For example, the antenna element 620 may include a first feed part 621, and a second feed part 622 disposed at 90-degree to the first feed part 621 with respect to a z-axis. According to an embodiment, the antenna element may include a third feed part 623 disposed to be symmetric with the first feed part 621 with respect to a y-axis, and a fourth feed part 624 disposed to be symmetric with the second feed part 622 with respect to a x-axis. According to an embodiment, the first feed part 621 and the third feed part 623 disposed to be symmetric with the first feed part 621 with respect to an electric field may have increased output power and may form a first polarized wave. According to an embodiment, the second feed part 622 and the fourth feed part 624 disposed to be symmetric with the second feed part 622 with respect to an electric field may form a second polarized wave which is perpendicular to the first polarized wave and has increased output power.

According to various embodiments, the positions of the feed parts 621, 622, 623, and 624 may be changed for impedance matching or the like. According to an embodiment, the communication device 600 may identically apply multi-feeding, through a symmetrical structure, even to a structure supporting two circularly polarized waves (e.g. RHCP or LHCP) rather than a structure supporting dual polarized waves in which neighboring feed parts are arranged to be perpendicular to each other.

Figure 7A:
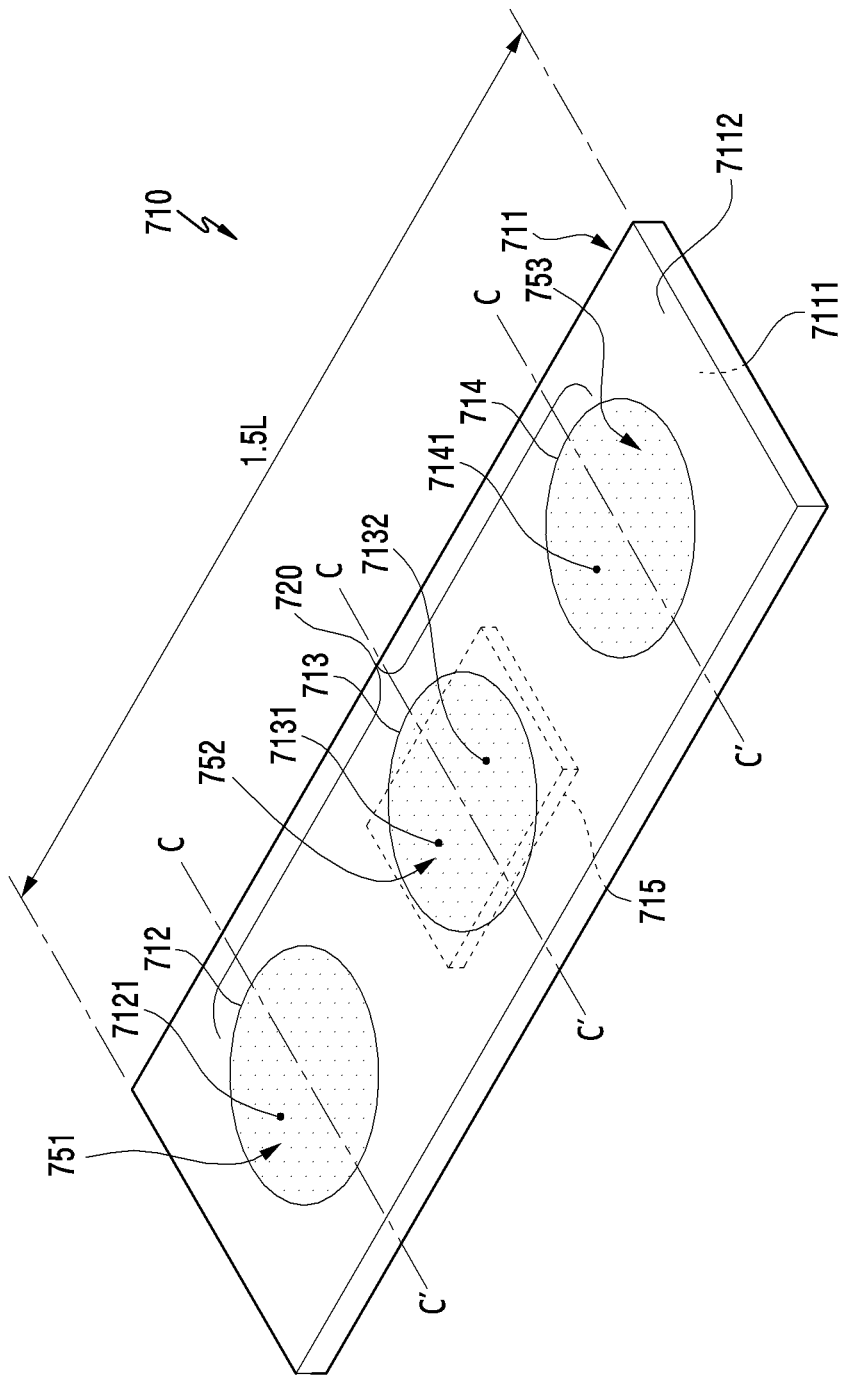
FIG. 7A is a diagram illustrating a configuration of a communication device according to various embodiments of the disclosure.

FIG. 7A is a diagram illustrating a configuration of a communication device 710 according to various embodiments of the disclosure.

The communication device 710 in FIG. 7A may be at least partially similar to the communication devices 321, 322, 323, and 324 in FIG. 3A, or may include other embodiments of the communication devices 321, 322, 323, and 324.

FIG. 7A illustrates the communication device 710 in which antenna elements 712 and 714 employing single-feeding and an antenna element 713 employing multi-feeding (e.g. double-feeding) are mixed.

Referring to FIG. 7A, the communication device 710 may include a substrate 711, an antenna array 720 disposed in the substrate 711, and a wireless communication circuit 715 (e.g. the communication circuit 362 in FIG. 3B) electrically connected to the antenna array 720. According to an embodiment, the antenna array 720 may include a first antenna 751, a second antenna 752, and a third antenna 753 arranged in the substrate 711 at predetermined intervals. According to an embodiment, the first antenna 751 may include a first antenna element 712. According to an embodiment, the second antenna 752 may include a second antenna element 713. According to an embodiment, the third antenna 753 may include a third antenna element 714. According to an embodiment, the communication device 710 may include the wireless communication circuit 715 electrically connected to the first antenna element 712, the second antenna element 713, or the third antenna element 714. According to an embodiment, the wireless communication circuit 715 may be configured to transmit or receive at least one signal having a frequency band of 10 GHz-100 GHz through the first antenna element 712, the second antenna element 713, or the third antenna element 714.

According to various embodiments, the antenna elements 712, 713, and 714 arranged on a second surface 7112 of the substrate 711 at predetermined intervals may be electrically connected to the wireless communication circuit 715 disposed on a first surface 7111 of the substrate 711. According to an embodiment, the communication device 710 may include the wireless communication circuit 715 having four feeding ports, or the antenna elements 712, 713, and 714 arranged in the substrate 711. According to an embodiment, the first antenna element 712 or the third antenna element 714 may be electrically connected to a corresponding feeding port of the wireless communication circuit 715 through a first feed part 7121 or a fourth feed part 7141 by single-feeding. According to an embodiment, the fourth feed part 7141 may be disposed at the symmetrical opposite side in the third antenna element 714. The fourth feed part is disposed at the maximum distance in order to minimize the interference with internal wiring or a third feed part 7132 of the second antenna element 713, so that the degree of freedom of the internal wiring can be increased. According to an embodiment, the second antenna element 713 disposed between the first antenna element 712 and the third antenna element 714 may be electrically connected to two ports of the wireless communication circuit 715 through a second feed part 7131 and the third feed part 7132 in a double-feeding type. According to an embodiment, the second feed part 7131 and the third feed part 7132 of the second antenna element 713 may be arranged to be symmetric with (face) each other with respect to line C-C' crossing the center of the second antenna element. According to an embodiment, if the wireless communication circuit 715 having four feeding ports is electrically connected to the second antenna element 713 disposed at the center through double-feeding, the length (1.5L) of the substrate 711 may be reduced to be smaller than the length (e.g. 2L) of a substrate of a case in which the wireless communication circuit are electrically connected to four antenna elements through single-feeding. Therefore, the mounting space in an electronic device, in which the communication device is mounted, is efficiently used, so that the electronic device can be slim.

According to various embodiments, if double-feeding is applied to at least one antenna element (e.g. the second antenna element 713) among a plurality of antenna elements (e.g. the first antenna element 712, the second antenna element 713, or the third antenna element 714), EIRP drop can be reduced as described above. For example, referring to <Table 1> above, when a gain of each antenna element is 5 dBi and the input power of one feeding port is 10 dBm, in a comparison of the communication device of (c) (e.g. FIGS. 7A to 7C) against the communication device of (a), a gain is reduced from 11 dBi to 9.78 dBi somewhat. However, the number of feeding ports is maintained, and thus it is noted that EIRP is decreased from 27 dBm to 25.78 dBm, the drop of which is reduced.

According to various embodiments, if double-feeding is applied to at least one antenna element (e.g. the second antenna element 713 in FIG. 7A) among a plurality of antenna elements (e.g. the antenna elements 712, 713, and 714 in FIG. 7A), for example, double-feeding is applied only to at least one antenna element (e.g. the second antenna element 713 in FIG. 7A) disposed at the center among a plurality of antenna elements (e.g. the antenna elements 712, 713, and 714 in FIG. 7A), the antenna element (e.g. the second antenna element 713 in FIG. 7A) relatively disposed at the center may radiate higher power compared to the surrounding antenna elements (e.g. the first antenna element 712 and the third antenna element 714 in FIG. 7A) employing single-feeding. Through the configuration, a side lobe level (SLL) can be reduced, and a single beam width can be increased.

For example, <Table 2> below shows a change in a radiation pattern according to a power distribution of a communication device having a (1×3) arrangement of antenna elements. For example, "(d) Single 1:1:1" implies three antenna elements electrically connected to a wireless communication circuit through single feeding, and "(e) Dual 1:2:1" implies one double-fed antenna element disposed between two single-fed antenna elements (e.g. FIG. 7A).

Figure 7B:
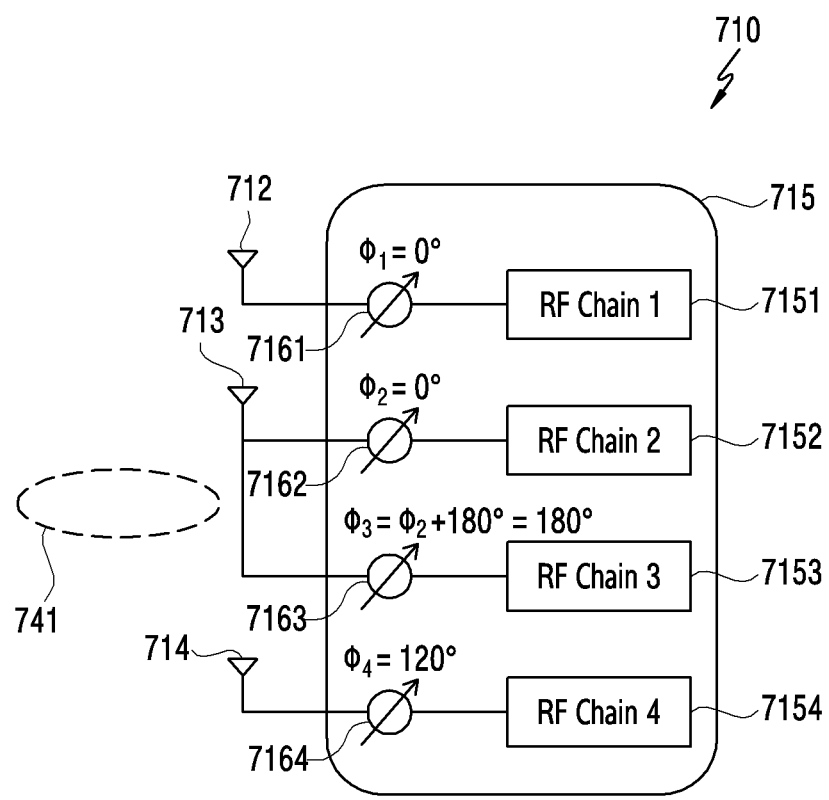
FIG. 7B is a configuration diagram illustrating a feeding structure of the communication device illustrated in FIG. 7A according to various embodiments of the disclosure.

FIG. 7B is a configuration diagram illustrating a feeding structure of the communication device 710 illustrated in FIG. 7A according to various embodiments of the disclosure.

Referring to FIG. 7B, the first antenna element 712 may be electrically connected to a wireless communication circuit (e.g. the wireless communication circuit 715 in FIG. 7A) through a first RF chain 7151 in a single-feeding type. According to an embodiment, the second antenna element 713 may be electrically connected to a wireless communication circuit (e.g. the wireless communication circuit 715 in FIG. 7A) through a second RF chain 7152 and a third RF chain 7153 in a double-feeding type. According to an embodiment, the third antenna element 714 may be electrically connected to a wireless communication circuit (e.g. the wireless communication circuit 715 in FIG. 7A) through a fourth RF chain 7154 in a single-feeding type. According to an embodiment, the communication device 710 may include phase shifters 7161, 7162, 7163, and 7164 electrically connected to the antenna elements 712, 713, and 714 to have particular phases. According to an embodiment, the phase shifters 7161, 7162, 7163, and 7164 may include the first phase shifter 7161 disposed on the first RF chain 7151 to determine the phase of the first antenna element 712, the second phase shifter 7162 and the third phase shifter 7163 arranged on the second RF chain 7152 and the third RF chain 7153 to determine the phase of the second antenna element 713, respectively, and the fourth phase shifter 7164 disposed on the fourth RF chain 7154 to determine the phase of the third antenna element 714. According to an embodiment, if the first antenna element 712 is fed with power to have a phase of 0-degree through the first RF chain 7151, the second antenna element 713 is fed with power to have a phase of 0-degree through the second RF chain 7152 and is fed with power to have a phase of 180-degree through the third RF chain 7153, and the third antenna element 714 is fed with power to have a phase of 120-degree through the fourth RF chain 7154, beam pattern 741 oriented in an outward direction perpendicular to the second surface 7112 of the substrate 711.

Figure 7C:
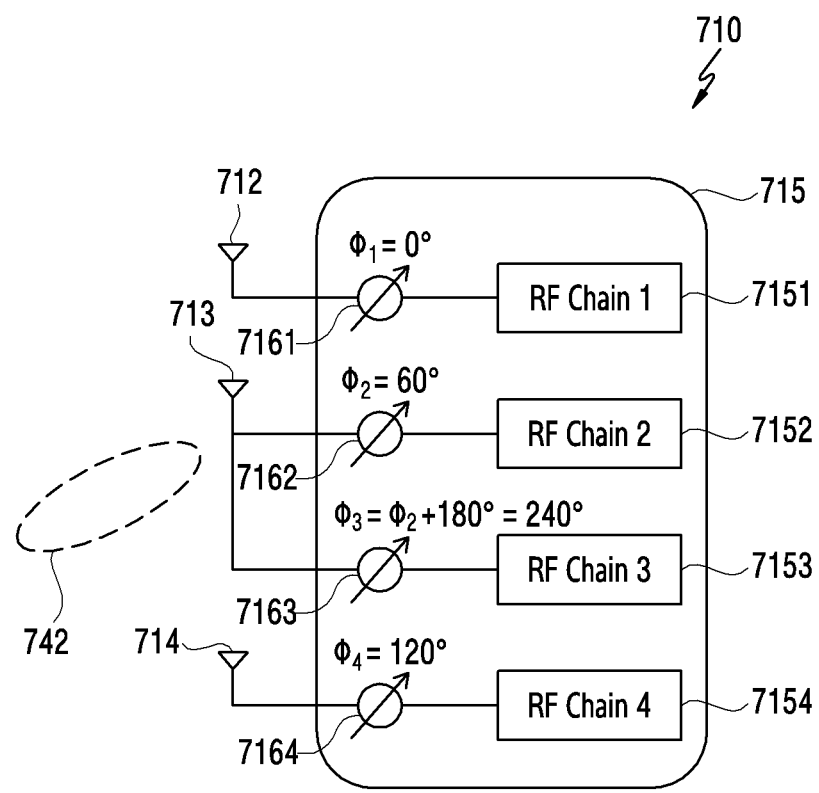
FIG. 7C is a configuration diagram illustrating a feeding structure of a communication device according to various embodiments of the disclosure.

FIG. 7C is a configuration diagram illustrating a feeding structure of the communication device 710 according to various embodiments of the disclosure.

Referring to FIG. 7C, the first antenna element 712 may be electrically connected to a wireless communication circuit (e.g. the wireless communication circuit 715 in FIG. 7A) through a first RF chain 7151 in a single-feeding type. According to an embodiment, the second antenna element 713 may be electrically connected to a wireless communication circuit (e.g. the wireless communication circuit 715 in FIG. 7A) through a second RF chain 7152 and a third RF chain 7153 in a double-feeding type. According to an embodiment, the third antenna element 713 may be electrically connected to a wireless communication circuit (e.g. the wireless communication circuit 715 in FIG. 7A) through a fourth RF chain 7154 in a single-feeding type. According to an embodiment, two feed parts (e.g. the second feed part 7131 or the third feed part 7132 in FIG. 7A) of the second antenna element 713 may be fed with power to have a phase difference of 180-degree through the second RF chain 7152 and the third RF chain 7153. For example, if one feed part (e.g. the second feed part 7131 in FIG. 7A) of the second antenna element 713 may be fed with power to have a phase of 60-degree through the second RF chain 7152, the remaining one feed part (e.g. the third feed part 7132 in FIG. 7A) of the second antenna element 713 may be fed with power to have a phase of 240-degree through the third RF chain 7153.

According to various embodiments, the direction of a beam pattern of a communication device (e.g. the communication device 710 in FIG. 7A) may be changed using the phase difference of at least one antenna element among a plurality of antenna elements. For example, if the first antenna element 712 is fed with power to have a phase of 0-degree through the first RF chain 7151, the second antenna element 713 is fed with power to have a phase of 60-degree through the second RF chain 7152 and is fed with power to have a phase of 240-degree through the third RF chain 7153, and the third antenna element 714 is fed with power to have a phase of 120-degree through the fourth RF chain 7154, a beam pattern 742 of a communication device 710 may be configured to be oriented outward from the second surface 7112 of the substrate 711 and biased toward the third antenna element 714.

Figure 8:
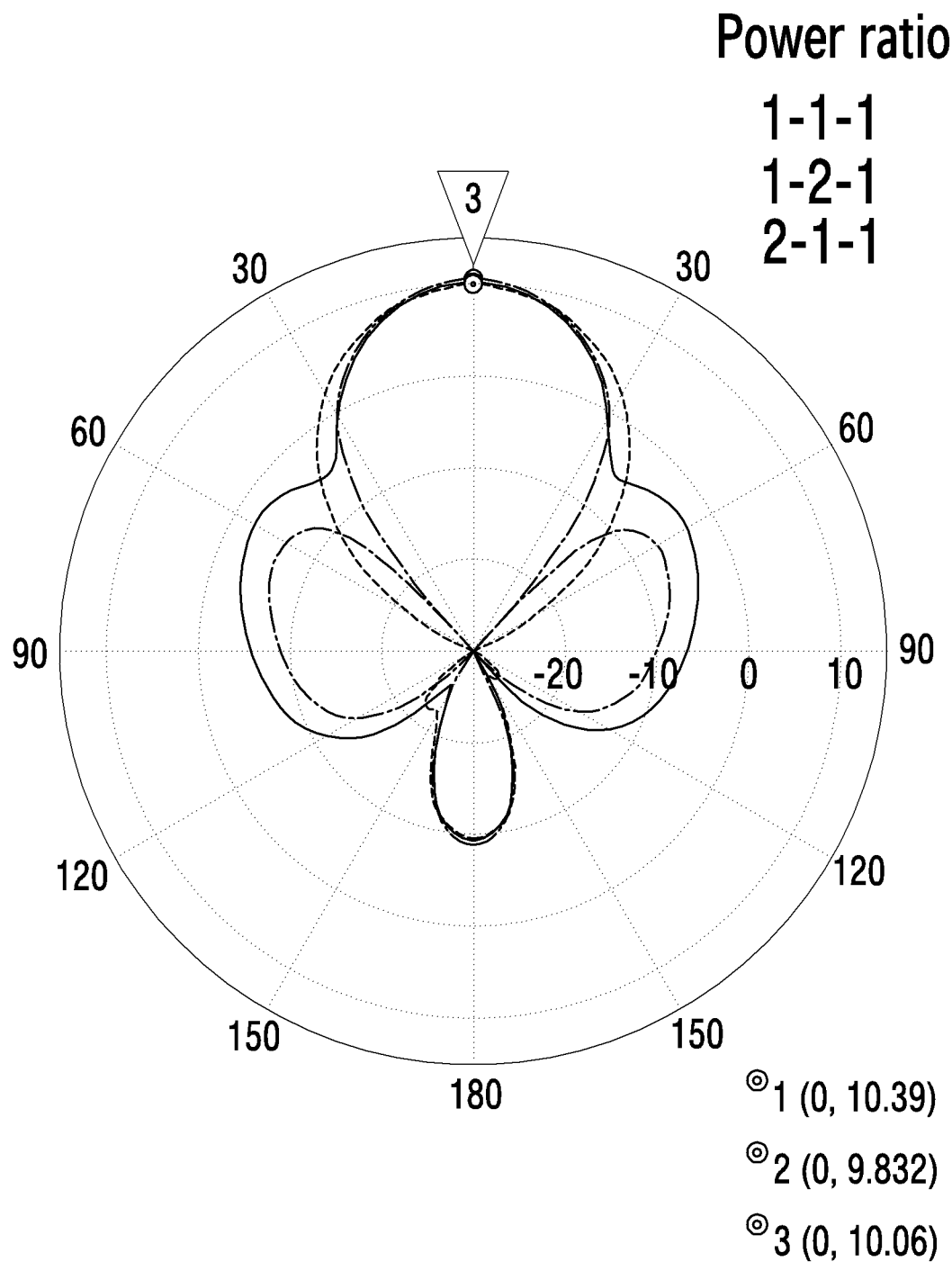
FIG. 8 is a diagram illustrating a comparison between a radiation pattern of the communication device illustrated in FIGS. 7A to 7C and a radiation pattern of a conventional communication device according to various embodiments of the disclosure.

FIG. 8 is a diagram illustrating a comparison between a radiation pattern of the communication device illustrated in FIG. 7A and a radiation pattern of a conventional communication device according to various embodiments of the disclosure.

TABLE 2

| Power Ratio | (d) Single 1:1:1 | (e) Dual 1:2:1 |
|---|---|---|
| Peak Gain(dBi) | 10.39 | 9.83 |
| Single Beam 3 dB BW | 32.9° | 37.5° |
| SLL(dB) | −13 dB | −42 dB |

Referring to <Table 2> and FIG. 8, in comparison of a case of (e) against a case of (d), it is noted that an SLL is significantly reduced from −13 dB to −42 dB, and a single beam width is also significantly increased from 32.9° to 37.5°.

Figure 9A:
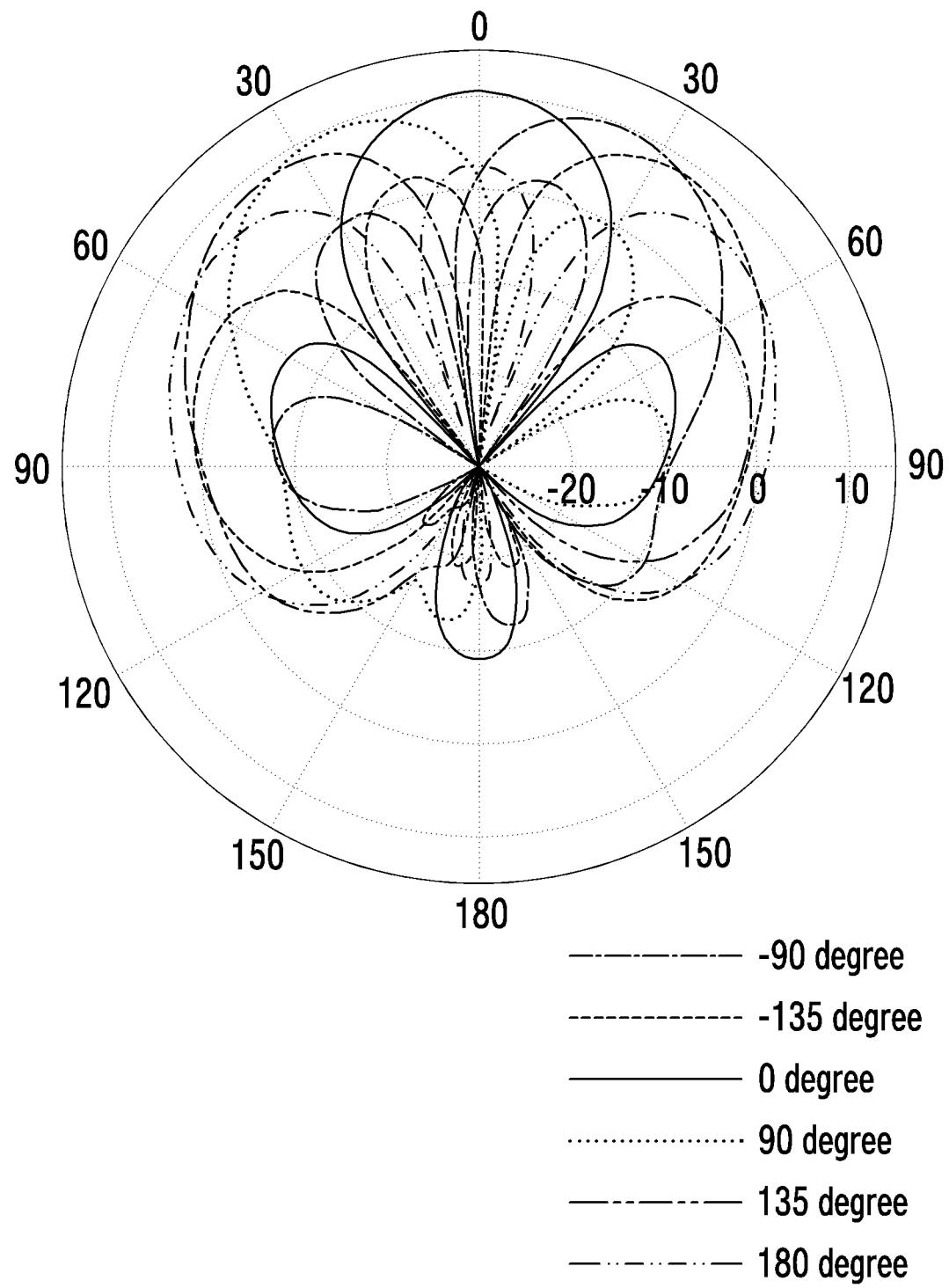
FIG. 9A is a diagram illustrating a radiation pattern of an antenna including three antenna elements, each of which is single-fed with power according to a conventional technology.
Figure 9B:
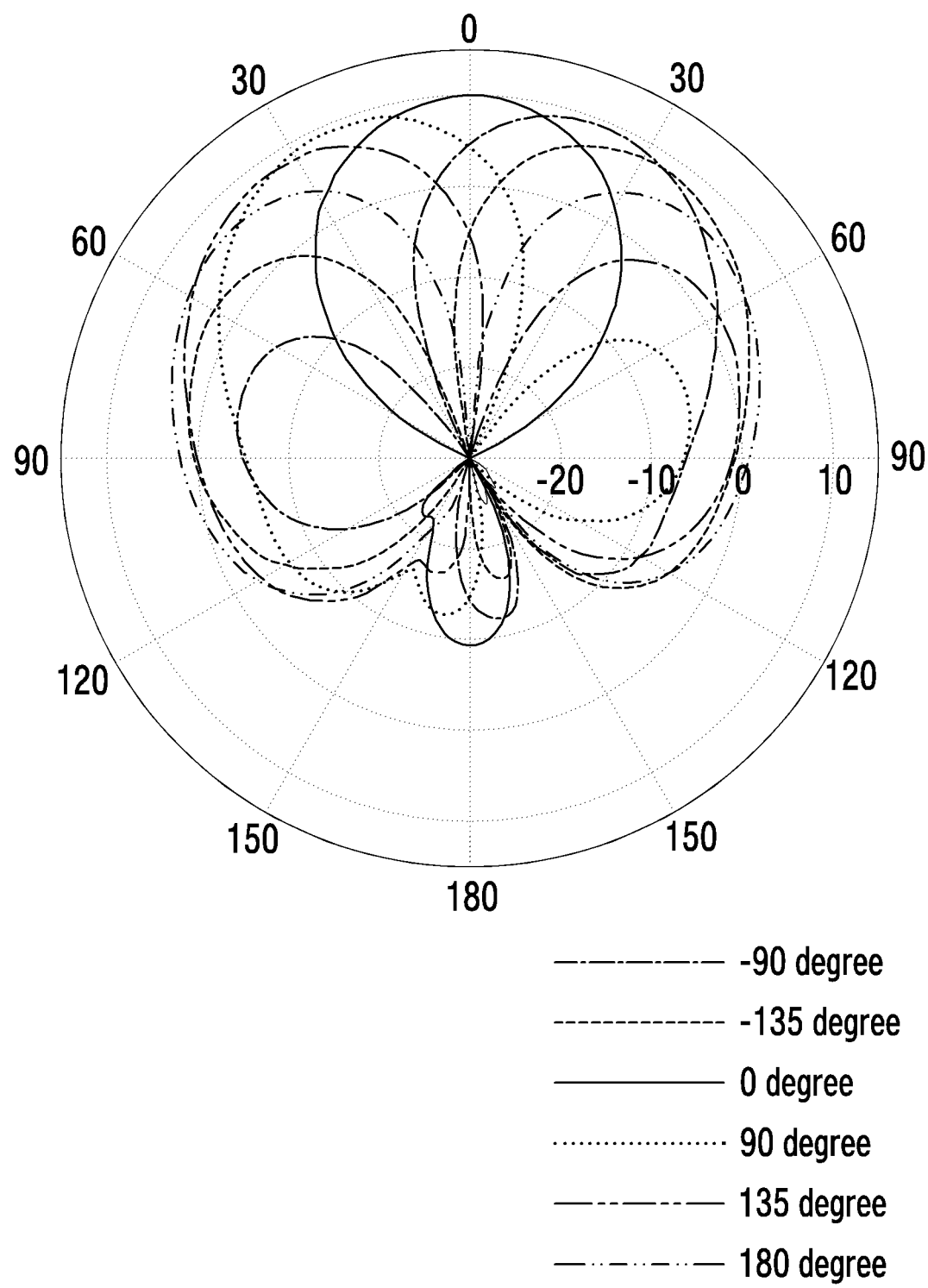
FIG. 9B is a diagram illustrating a radiation pattern of the communication device illustrated in FIGS. 7A to 7C according to various embodiments of the disclosure.

FIG. 9A is a diagram illustrating a radiation pattern of an antenna having three antenna element 712, 713, and 714 which is single-fed with power according to a conventional technology, and FIG. 9B is a diagram illustrating a radiation pattern of the communication device 710 in FIGS. 7A to 7C according to various embodiments of the disclosure. It is noted that in the case of (e), beamforming is smoothly performed in a corresponding direction.

According to various embodiments, in the communication device 710, only the second antenna element 713 disposed at the center among the three antenna elements 712, 713, and 714 is implemented in double-feeding, so that EIRP drop is reduced or an SLL is reduced, but the disclosure is not limited thereto. For example, a communication device including four or more antenna elements arranged therein may be implemented such that at least one antenna element disposed substantially at the center in the communication device is double-fed with power.

FIGS. 10A to 10H are diagrams illustrating communication devices 1010, 1020, 1030, and 1040 that are multi-fed with power by using a switching device according to various embodiments of the disclosure.

The communication devices 1010, 1020, 1030, and 1040 in FIGS. 10A to 10H may be at least partially similar to the communication devices 321, 322, 323, and 324 in FIG. 3A, or may include other embodiments of the communication devices 321, 322, 323, and 324.

Figure 10A:
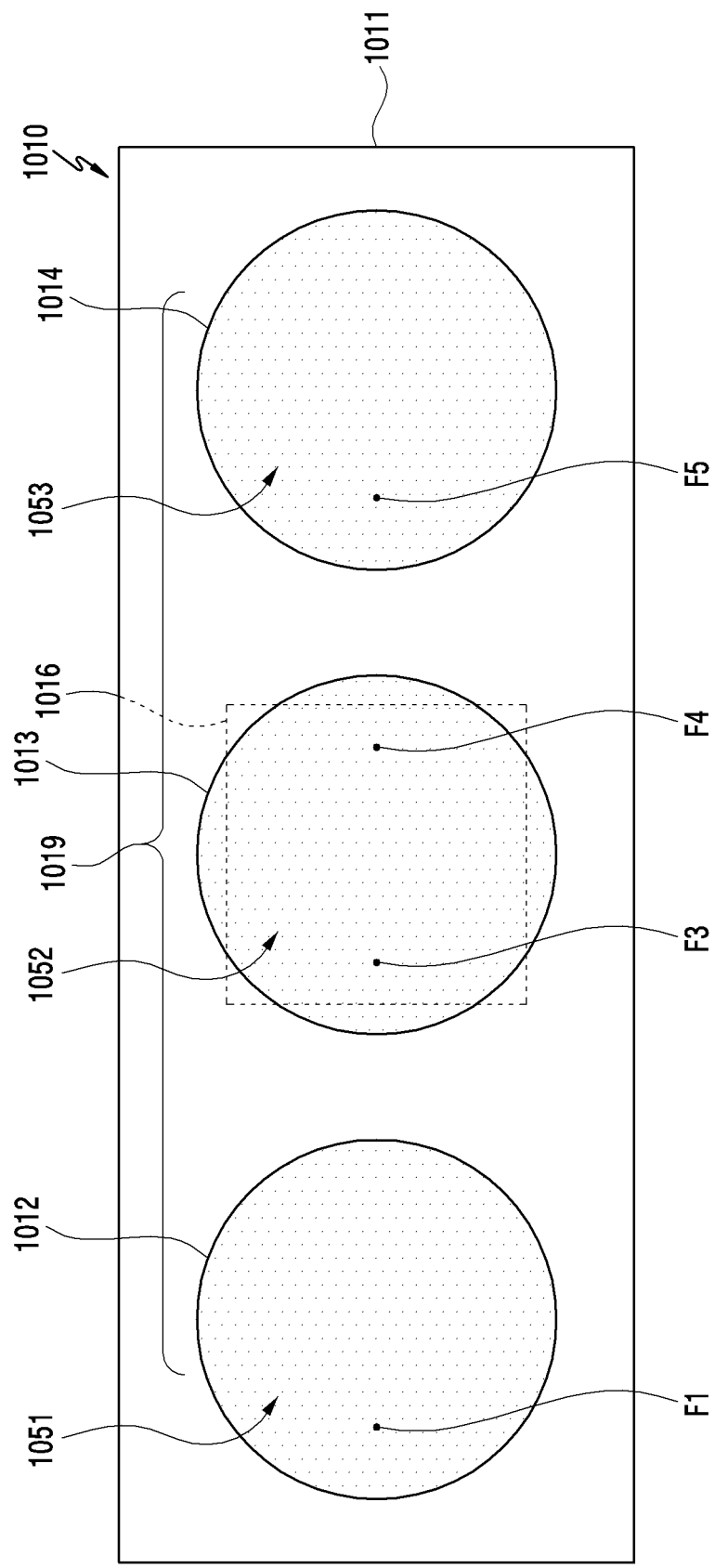

Referring to FIGS. 10A and 10B, the communication device 1010 may include an antenna array 1019 disposed in a substrate 1011. According to an embodiment, the antenna array 1019 may include a first antenna 1051, a second antenna 1052, and a third antenna 1053 arranged in the substrate 1010 at predetermined intervals. According to an embodiment, the first antenna 1051 may include a first antenna element 1012. According to an embodiment, the second antenna 1052 may include a second antenna element 1013. According to an embodiment, the third antenna 1053 may include a third antenna element 1014. According to an embodiment, the first antenna element 1012 and the third antenna element 1014 may be electrically connected to a wireless communication circuit 1016 through a first feed part F1 and a fourth feed part F5 by a single-feeding type, respectively. According to an embodiment, the second antenna element 1013 may be disposed between the first antenna element 1012 and the third antenna element 1014, and may be electrically connected to the wireless communication circuit 1016 through a second feed part F3 and a third feed part F4 by double-feeding. According to an embodiment, the third feed part F4 may be disposed at the symmetrical opposite side in the third antenna element 1014. The third feed part is disposed at the maximum distance in order to minimize the interference with internal wiring or the third feed part F4 of the second antenna element 1013, so that the degree of freedom of the internal wiring can be increased.

According to various embodiments, the communication device 1010 may include a switching device 1015 interposed between the antenna elements 1012, 1013, and 1014 and a plurality of feeding ports P1-P6 of the wireless communication circuit 1016. According to an embodiment, an electronic device (e.g. the electronic device 200 in FIG. 2A) may control the switching device 1015 to electrically connect the second antenna element 1013 among the antenna elements 1012, 1013, and 1014 with the wireless communication circuit 1016 by a double-feeding type. For example, the first antenna element 1012 and the third antenna element 1014 may be electrically connected to a first port P1 and a fifth port P5 through the switching device 1015 by a single-feeding type, respectively. According to an embodiment, the second antenna element 1013 may be electrically connected to the wireless communication circuit 1016 in a double-feeding type by using a third port P3 and a fourth port P4 of the wireless communication circuit 1016.

Figure 10C:
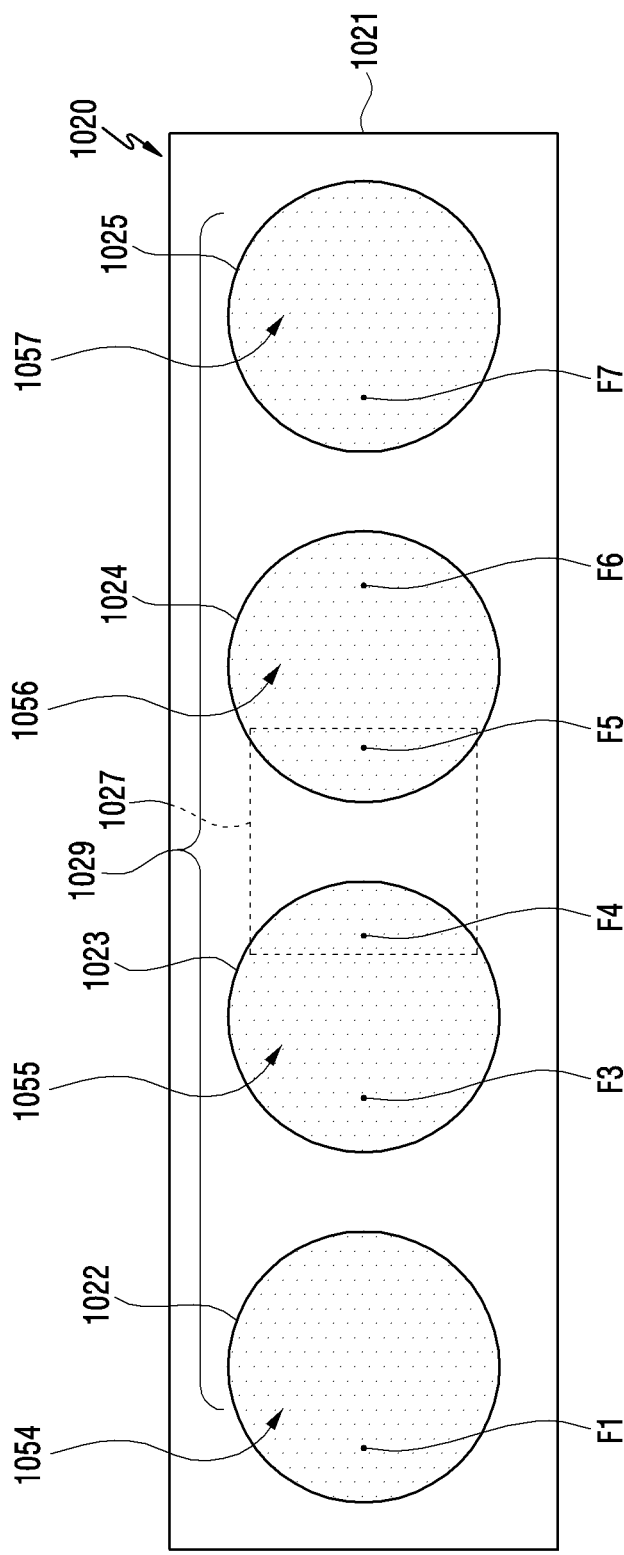
Figure 10D:
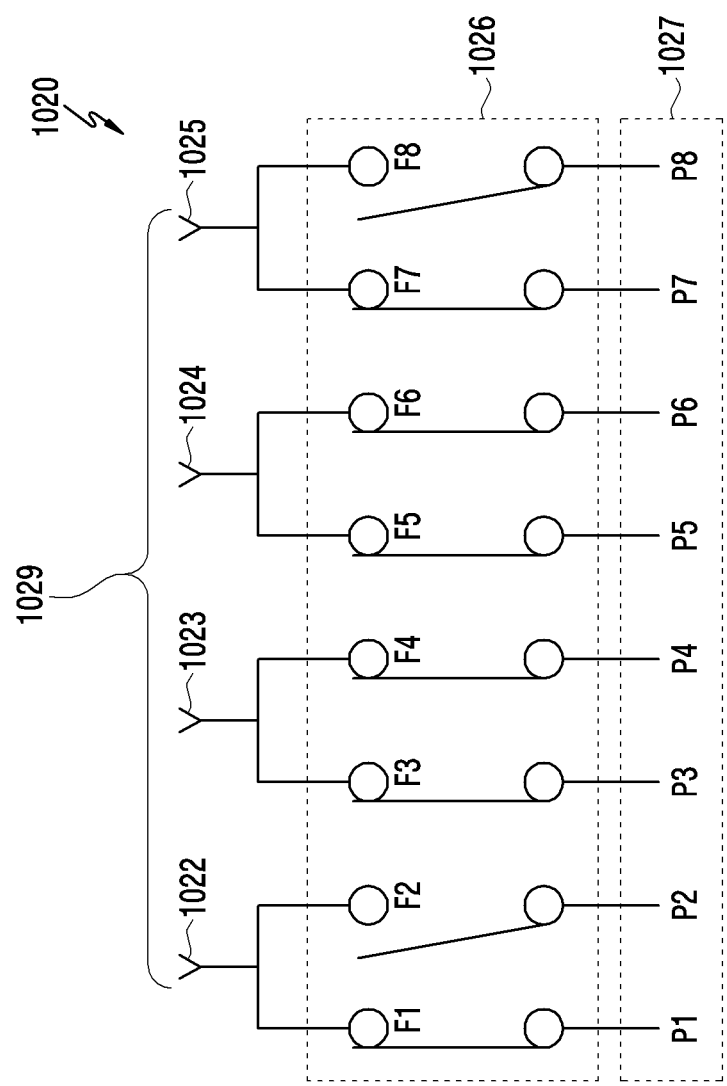

Referring to FIGS. 10C and 10D, the communication device 1020 may include an antenna array 1029 disposed in a substrate 1021. According to an embodiment, the antenna array 1029 may include a first antenna 1054, a second antenna 1055, a third antenna 1056, and a fourth antenna 1057 arranged in the substrate 1020 at predetermined intervals. According to an embodiment, the first antenna 1054 may include a first antenna element 1022. According to an embodiment, the second antenna 1055 may include a second antenna element 1023. According to an embodiment, the third antenna 1056 may include a third antenna element 1024. According to an embodiment, the fourth antenna 1057 may include a fourth antenna element 1025. According to an embodiment, each of the first antenna element 1022 and the fourth antenna element 1025 may be electrically connected to a wireless communication circuit 1027 through one feed part, for example, a first feed part F1 or a sixth feed part F7 by a single-feeding type, respectively. According to an embodiment, the second antenna element 1023 and the third antenna element 1024 may be arranged between the first antenna element 1022 and the fourth antenna element 1025, and each of the second antenna element and the third antenna element may be electrically connected to the wireless communication circuit 1027 through two feed parts, for example, a second feed part F3 and a third feed part F4, or a fourth feed part F5 and a fifth feed part F6 by double-feeding. According to an embodiment, the sixth feed part F7 may be disposed at the symmetrical opposite side in the fourth antenna element 1057. The sixth feed part is disposed at the maximum distance in order to minimize the interference with internal wiring or the fifth feed part F6 of the third antenna element 1056, so that the degree of freedom of the internal wiring can be increased.

According to various embodiments, the communication device 1020 may include a switching device 1026 interposed between the antenna elements 1022, 1023, 1024, and 1025 and a plurality of feeding ports P1-P8 of the wireless communication circuit 1027. According to an embodiment, an electronic device may control the switching device 1026 to electrically connect the second antenna element 1023 or the third antenna element 1024 among the antenna elements 1022, 1023, 1024, and 1014 with the wireless communication circuit 1027 by a double-feeding type. For example, the first antenna element 1022 and the fourth antenna element 1025 may be electrically connected to a first port P1 and a seventh port P7 through the switching device 1026 by a single-feeding type, respectively. According to an embodiment, the second antenna element 1023 may be electrically connected to the wireless communication circuit 1027 in a double-feeding type by using a third port P3 and a fourth port P4 of the wireless communication circuit 1027. According to an embodiment, the third antenna element 1024 may be electrically connected to the wireless communication circuit 1027 in a double-feeding type by using a fifth port P5 and a sixth port P6 of the wireless communication circuit 1027.

Figure 10E:
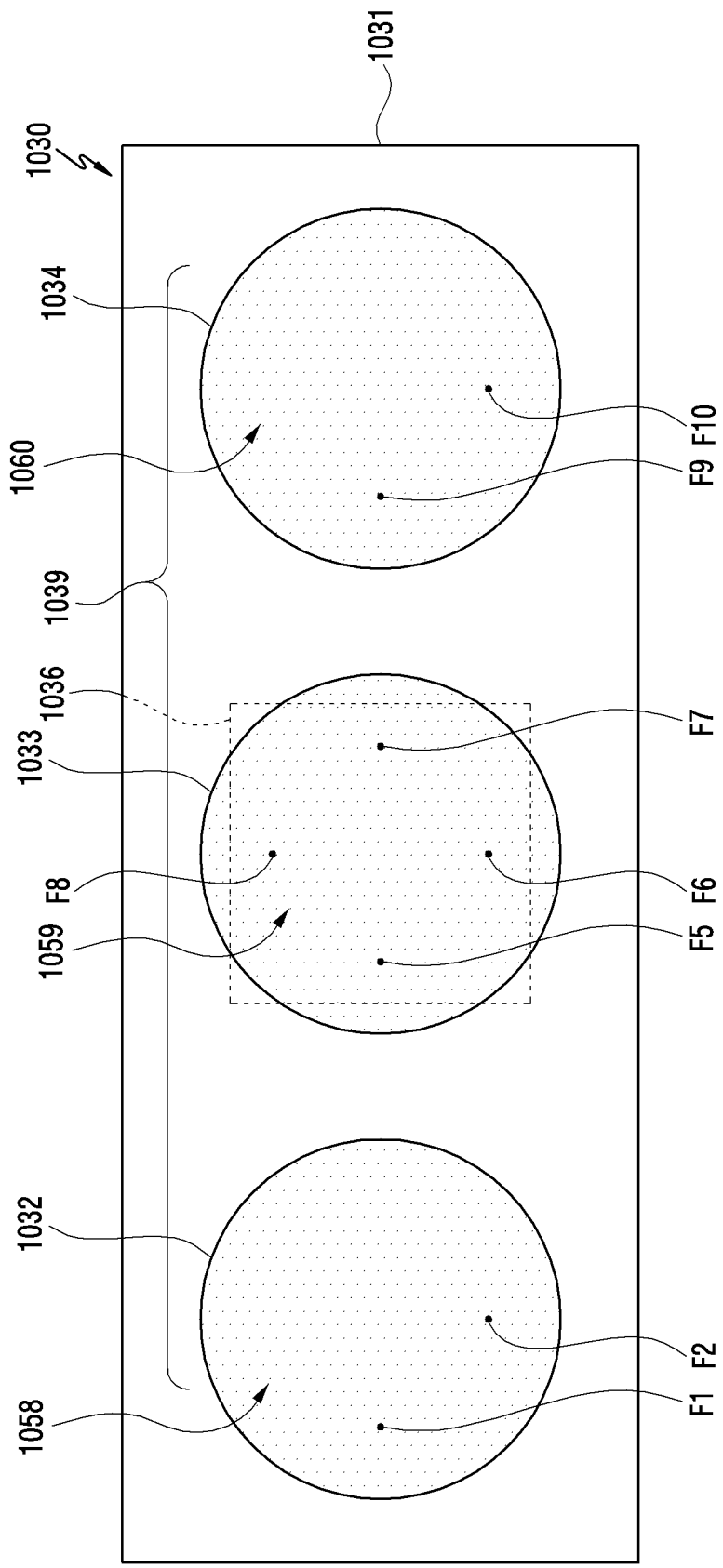
Figure 10F:
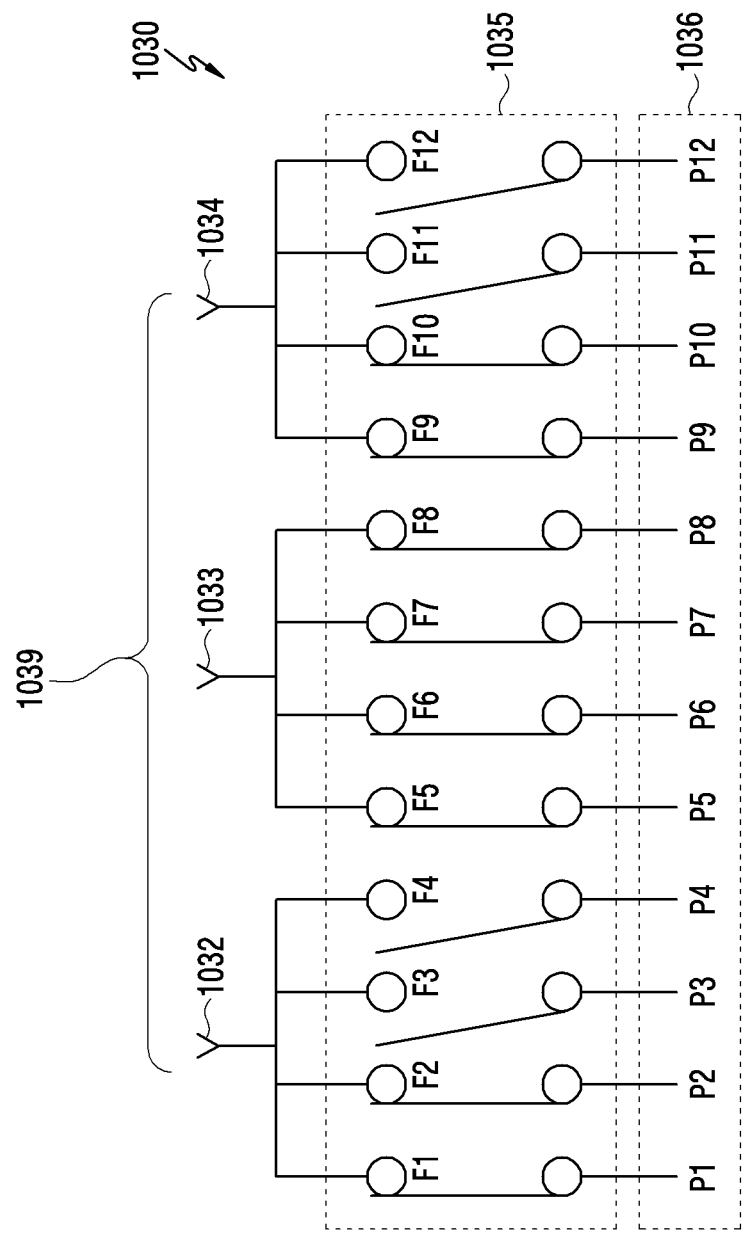

Referring to FIGS. 10E and 10F, the communication device 1030 may include an antenna array 1039 disposed in a substrate 1031. According to an embodiment, the antenna array 1039 may include a first antenna 1058, a second antenna 1059, and a third antenna 1060 arranged in the substrate 1030 at predetermined intervals. According to an embodiment, the first antenna 1058 may include a first antenna element 1032. According to an embodiment, the second antenna 1059 may include a second antenna element 1033. According to an embodiment, the third antenna 1060 may include a third antenna element 1034. According to an embodiment, each of the first antenna element 1032 and the third antenna element 1034 may be electrically connected to a wireless communication circuit 1036 through two feed parts, for example, a first feed part F1 and a second feed part F2, or a seventh feed part F9 and an eighth feed part F10 by a type of single-feeding each polarized wave among dual polarized waves. According to an embodiment, the second antenna element 1033 may be disposed between the first antenna element 1032 and the third antenna element 1034, and may be electrically connected to the wireless communication circuit 1036 through four feed parts, for example, a third feed part F5, a fourth feed part F6, a fifth feed part F7, and a sixth feed part F8 by double-feeding of each polarized wave among dual polarized waves. According to an embodiment, the seventh feed part F9 may be disposed at the symmetrical opposite side in the third antenna element 1034. The seventh feed part is disposed at the maximum distance in order to minimize the interference with internal wiring or the fifth feed part F7 of the second antenna element 1033, so that the degree of freedom of the internal wiring can be increased.

According to various embodiments, the communication device 1030 may include a switching device 1035 interposed between the antenna elements 1032, 1033, and 1034 and a plurality of feeding ports P1-P12 of the wireless communication circuit 1016. According to an embodiment, an electronic device (e.g. the electronic device 200 in FIG. 2A) may control the switching device 1035 to electrically connect the second antenna element 1033 among the antenna elements 1032, 1033, and 1034 with the wireless communication circuit 1036 by a type of double-feeding each polarized wave among dual polarized waves. For example, the first antenna element 1032 and the third antenna element 1034 may be electrically connected to a first port P1, a second port P2, a ninth port P9, and a tenth port P10 through the switching device 1035 by a type of single-feeding each polarized wave among dual polarized waves. According to an embodiment, the second antenna element 1033 may be electrically connected to the wireless communication circuit 1036 in a type of double-feeding each polarized wave among dual polarized waves by using a fifth port P5, a sixth port P6, and a seventh port P7, and an eighth port P8 of the wireless communication circuit 1036.

Figure 10G:
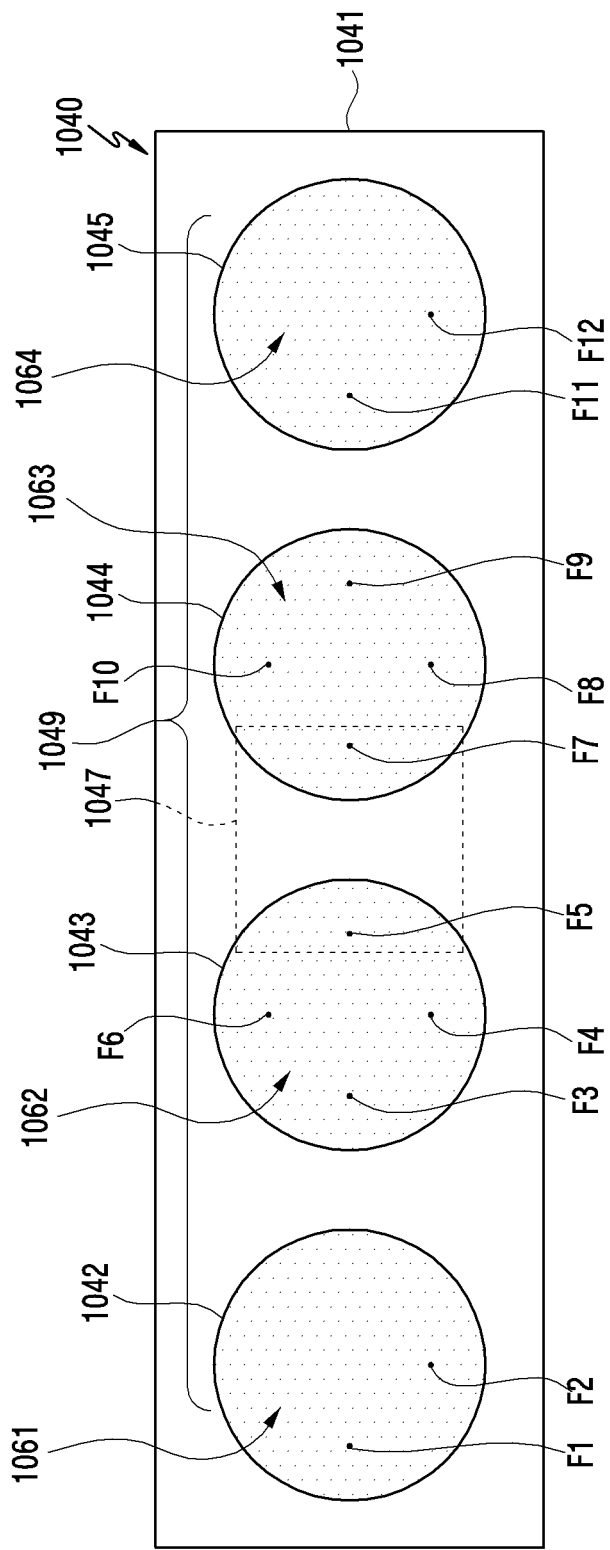
Figure 10H:
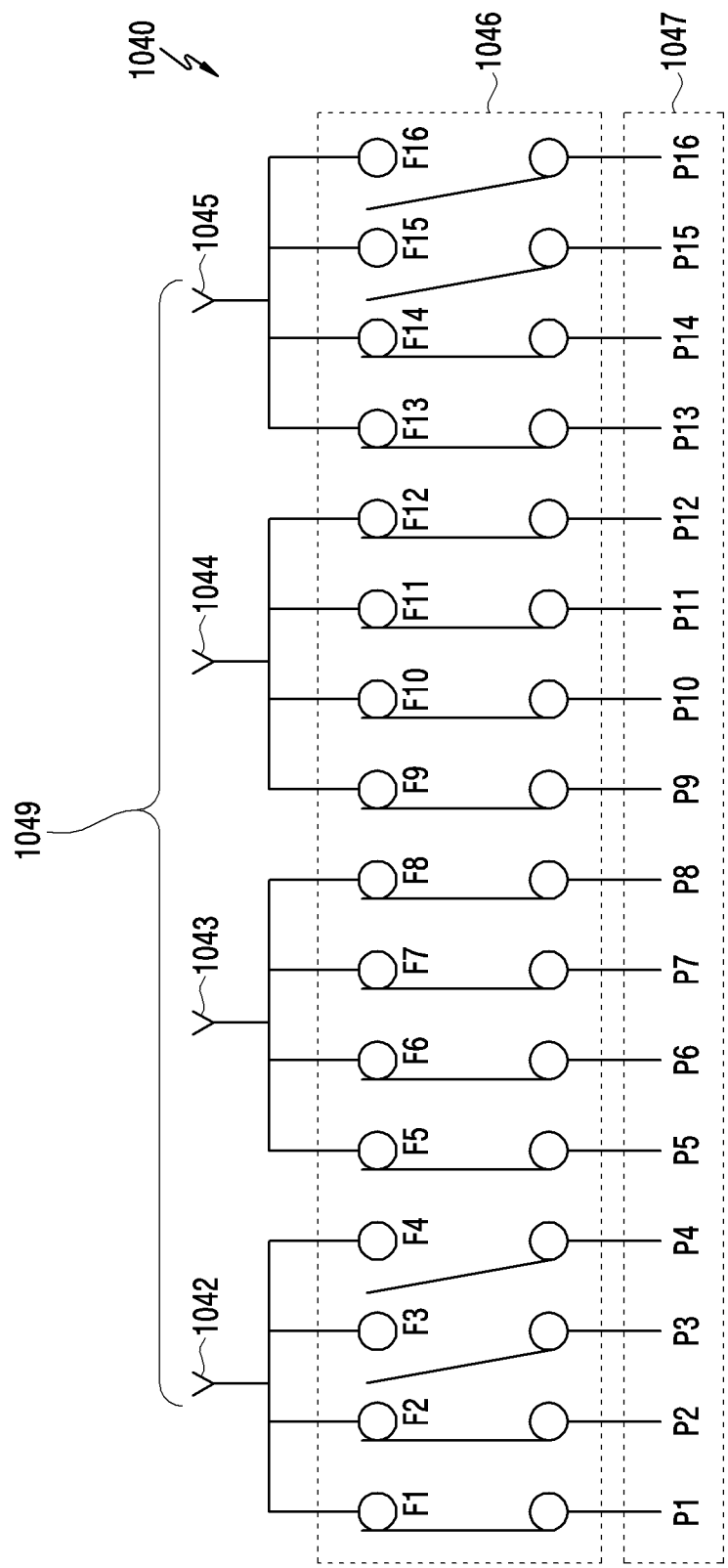

Referring to FIGS. 10G and 10H, the communication device 1040 may include an antenna array 1049 disposed in a substrate 1041. According to an embodiment, the antenna array 1049 may include a first antenna 1061, a second antenna 1062, a third antenna 1063, and a fourth antenna 1064 arranged in the substrate 1040 at predetermined intervals. According to an embodiment, the first antenna 1061 may include a first antenna element 1042. According to an embodiment, the second antenna 1062 may include a second antenna element 1043. According to an embodiment, the third antenna 1063 may include a third antenna element 1044. According to an embodiment, the fourth antenna 1064 may include a fourth antenna element 1045. According to an embodiment, each of the first antenna element 1042 and the fourth antenna element 1045 may be electrically connected to a wireless communication circuit 1047 through two feed parts, for example, a first feed part F1 and a second feed part F2, or an eleventh feed part F11 and a twelfth feed part F12 by a type of single-feeding each polarized wave among dual polarized waves. According to an embodiment, the second antenna element 1043 and the third antenna element 1044 may be arranged between the first antenna element 1042 and the fourth antenna element 1045, and each of the second antenna element and the third antenna element may be electrically connected to the wireless communication circuit 1047 through four feed parts, for example, a third feed part F3, a fourth feed part F4, a fifth feed part F5, and a sixth feed part F6, or a seventh feed part F7, an eighth feed part F8, a ninth feed part F9, and a tenth feed part F10 by a type of double-feeding each polarized wave among dual polarized waves.

According to various embodiments, the communication device 1040 may include a switching device 1046 interposed between the antenna elements 1042, 1043, 1044, and 1045 and a plurality of feeding ports P1-P16 of the wireless communication circuit 1047. According to an embodiment, an electronic device (e.g. the electronic device 200 in FIG. 2A) may control the switching device 1046 to electrically connect the second antenna element 1043 or the third antenna element 1044 among the antenna elements 1042, 1043, 1044, and 1045 with the wireless communication circuit 1047 by a type of double-feeding each polarized wave among dual polarized waves. For example, the first antenna element 1042 and the fourth antenna element 1045 may be electrically connected to a first port P1, a second port P2, a thirteenth port P13, and a fourteenth port P14 through the switching device 1046 by a type of single-feeding each polarized wave among dual polarized waves. According to an embodiment, the second antenna element 1043 may be electrically connected to the wireless communication circuit 1047 in a type of double-feeding each polarized wave among dual polarized waves by using a fifth port P5, a sixth port P6, and a seventh port P7, and an eighth port P8 of the wireless communication circuit 1047. According to an embodiment, the third antenna element 1044 may be electrically connected to the wireless communication circuit 1047 in a type of double-feeding each polarized wave among dual polarized waves by using a ninth port P9, a tenth port P10, an eleventh port P11, and a twelfth port P12 of the wireless communication circuit 1047.

According to various embodiments, an electronic device (e.g. the electronic device 200 in FIG. 2A) selectively configures an electrical connection between a plurality of ports (e.g. the plurality of ports P1-P6 in FIG. 10B) and antenna elements (e.g. the antenna elements 1012, 1013, and 1014 in FIG. 10A) through a switching device (e.g. the switching device 1015 in FIG. 10B) of a communication device (e.g. the communication device 1010 in FIG. 10A). Through the selective configuration, the electronic device can electrically connect at least one antenna element disposed at a particular position, with a wireless communication circuit by a type of single-feeding, double-feeding, single-feeding each polarized wave among dual polarized waves, and/or double-feeding each polarized wave among dual polarized waves.

Figure 11A:
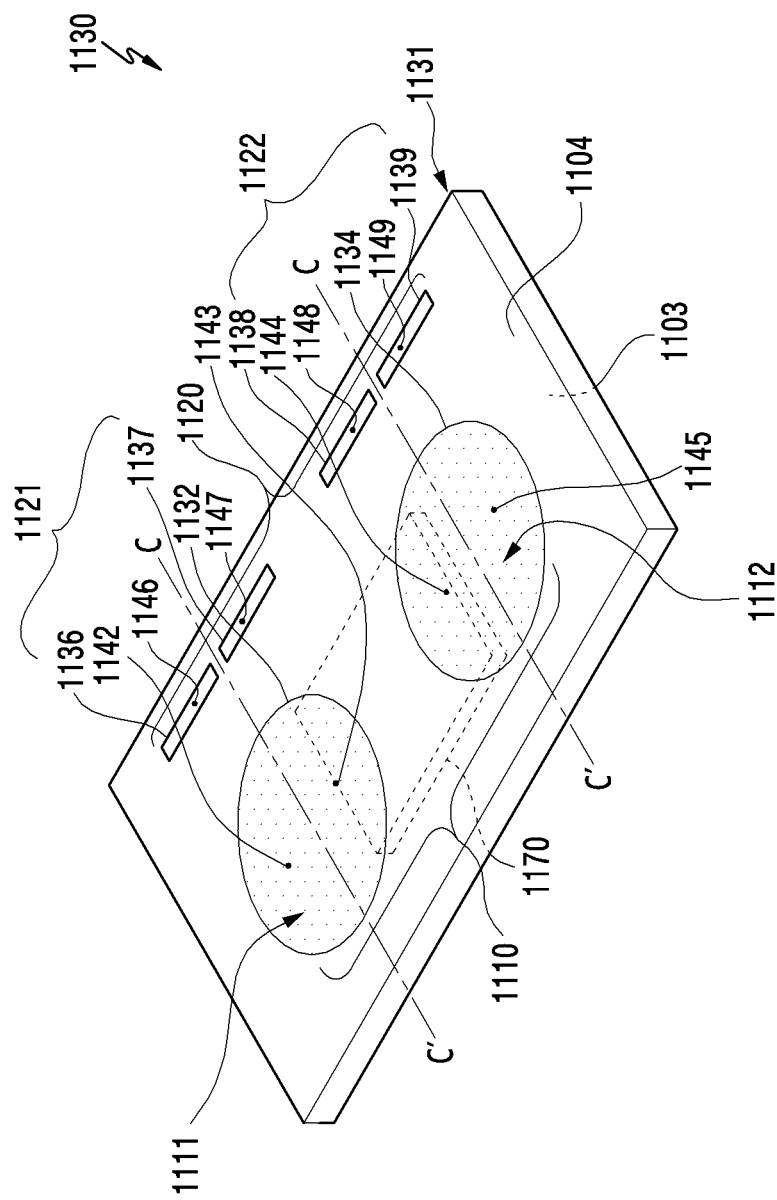
FIGS. 11A and 11B are diagrams illustrating a communication device in which conductive elements arranged in different patterns configure antenna arrays through multi-feeding according to various embodiments of the disclosure.

FIG. 11A is a diagram illustrating a communication device 1130 in which antenna elements arranged to have different shapes configure antenna arrays through multi-feeding according to various embodiments of the disclosure.

The communication device 1130 in FIG. 11A may be at least partially similar to the communication devices 321, 322, 323, and 324 in FIG. 3A, or may include other embodiments of the communication devices.

FIG. 11A illustrates a communication device having a relatively reduced size compared to a conventional communication device through multi-feeding (e.g. double-feeding) applied to conductive elements having different shapes according to an exemplary embodiment of the disclosure.

Referring to FIG. 11A, the communication device 1130 may include a substrate 1131, a first antenna array 1110 disposed in the substrate 1131 to have a predetermined spacing, and a second antenna array 1120 disposed near the first antenna array 1110. According to an embodiment, the first antenna array 1110 may include a first antenna 1111 and a second antenna 1112 arranged on a second surface 1104 of the substrate 1131 at a predetermined interval. According to an embodiment, the first antenna 1111 may include a first antenna element 1132. According to an embodiment, the second antenna 1112 may include a second antenna element 1134. According to an embodiment, the second antenna array 1120 may include a third antenna 1121 disposed near the first antenna 1111 and a fourth antenna 1122 disposed near the second antenna 1112 on the second surface 1104 of the substrate 1131. According to an embodiment, the third antenna 1121 may include a third antenna element 1136 and a fourth antenna element 1137 arranged at a predetermined interval. According to an embodiment, the fourth antenna 1122 may include a fifth antenna element 1138 and a sixth antenna element 1139 arranged at a predetermined interval. According to an embodiment, the communication device 1130 may include a wireless communication circuit 1170 disposed on a first surface 1103 of the substrate 1131 and electrically connected to the first antenna array 1110 and the second antenna array 1120. According to an embodiment, the first antenna array 1110 may be electrically connected to the wireless communication circuit 1170 through a pair of feed parts 1142 and 1143 or 1144 and 1145 arranged to be symmetric with respect to line C-C' crossing the center of each of the first antenna element 1132 and the second antenna element 1134. According to an embodiment, the second antenna array 1120 may be electrically connected to the wireless communication circuit 1170 through a pair of feed parts 1146 and 1147 or 1148 and 1149 arranged on the basis of line C-C' crossing between the third antenna element 1136 and the fourth antenna element 1137, or crossing between the fifth antenna element 1138 and the sixth antenna element 1139. According to an embodiment, each of the first antenna element 1132 and the second antenna element 1134 included in the first antenna array 1110 may be configured by an emitter such as a conductive plate or a conductive patch. According to an embodiment, the third antenna element 1136, the fourth antenna element 1137, the fifth antenna element 1138, and the sixth antenna element 1139 included in the second antenna array 1120 may be configured by dipole emitters such as conductive patterns formed in the substrate 1131. For example, the third antenna element 1136 and the fourth antenna element 1137 may be configured by a single dipole-type emitter. The fifth antenna element 1138, and the sixth antenna element 1139 may be configured by another single dipole emitter. According to an embodiment, the communication device 1130 may be configured to transmit or receive at least one signal having a frequency band of 10 GHz-100 GHz through the wireless communication circuit 1170.

According to various embodiments, the communication device 1130 in FIG. 11A may have eight feeding ports. According to an embodiment, at least one of the first antenna element 1132 and the second antenna element 1134 of the first antenna array 1110, or at least one of the third antenna element 1136, the fourth antenna element 1137, the fifth antenna element 1138, and the sixth antenna element 1139 of the second antenna array 1120 is double-fed with power. Therefore, the first antenna array 1110 and the second antenna array 1120 have a reduced number of antenna elements, so that the volume of the communication device can be reduced.

Figure 11B:
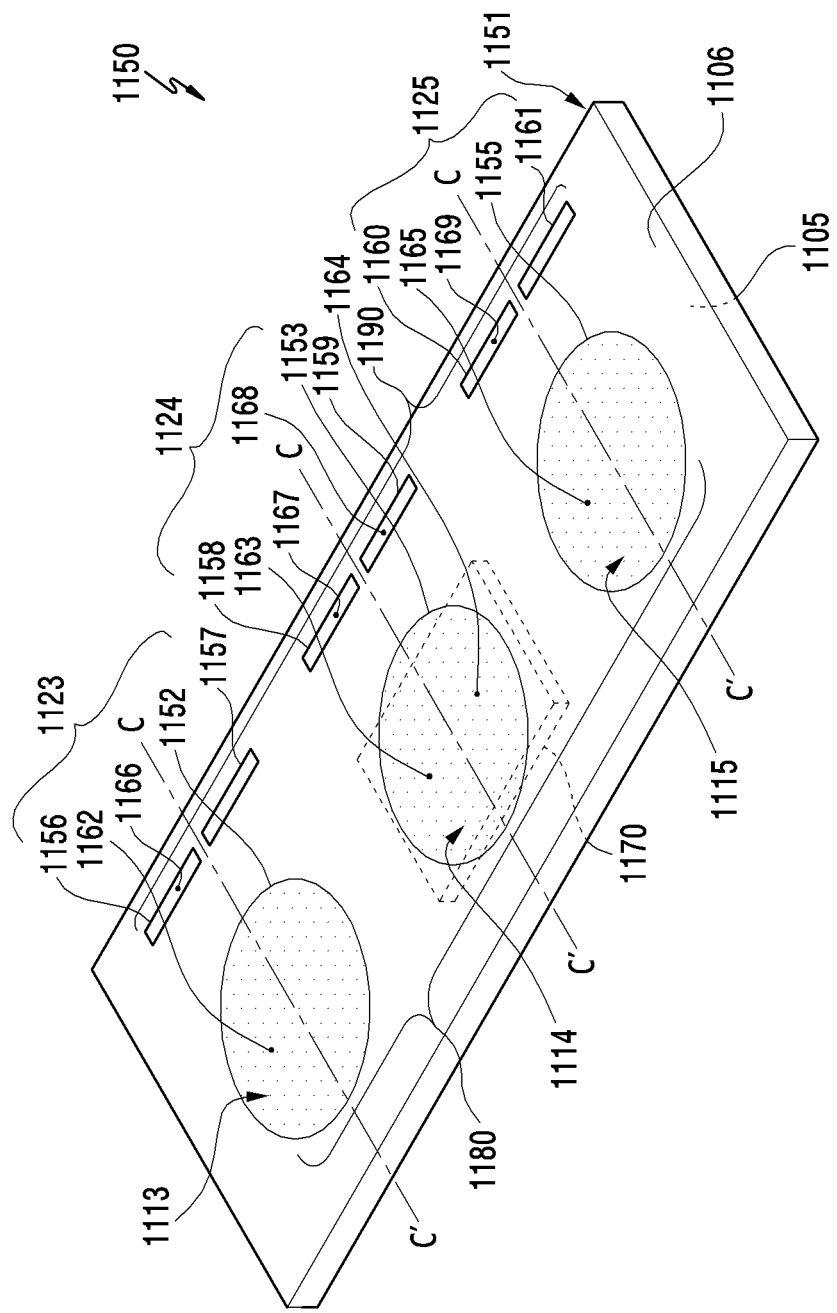

FIG. 11B is a diagram illustrating a communication device 1150 in which conductive elements arranged to have different shapes configure antenna arrays through multi-feeding according to various embodiments of the disclosure.

The communication device 1150 in FIG. 11B may be at least partially similar to the communication devices 321, 322, 323, and 324 in FIG. 3A, or may include other embodiments of the communication devices 321, 322, 323, and 324.

Referring to FIG. 11B, the communication device 1150 may include a substrate 1151, a first antenna array 1180 disposed in the substrate 1151 to have a predetermined spacing, and a second antenna array 1190 disposed near the first antenna array 1180. According to an embodiment, the first antenna array 1180 may include a first antenna 1113, a second antenna 1114, and a third antenna 1115 arranged on a second surface 1106 of the substrate 1151 at predetermined intervals. According to an embodiment, the first antenna 1113 may include a first antenna element 1152. According to an embodiment, the second antenna 1114 may include a second antenna element 1153. According to an embodiment, the third antenna 1115 may include a third antenna element 1155. According to an embodiment, the second antenna array 1190 may include a fourth antenna 1123, a fifth antenna 1124, and a sixth antenna 1125 arranged on a second surface 1106 of the substrate 1151 at predetermined intervals. According to an embodiment, the fourth antenna 1123 may include a fourth antenna element 1156 and a fifth antenna element 1157 arranged at a predetermined interval. According to an embodiment, the fifth antenna 1124 may include a sixth antenna element 1158 and a seventh antenna element 1159 arranged at a predetermined interval. According to an embodiment, the sixth antenna 1125 may include an eighth antenna element 1160 and a ninth antenna element 1161 arranged at a predetermined interval. According to an embodiment, the communication device 1150 may include a wireless communication circuit 1170 disposed on a first surface 1105 of the substrate 1151 and electrically connected to the first antenna array 1180 and the second antenna array 1190. According to an embodiment, each of the plurality of antenna elements 1152, 1153, and 1155 included in the first antenna array 1180 may be configured by an emitter such as a conductive plate or a conductive patch. According to an embodiment, the plurality of antenna elements 1156, 1157, 1158, 1159, 1160, and 1161 included in the second antenna array 1190 may be configured by dipole emitters each having a conductive pattern formed in the substrate 1151. For example, the fourth antenna element 1156 and the fifth antenna element 1157 may be configured by a single dipole-type emitter. For example, the sixth antenna element 1158 and the seventh antenna element 1159 may be configured by another single dipole-type emitter. The eighth antenna element 1160 and the ninth antenna element 1161 may be configured by yet another single dipole emitter.

According to various embodiments, the first antenna element 1152 or the third antenna element 1155 of the first antenna array 1180 may be electrically connected to the wireless communication circuit 1170 through a first feed part 1162 or a fourth feed part 1165. According to various embodiments, the fourth antenna element 1156 or the eighth antenna element 1160 of the second antenna array 1190 may be electrically connected to the wireless communication circuit 1170 through a fifth feed part 1166 or an eighth feed part 1169. According to various embodiments, the second antenna element 1153 may be disposed between the first antenna element 1152 and the third antenna element 1155 of the first antenna array 1180, and may be electrically connected to the wireless communication circuit 1170 through a second feed part 1163 and/or a third feed part 1164. According to an embodiment, the sixth antenna element 1158 and the seventh antenna element 1159 of the second antenna array 1190 may be disposed between the fifth antenna element 1157 and the eighth antenna element 1160, and may be electrically connected to the wireless communication circuit 1170 through a sixth feed part 1167 and/or a seventh feed part 1168.

According to various embodiments, if double-feeding is applied to at least one of antennas configured by the plurality of antenna elements 1152, 1153, and 1155 of the first antenna array 1180 and/or the plurality of antenna elements 1156, 1157, 1158, 1159, 1160, and 1161 of the second antenna array 1190, the EIRP drop of the communication device 1150 can be reduced in spite of a decrease in the volume. According to an embodiment, if double-feeding is applied to at least one of antennas configured by the plurality of antenna elements 1152, 1153, and 1155 of the first antenna array 1180 and/or the plurality of antenna elements 1156, 1157, 1158, 1159, 1160, and 1161 of the second antenna array 1190, for example, if the at least one antenna employing double-feeding is disposed at the center of the other antennas, the antenna relatively disposed at the center may radiate higher power compared to the surrounding antennas employing single-feeding. Through the configuration, an SLL can be reduced, and a single beam width can be increased.

FIG. 12 is a perspective view of a communication device according to various embodiments of the disclosure.

The communication device 1200 in FIG. 12 may be at least partially similar to the communication devices 321, 322, 323, and 324 in FIG. 3A, or may include other embodiments of the communication devices 321, 322, 323, and 324.

Referring to FIG. 12, the communication device 1200 may include a substrate 1210. According to an embodiment, the substrate 1210 may include a first surface 1211, a second surface 1213 oriented in the opposite direction to the first surface 1211, and a side surface 1213 surrounding a space between the first surface 1211 and the second surface 1212. According to an embodiment, the substrate 1210 may be disposed such that the second surface 1212 is oriented toward a back plate (e.g. the back plate 211 in FIG. 2B) of an electronic device (e.g. the electronic device 200 in FIG. 2B). However, the disclosure is not limited thereto, and the substrate 1210 may be disposed such that the second surface 1212 of the substrate is oriented toward a side member (e.g. the side member 216 in FIG. 2A) or a front plate (e.g. the front plate 202 in FIG. 2A) of an electronic device.

According to various embodiments, the communication device 1200 may include a first antenna array 1214, a second antenna array 1215, a third antenna array 1216, a fourth antenna array 1217, and a fifth antenna array 1218 arranged in the substrate 1210. According to an embodiment, the first antenna array 1214 may be disposed such that a beam pattern is formed along a z-axis through the second surface 1212 of the substrate 1210. According to an embodiment, the second antenna array 1215 may be disposed such that a beam pattern is formed along a y-axis in a first edge area E1 of the substrate 1210. According to an embodiment, the third antenna array 1216 may be disposed to be adjacent to the second antenna array 1215 and may be disposed such that a beam pattern is formed along a y-axis in the first edge area E1 of the substrate 1210. According to an embodiment, the fourth antenna array 1217 may be disposed such that a beam pattern is formed along an x-axis in a second edge area E2 of the substrate 1210 extending at a predetermined angle (e.g. perpendicularly) from the first edge area E1. According to an embodiment, the fifth antenna array 1218 may be disposed to be adjacent to the fourth antenna array 1217, and may be disposed such that a beam pattern is formed along an x-axis in the second edge area E2 of the substrate 1210.

According to various embodiments, the first antenna array 1214 may include a first antenna A1, a second antenna A2, a third antenna A3, or a fourth antenna A4 arranged at predetermined intervals on the second surface 1212 of the substrate 1210. According to an embodiment, the second antenna array 1215 may include a fifth antenna A5 or a sixth antenna A6 arranged at a predetermined interval in the first edge area E1 of the substrate 1210. According to an embodiment, the third antenna array 1216 may include a seventh antenna A7 or an eighth antenna A8 arranged at a predetermined interval in the first edge area E1. According to an embodiment, the fourth antenna array 1217 may include a ninth antenna A9 or a tenth antenna A10 arranged at a predetermined interval in the second edge area E2 of the substrate. According to an embodiment, the fifth antenna array 1218 may include an eleventh antenna A11 or a twelfth antenna A12 arranged at a predetermined interval in the second edge area E2. According to an embodiment, the communication device 1200 may include a wireless communication circuit 1247 mounted on a first surface 1211 of the substrate 1210 and electrically connected to the plurality of antennas A1-A12. According to an embodiment, the wireless communication circuit 1247 may be configured to transmit or receive at least one signal having a frequency band of 10 GHz-100 GHz through the plurality of antennas A1-A12.

According to various embodiments, at least one of the first antenna A1, the second antenna A2, the third antenna A3, or the fourth antenna A4 of the first antenna array 1214, at least one of the fifth antenna A5 or the sixth antenna A6 of the second antenna array 1215, at least one of the seventh antenna A7 or the eighth antenna A8 of the third antenna array 1216, at least one of the ninth antenna A9 or the tenth antenna A10 of the fourth antenna array 1217, and at least one of the eleventh antenna A11 or the twelfth antenna A12 of the fifth antenna array 1218 may be electrically connected to the wireless communication circuit 1247 by a type of double-feeding and/or double-feeding of dual polarized waves. Through the configuration, the same number of feeding ports are used but the number of antennas is reduced through multi-feeding (e.g. double-feeding), so that the volume of the communication device can be reduced.

Figure 13A:
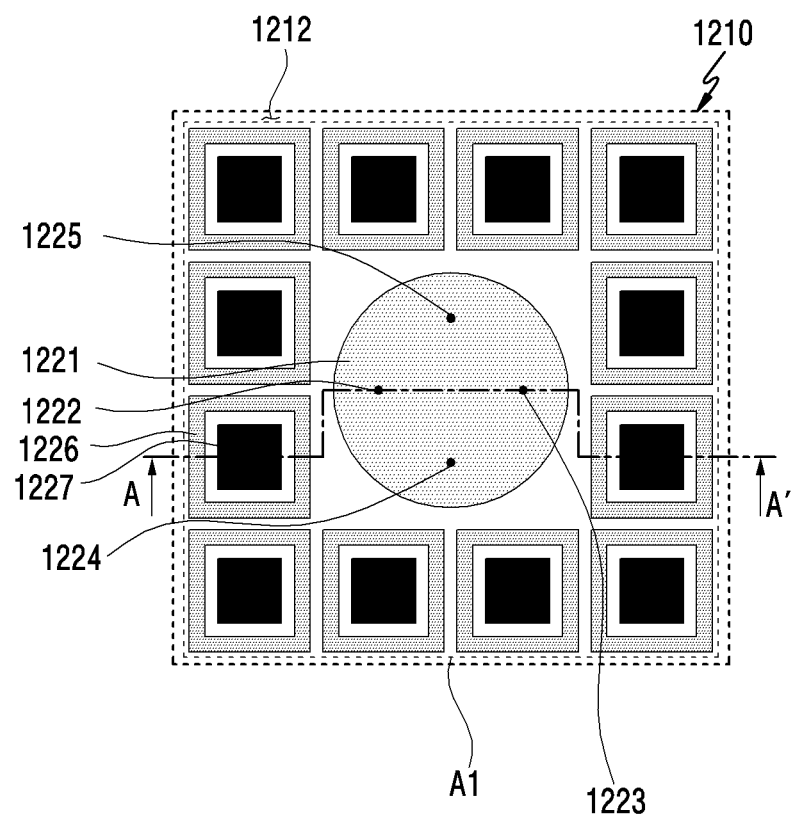
FIG. 13A is a diagram illustrating a configuration of a first antenna A1 of the communication device illustrated in FIG. 12 according to various embodiments of the disclosure.
Figure 13B:
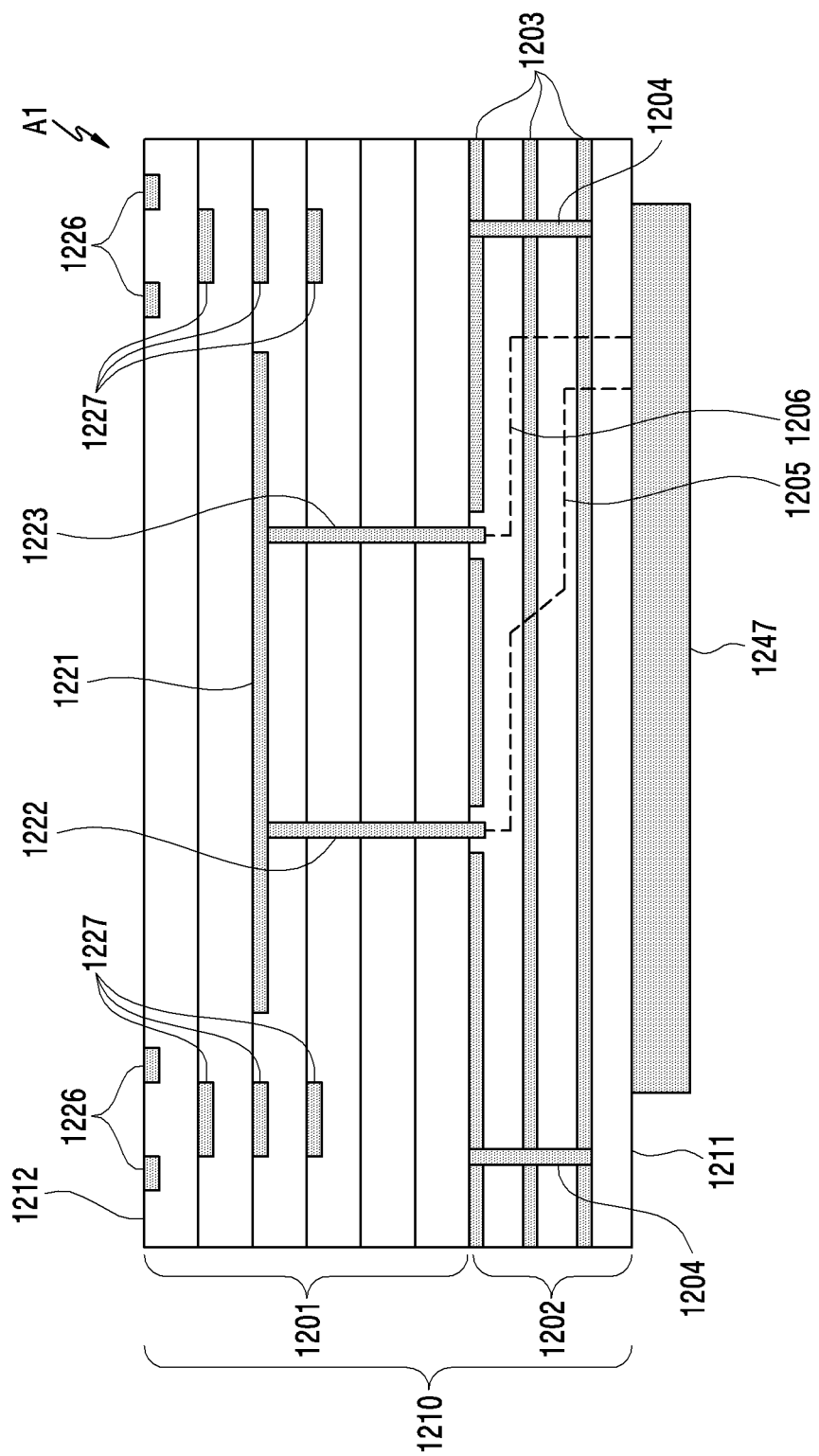
FIG. 13B is a cross-sectional view of a stacked structure of the first antenna when viewed in line A-A' illustrated in FIG. 13A according to various embodiments of the disclosure.

FIG. 13A is a diagram illustrating a configuration of the first antenna A1 of the communication device 1200 illustrated in FIG. 12 according to various embodiments of the disclosure. FIG. 13B is a cross-sectional view of a stacked structure of the first antenna when viewed in line A-A' illustrated in FIG. 13A according to various embodiments of the disclosure.

With reference to FIG. 13A, a configuration of the first antenna A1 in the first antenna array 1214 is illustrated and described. However, it is obvious that the second antenna A2, the third antenna A3, or the fourth antenna A4 of the first antenna array 1214 may also be configured to be identical or similar to the first antenna A1.

Referring to FIG. 13A, the first antenna A1 may include an antenna element 1221 disposed on the second surface 1212 of the substrate 1210. According to an embodiment, the antenna element 1221 may be configured to be of a metal plate or metal patch type. According to an embodiment, the first antenna A1 may include a conductive pattern 1226 disposed around the antenna element 1221 to surround the antenna element 1221. According to an embodiment, as illustrated in FIG. 13A, a plurality of conductive patterns 1226 may exist, and the other conductive patterns may also have a configuration identical or similar to that of the conductive pattern 1226.

According to an embodiment, the conductive pattern 1226 may have an inner space and may be a closed loop. According to an embodiment, the conductive pattern 1226 may have a quadrangular shape, but is not limited thereto. For example, the conductive pattern 1226 may have various shapes such as a circle, an oval, or a polygon. According to an embodiment, the conductive pattern 1226 may be disposed at a position where the conductive pattern can be capacitively coupled to the antenna element 1221, so as to improve a radiation performance of the antenna element 1221. According to an embodiment, the conductive pattern 1226 may have a particular periodic structure. For example, the antenna element 1221 may be a periodic structure having an electrical length of $\lambda/4$. According to an embodiment, the antenna element 1221 may have an artificial magnetic conductor (AMC) structure, or include a superstrate artificial magnetic conductor (SAMC).

According to various embodiments, when viewed from above the second surface 1212 of the substrate 1210, the conductive pattern 1226 may include a dummy pattern 1227 disposed in the inner space. According to an embodiment, the dummy pattern 1227 provides a uniform coefficient of thermal expansion when the substrate is manufactured, so that bending of the substrate 1210 which may occur due to high temperature can be prevented. According to an embodiment, the dummy pattern 1227 may be made of a conductive material or a non-conductive material. According to an embodiment, as illustrated in FIG. 13A, a plurality of dummy patterns 1227 may exist, and the other dummy patterns may also have a configuration identical or similar to that of the dummy pattern 1227.

According to various embodiments, the antenna element 1221 may be electrically connected to a wireless communication circuit (e.g. the wireless communication circuit 1247 in FIG. 12) mounted on the first surface 1211 of the substrate 1210. According to an embodiment, the antenna element 1221 may be electrically connected to the wireless communication circuit 1247 through four feed parts 1222, 1223, 1224, and 1225. According to an embodiment, the antenna element 1221 of at least one first antenna A1 may be electrically connected to the wireless communication circuit 1247 through a first feed part 1222 or the second feed part 1223, which are arranged to be symmetrical with each other, and a third feed part 1224 or a fourth feed part 1225, which are arranged at 90-degrees from the respective feed parts with respect to the center axis, in a type of double-feeding of dual polarized waves.

Referring to FIG. 13B, the substrate 1210 may include a plurality of insulation layers. According to an embodiment, the substrate 1210 may include a first layer area 1201 including at least one insulation layer, and a second layer area 1202 neighboring the first layer area 1201 and including at least another insulation layer. According to an embodiment, the first layer area 1201 may include the antenna element 1221.

According to various embodiments, the first layer area 1201 may include the first feed part 1222 and the second feed part 1223 that extend from the antenna element 1221 to the second layer area 1202 at mutually symmetrical positions, and are electrically connected to the wireless communication circuit 1247. Although not illustrated, a third feed part (e.g. the third feed part 1224 in FIG. 13A) and a fourth feed part (e.g. the fourth feed part 1225 in FIG. 13A) may also be electrically connected to wireless communication circuit 1247 in the same way. According to an embodiment, each of the first feed part 1222 and the second feed part 1223 may include a conductive via extending through the first layer area 1201 in the thickness-wise direction of the substrate 1210.

According to various embodiments, the first feed part 1222 may be electrically connected to the wireless communication circuit 1247 through a first feeding wire 1205 disposed in the second layer area 1202. According to an embodiment, the second feed part 1223 may be electrically connected to the wireless communication circuit 1247 through a second feeding wire 1206 disposed in the second layer area 1202. According to an embodiment, the first feeding wire 1205 and the second feeding wire 1206 may be configured to be electrically disconnected from a ground plane 1203 disposed in the second layer area 1202.

According to various embodiments, the antenna element 1221 may be disposed in the first layer area 1201 of the substrate 1210. According to an embodiment, the conductive pattern 1226 may be disposed on a plane closer to the second surface 1212 of the substrate 1210 than the antenna element 1221 in the first layer area 1201 of the substrate 1210. According to an embodiment, the dummy pattern 1227 may be disposed on a plane farther from the second surface 1212 of the substrate 1210 than the conductive pattern 1226. According to an embodiment, the antenna element 1221 may be disposed on the same plane as that on which at least a part of the dummy pattern 1227 is disposed. However, the disclosure is not limited thereto, and the antenna element 1221, the conductive pattern 1226, and/or the dummy pattern 1227 may be arranged on the same plane and/or different planes in the first layer area 1201.

According to various embodiments, the first antenna A1 may have an extended bandwidth and an improved gain by the conductive pattern 1226. For example, as shown in <Table 3> below, if the first antenna is configured only by the antenna element 1221, a gain may be 6.5 dBi, and a bandwidth may be 1 GHz. According to an embodiment, if the first antenna has an artificial magnetic conductor (AMC) structure further including a plurality of conductive patterns each having a general shape and arranged around the antenna element 1221, the gain and the bandwidth may be increased to 7.5 dBi and 2.5 GHz, respectively. If the first antenna has a superstrate artificial magnetic conductor (SAMC) structure further including the ring type conductive pattern 1226 disposed around the antenna element, the gain and the bandwidth may be increased to 8.2 dBi and 5 GHz, respectively.

TABLE 3

|  | Gain (dBi) | Bandwidth (GHz) |
|---|---|---|
| Conductive plate | 6.5 | 1 |
| Conductive plate + Conductive pattern (AMC) | 7.5 | 2.5 |
| Conductive plate + Conductive pattern (SAMC) | 8.2 | 5 |

Figure 14A:
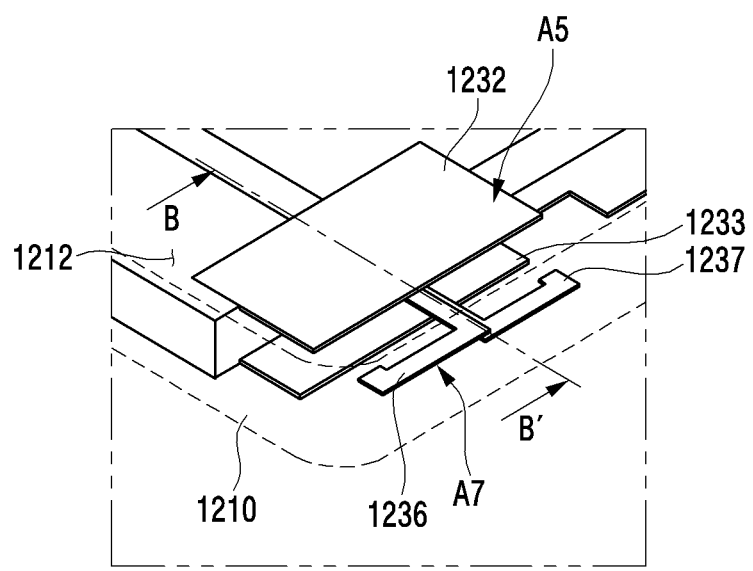
FIG. 14A is a partial perspective view of a configuration of a fifth antenna A5 and a seventh antenna A7 of the communication device illustrated in FIG. 12 according to various embodiments of the disclosure.
Figure 14B:
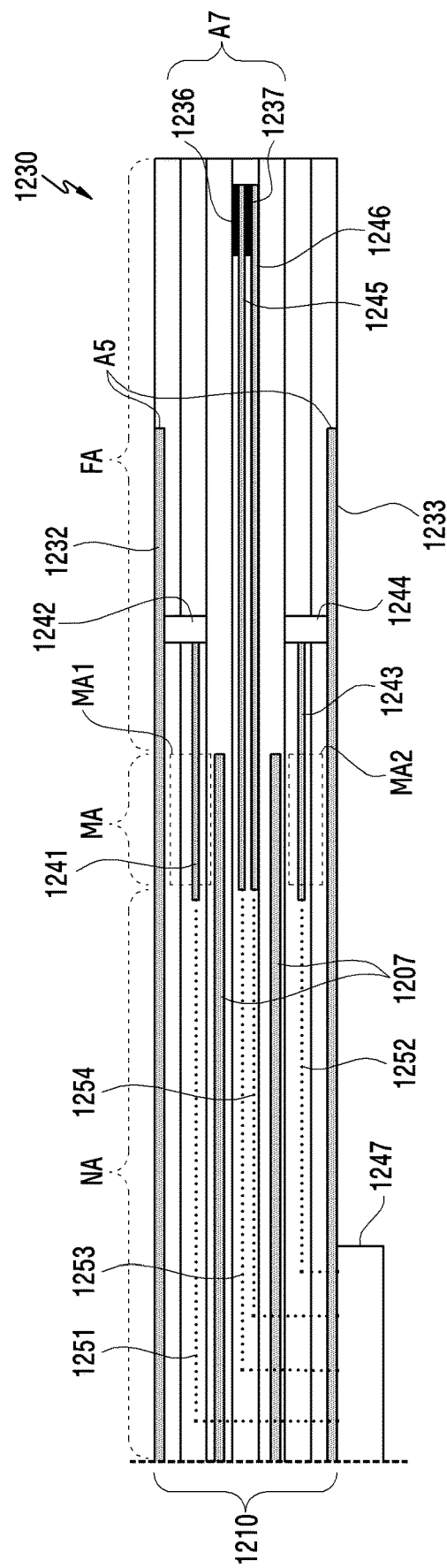
FIG. 14B is a cross-sectional view of a stacked structure of a second antenna when viewed in line B-B' illustrated in FIG. 14A according to various embodiments of the disclosure.

FIG. 14A is a partial perspective view of a configuration of the fifth antenna A5 and the seventh antenna A7 of the communication device 1200 illustrated in FIG. 12 according to various embodiments of the disclosure. FIG. 14B is a cross-sectional view of a stacked structure of a second antenna when viewed in line B-B' illustrated in FIG. 14A according to various embodiments of the disclosure.

With reference to FIG. 14A, a configuration of the fifth antenna A5 in the second antenna array 1215 is illustrated and described. However, it is obvious that the sixth antenna A6 of the second antenna array 1215, and the ninth antenna A9 and the tenth antenna A10 of the fourth antenna array 1217 may also be configured to be identical or similar to the fifth antenna A5. As another example, a configuration of the seventh antenna A7 in the third antenna array 1216 is illustrated and described. However, it is obvious that the eighth antenna A8 of the third antenna array 1216, and the eleventh antenna A11 and the twelfth antenna A12 of the fifth antenna array 1218 may also be configured to be identical or similar to the seventh antenna A7.

Referring to FIG. 14A, the fifth antenna A5 may include a first antenna element 1232 and a second antenna element 1233. According to an embodiment, when viewed from above the second surface 1212 of the substrate 1210, the first antenna element 1232 and the second antenna element 1233 may be spaced a predetermined interval apart from each other while at least partial areas are overlapping. According to an embodiment, a wireless communication circuit (e.g. the wireless communication circuit 1247 in FIG. 12) may transmit or receive a vertically polarized wave through the first antenna element 1232 and the second antenna element 1233. According to an embodiment, each of the first antenna element 1232 and the second antenna element 1233 may be configured to be of a metal plate or metal patch type.

According to various embodiments, the seventh antenna A7 may include a third antenna element 1236 and a fourth antenna element 1237. According to an embodiment, the third antenna element 1236 and the fourth antenna element 1237 may be arranged in parallel, and may be arranged in a space between the first antenna element 1232 and the second antenna element 1233. According to an embodiment, a wireless communication circuit (e.g. the wireless communication circuit 1247 in FIG. 12) may transmit or receive a horizontally polarized wave through the third antenna element 1236 and the fourth antenna element 1237. According to an embodiment, the third antenna element 1236 and the fourth antenna element 1237 may be configured to be a metal pattern type dipole emitter in the substrate 1210.

According to various embodiments, the first antenna element 1232 and the second antenna element 1233 of the fifth antenna A5, and/or the third antenna element 1236 and the fourth antenna element 1237 of the seventh antenna A7 are electrically connected to the wireless communication circuit (e.g. the wireless communication circuit 1247 in FIG. 12). Through the configuration, the same number of feeding ports are used but the number of antennas is reduced through multi-feeding (e.g. double-feeding), so that the volume of the communication device can be reduced.

Referring to FIG. 14B, the substrate 1210 may include a feed area NA, a matching area MA, and an antenna placement area FA. According to an embodiment, the fifth antenna A5 may include the first antenna element 1232 and the second antenna element 1233 arranged on different planes among the insulation layers of the substrate 1210. According to an embodiment, the first antenna element 1232 may be electrically connected to the wireless communication circuit 1247 through a first feeding wire 1251 and a first feeding line 1241 at a first feed point 1242. According to an embodiment, the second antenna element 1233 may be electrically connected to the wireless communication circuit 1247 through a second feeding wire 1252 and a second feeding line 1243 at a second feed point 1244.

According to various embodiments, an operating frequency band of the fifth antenna A5 may be determined through a first matching area MA1 (e.g. an impedance matching area, cavity) and a second matching area MA2 (e.g. an impedance matching area, cavity) of the first antenna element 1232 and the second antenna element 1233. According to an embodiment, an operating frequency of the fifth antenna A5 may be determined according to a capacitance value according to the vertical distance and/or the coupling area between the first antenna element 1232 and the first feeding line 1241. According to an embodiment, an operating frequency of the fifth antenna A5 may be determined according to a capacitance value according to the vertical distance and/or the coupling area between the second antenna element 1233 and the second feeding line 1243. However, the disclosure is not limited thereto, and an operating frequency of the fifth antenna A5 may be determined according to a capacitance value according to the vertical distance and/or the coupling area between the first feeding line 1241 and a ground plane 1207, and/or between the second feeding line 1243 and a ground plane 1207.

According to various embodiments, the seventh antenna A7 may be disposed in a space between the first antenna element 1232 and the second antenna element 1233 of the fifth antenna A5, and may include a third conductive pattern 1236 and a fourth conductive pattern 1237 arranged on respective end portions of a third feeding line 1245 and a fourth feeding line 1246 formed to at least partially protrude from the fifth antenna A5. According to an embodiment, the third feeding line 1245 may be electrically connected to the wireless communication circuit 1247 through a third feeding wire 1253. According to an embodiment, the fourth feeding line 1246 may be electrically connected to the wireless communication circuit 1247 through a fourth feeding wire 1254.

Figure 15A:
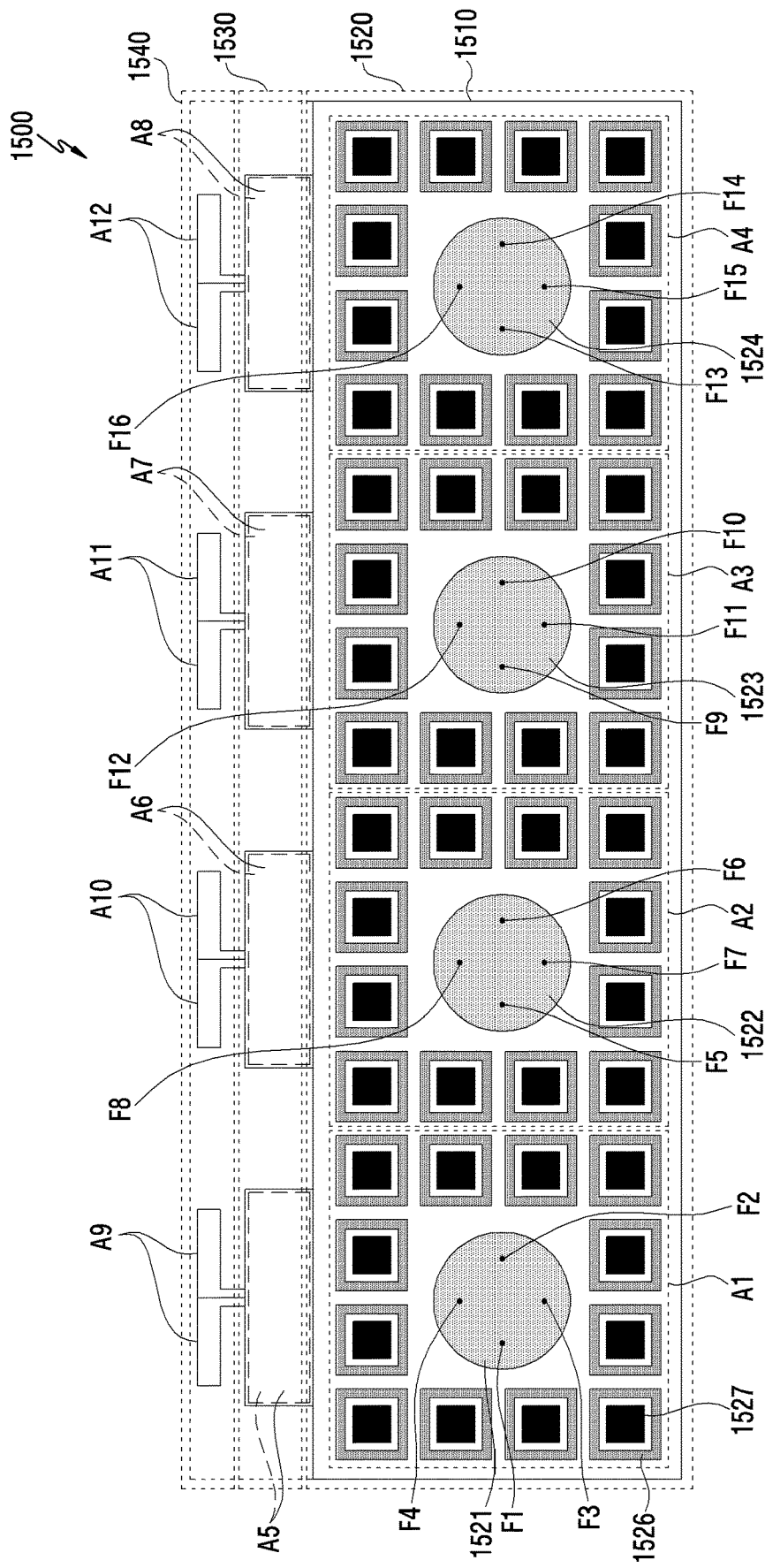
FIGS. 15A and 15B are diagrams illustrating various feeding structures of a communication device according to various embodiments of the disclosure.
Figure 15B:
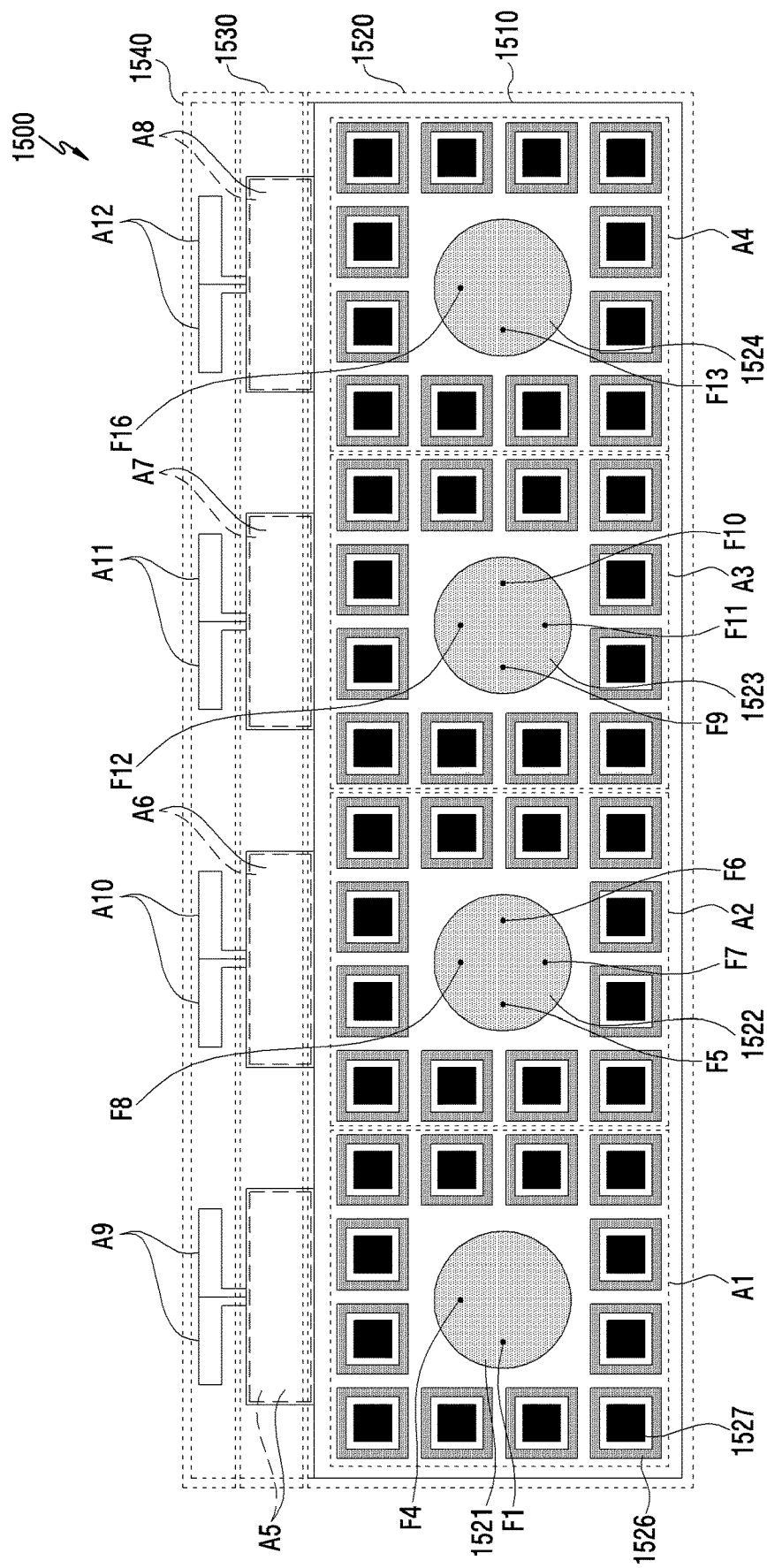

FIGS. 15A and 15B are diagrams illustrating various feeding structures of a communication device 1500 according to various embodiments of the disclosure.

The communication device 1500 in FIG. 15A may be at least partially similar to the communication devices 321, 322, 323, and 324 in FIG. 3A, or may include other embodiments of the communication devices 321, 322, 323, and 324.

Referring to FIG. 15A, the communication device 1500 may include a first antenna array 1520 disposed in a substrate 1510, a second antenna array 1530 disposed in the substrate 1510 to be adjacent to the first antenna array 1520, and a third antenna array 1540 disposed in the substrate 1510 to be adjacent to the second antenna array 1530. According to an embodiment, the first antenna array 1520 may include four antennas A1, A2, A3, and A4 having a 1×4 arrangement and arranged in the substrate 1510. The antennas A1, A2, A3, and A4 of the first antenna array 1520 may have a configuration identical or similar to that of the first antenna A1 in FIG. 12. According to an embodiment, the second antenna array 1530 may include four antennas A5, A6, A7, and A8 having a 1×4 arrangement and arranged in the substrate 1510. According to an embodiment, the antennas A5, A6, A7, and A8 of the second antenna array 1530 may have a configuration identical or similar to that of the fifth antenna A5 in FIG. 12. According to an embodiment, the third antenna array 1540 may include four antennas A9, A10, A11, and A12 having a 1×4 arrangement and arranged in the substrate 1510. The antennas A9, A10, A11, and A12 of the third antenna array 1540 may have a configuration identical or similar to that of the seventh antenna A7 in FIG. 12.

According to various embodiments, the first antenna array 1520 may include the first antenna A1, the second antenna A2, the third antenna A3, and the fourth antenna A4. According to an embodiment, the first antenna A1 may include a first antenna element 1521, a conductive pattern 1526 (e.g. the conductive pattern 1226 in FIG. 13A) disposed to surround the first antenna element 1521 and having a shape of a closed loop, and a dummy pattern 1527 (e.g. the dummy pattern 1227 in FIG. 13A) disposed in an inner space of the conductive pattern 1526. There may be, for example, a plurality of conductive patterns 1526 or dummy patterns 1527. According to an embodiment, the first antenna element 1521 may be electrically connected to a wireless communication circuit (e.g. the wireless communication circuit 1247 in FIG. 12) through a first feed part F1, a second feed part F2, a third feed part F3, and a fourth feed part F4 in a type of double-feeding dual polarized waves. According to an embodiment, the second antenna A2, the third antenna A3, and the fourth antenna A4 may also include a second antenna element 1522, a third antenna element 1523, and a fourth antenna element 1524. In the same manner as that of the first antenna element 1521, the second antenna element 1522, the third antenna element 1523, and the fourth antenna element 1524 may be electrically connected to the wireless communication circuit (e.g. the wireless communication circuit 1247 in FIG. 12) through a plurality of feed parts F6, F7, F8, F9, F10, F11, F12, F13, F14, F15, and F16 in a type of double-feeding dual polarized waves.

According to various embodiments, the first antenna array 1520 is electrically connected to the wireless communication circuit (e.g. the wireless communication circuit 1247 in FIG. 12) through the first antenna element 1521, the second antenna element 1522, the third antenna element 1523, and the fourth antenna element 1524 in a type of double-feeding dual polarized waves. Through the configuration, the same number of feeding ports are used but the number of antennas is reduced compared to a conventional case through multi-feeding (e.g. double-feeding), so that the volume of the communication device can be reduced.

As illustrated in FIG. 15B, the first antenna element 1521 of the first antenna A1 and the fourth antenna element 1524 of the fourth antenna A4 among the antenna elements 1521, 1522, 1523, and 1524 arranged in the four antennas A1, A2, A3, and A4 of the first antenna array 1520 in FIG. 15A may be electrically connected to the wireless communication circuit (e.g. the wireless communication circuit 1247 in FIG. 12) through the first feed part F1, the fourth feed part F4, the thirteenth feed part F13, and the sixteenth feed part F16 in a type of single-feeding of each polarized wave among dual polarized waves. The second antenna element 1522 of the second antenna A2 and the third antenna element 1532 of the third antenna A3 may be electrically connected to the wireless communication circuit (e.g. the wireless communication circuit 1247 in FIG. 12) through the fifth feed part F5 to the twelfth feed part F12 in a type of double-feeding of each polarized wave among dual polarized waves. In the first antenna array 1520, if double-feeding of each polarized wave among dual polarized waves is applied to the corresponding antenna elements 1522 and 1523 of the second antenna A2 and the third antenna A3 arranged at least a center among the plurality of antennas A1, A2, A3, and A4, the second antenna and the third antenna may radiate higher power compared to the surrounding antennas A1 and A4 employing single-feeding of each polarized wave among dual polarized waves. Through the configuration, a side lobe level (SLL) can be reduced, and a single beam width can be increased.

Figure 16:
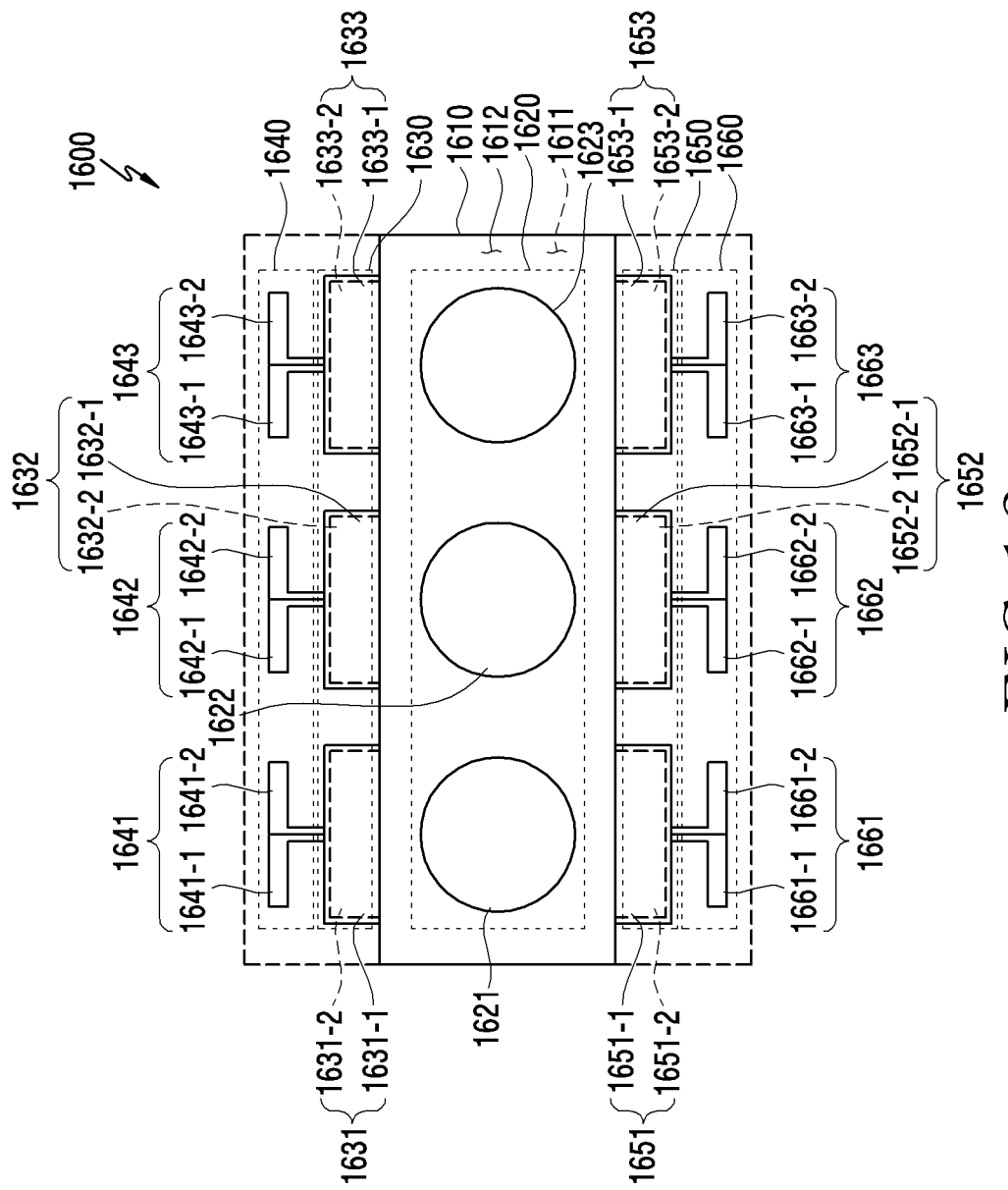
FIG. 16 is a configuration diagram of a communication device according to various embodiments of the disclosure.

FIG. 16 is a configuration diagram of a communication device according to various embodiments of the disclosure.

A communication device 1600 in FIG. 16 may be at least partially similar to the communication devices 321, 322, 323, and 324 in FIG. 3A, or may include other embodiments of the communication devices 321, 322, 323, and 324.

Referring to FIG. 16, the communication device 1600 may include a substrate 1610. The substrate 1610 may include a first surface 1611 and a second surface 1612 oriented in the opposite direction to the first surface 1611. According to an embodiment, the communication device 1600 may include a first antenna array 1620 disposed in the substrate 1610, and a second antenna array 1630 and a third antenna array 1640 arranged at one side of the substrate 1610. According to an embodiment, the communication device 1600 may include a fourth antenna array 1650 and a fifth antenna array 1660 arranged near the other side opposite to the one side of the substrate 1610. According to an embodiment, the second antenna array 1630 and the fourth antenna array 1650 may include substantially an identical configuration. According to an embodiment, the third antenna array 1640 and the fifth antenna array 1660 may include substantially an identical configuration. According to an embodiment, the first antenna array 1620 may include a first antenna 1621, a second antenna 1622, and a third antenna 1623 that form a beam pattern in the direction of the second surface 1612 of the substrate 1610. According to an embodiment, each of the first antenna 1621, the second antenna 1622, and the third antenna 1623 may be configured to be of a conductive plate or conductive patch type.

According to various embodiments, the second antenna array 1630 may include a fourth antenna 1631, a fifth antenna 1632, or a sixth antenna 1633 disposed to correspond to the antennas 1621, 1622, and 1623 of the first antenna array 1620 at the one side of the substrate 1610. According to an embodiment, the fourth antenna array 1650 may include a seventh antenna 1651, an eighth antenna 1652, or a ninth antenna 1653 arranged to correspond to the antennas 1621, 1622, and 1623 of the first antenna array 1620 at the other side of the substrate 1610. According to an embodiment, each of the fourth antenna 1631 to the ninth antenna 1653 may be configured to be of a conductive plate or conductive patch type.

According to various embodiments, the third antenna array 1640 may include a tenth antenna 1641, an eleventh antenna 1642, or a twelfth antenna 1643 disposed near the second antenna array 1630. According to an embodiment, the fifth antenna array 1660 may include a thirteenth antenna 1661, a fourteenth antenna 1662, or a fifteenth antenna 1663 disposed near the fourth antenna array 1650. According to an embodiment, the tenth antenna 1641 to the fifteenth antenna 1663 may be configured to be dipole emitters each having a conductive pattern formed in the substrate 1610. According to an embodiment, each of the fourth antenna 1631 to the ninth antenna 1653 may have a configuration substantially identical to that of the fifth antenna A5 in FIG. 14A. According to an embodiment, each of the tenth antenna 1641 to the fifteenth antenna 1663 may have a configuration substantially identical to that of the seventh antenna A7 in FIG. 14A.

According to various embodiments, the fourth antenna 1631 may include a first antenna element 1631-1 and a second antenna element 1631-2 spaced a predetermined interval apart from each other and arranged to face each other The fifth antenna 1632 may include a third antenna element 1632-1 and a fourth antenna element 1632-2. The sixth antenna 1633 may include a fifth antenna element 1633-1 and a sixth antenna element 1633-2. According to an embodiment, the seventh antenna 1651 may include a seventh antenna element 1651-1 and an eighth antenna element 1651-2. The eighth antenna 1652 may include a ninth antenna element 1652-1 and a tenth antenna element 1652-2. The ninth antenna 1653 may include an eleventh antenna element 1653-1 and a twelfth antenna element 1653-2.

According to various embodiments, the tenth antenna 1641 may include a thirteenth antenna element 1641-1 and a fourteenth antenna element 1641-2 spaced a predetermined interval apart from each other and arranged to face each other. The eleventh antenna 1642 may include a fifteenth antenna element 1642-1 and a sixteenth antenna element 1642-2. The twelfth antenna 1643 may include a seventeenth antenna element 1643-1 and an eighteenth antenna element 1643-2. According to an embodiment, the thirteenth antenna 1661 may include a nineteenth antenna element 1661-1 and a twentieth antenna element 1661-2. The fourteenth antenna 1662 may include a twenty first antenna element 1662-1 and a twenty second antenna element 1622-2. The fifteenth antenna 1663 may include a twenty third antenna element 1663-1 and a twenty fourth antenna element 1663-2.

According to various embodiments, the second antenna array 1630 and the fourth antenna array 1650 may be electrically connected to a wireless communication circuit (e.g. the wireless communication circuit 1247 in FIG. 12) to generate a vertically polarized wave in the side direction of the substrate 1610. According to an embodiment, the third antenna array 1640 and the fifth antenna array 1660 may be electrically connected to a wireless communication circuit (e.g. the wireless communication circuit 1247 in FIG. 12) to generate a horizontally polarized wave in the side direction of the substrate 1610.

Figure 17A:
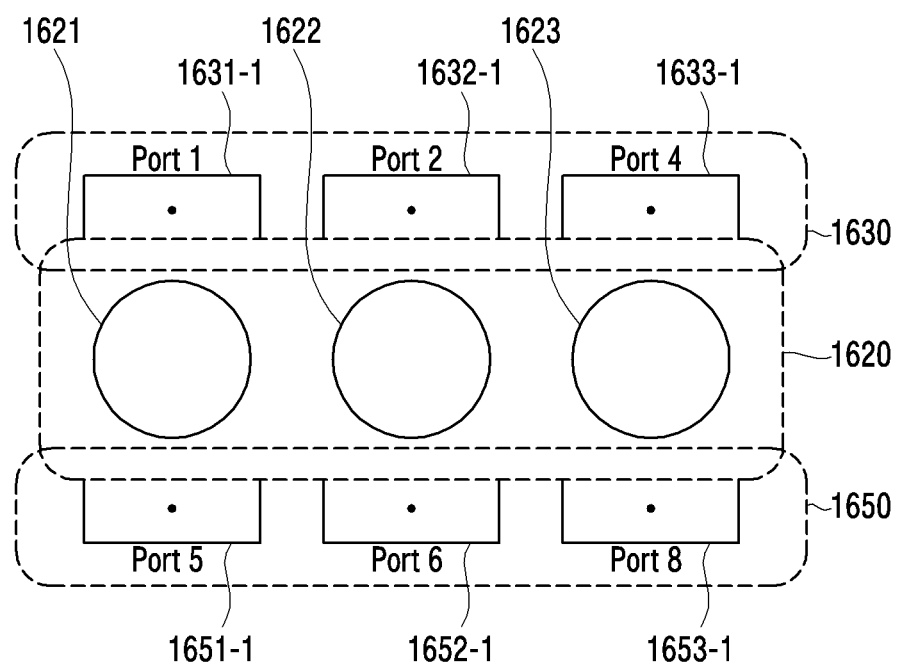
FIGS. 17A and 17B are diagrams illustrating a feeding structure of a second antenna array and a fourth antenna array illustrated in FIG. 16 according to various embodiments of the disclosure.
Figure 17B:
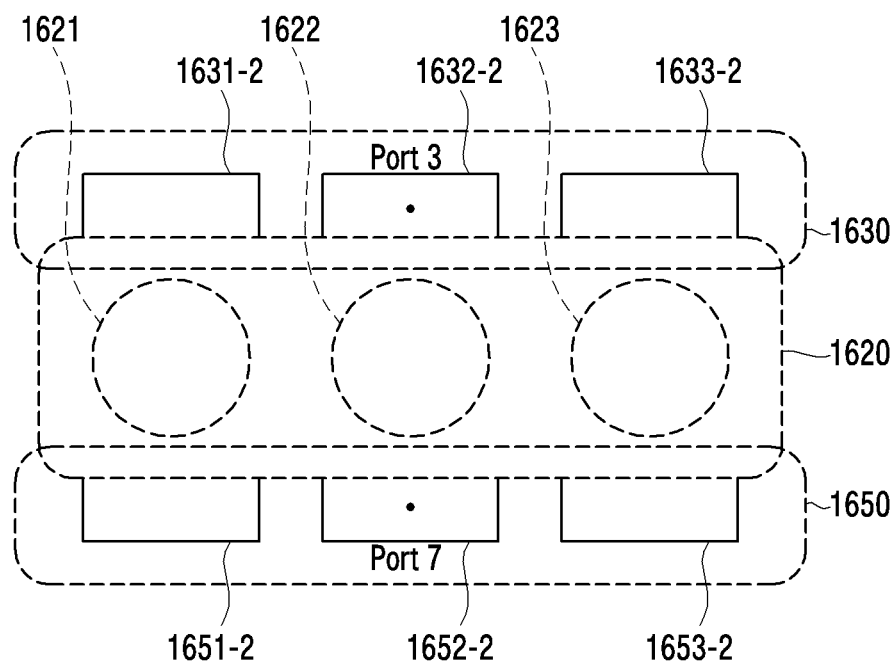

FIGS. 17A and 17B are diagrams illustrating a feeding structure of the second antenna array 1630 and the fourth antenna array 1650 illustrated in FIG. 16 according to various embodiments of the disclosure.

Referring to FIGS. 17A and 17B, the fifth antenna 1632 disposed at the center among the three antennas of the second antenna array 1630, and the eighth antenna 1652 disposed at the center among the three antennas of the fourth antenna array 1650 may be electrically connected to feeding ports (ports 1-8) of the wireless communication circuit (e.g. the wireless communication circuit 1247 in FIG. 12) of the communication device 1600 by a double-feeding type. According to an embodiment, in the second antenna array 1630, the first antenna element 1631-1 of the fourth antenna 1631 may be connected to the first feeding port (port 1), the third antenna element 1632-1 and the fourth antenna element 1632-2 of the fifth antenna 1632 may be connected to the second feeding port (port 2) and the third feeding port (port 3), respectively, and the fifth antenna element 1633-1 of the sixth antenna 1633 may be electrically connected to the fourth feeding port (port 4). According to an embodiment, in the fourth antenna array 1650, the seventh antenna element 1651-1 of the seventh antenna 1651 may be connected to the fifth feeding port (port 5), the ninth antenna element 1652-1 and the tenth antenna element 1652-2 of the eighth antenna 1652 may be connected to the sixth feeding port (port 6) and the seventh feeding port (port 7), respectively, and the eleventh antenna element 1653-1 of the ninth antenna 1653 may be electrically connected to the eighth feeding port (port 8).

Figure 18A:
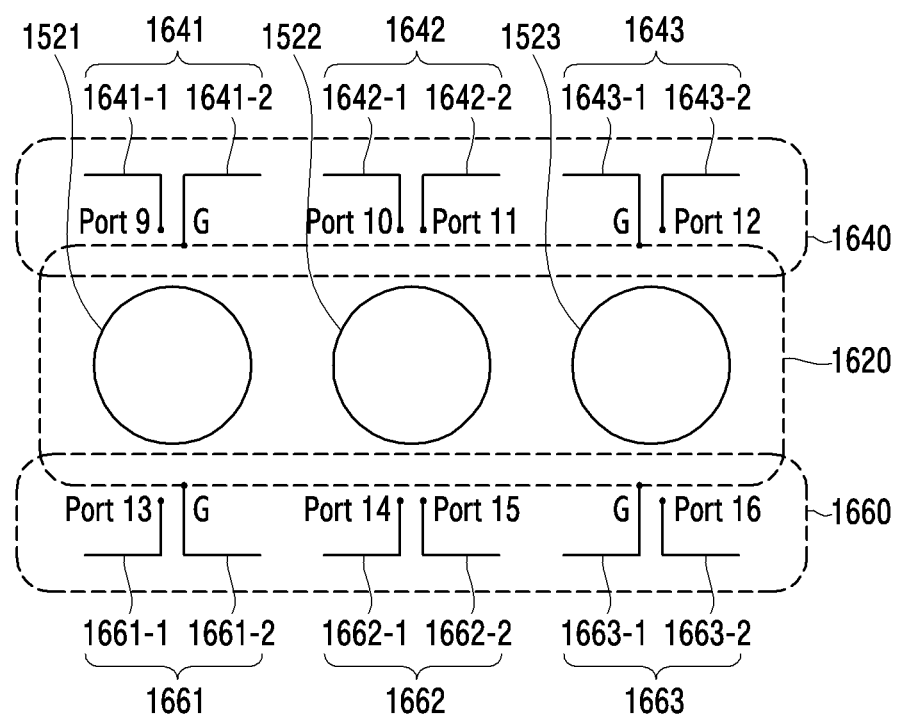
FIGS. 18A to 18C are diagrams illustrating various feeding structures of a third antenna array and a fifth antenna array illustrated in FIG. 16 according to various embodiments of the disclosure.
Figure 18B:
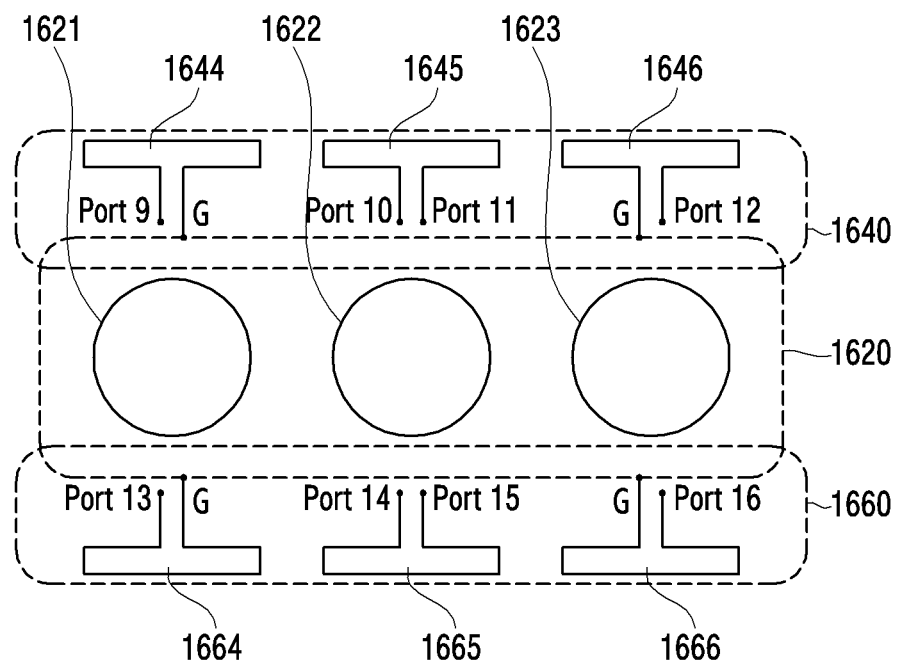
Figure 18C:
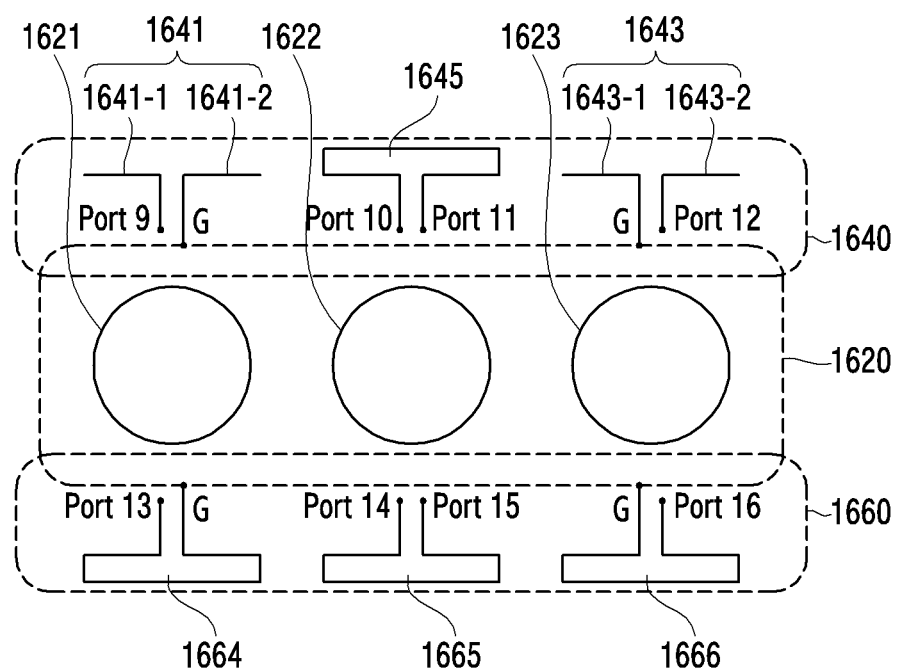

FIGS. 18A to 18C are diagrams illustrating various feeding structures of the third antenna array 1640 and the fifth antenna array 1660 illustrated in FIG. 16 according to various embodiments of the disclosure.

Referring to FIG. 18A, the eleventh antenna 1642 disposed at the center among the three antennas of the third antenna array 1640, and the fourteenth antenna 1662 disposed at the center among the three antennas of the fifth antenna array 1660 may be electrically connected to some feeding ports (ports 9-16) of the wireless communication circuit (e.g. the wireless communication circuit 1247 in FIG. 12) of the communication device 1600 by a double-feeding type. According to an embodiment, in the third antenna array 1640, the thirteenth antenna element 1641-1 of the tenth antenna 1641 may be connected to the ninth feeding port (port 9), the fifteenth antenna element 1642-1 and the sixteenth antenna element 1642-2 of the eleventh antenna 1642 may be connected to the tenth feeding port (port 10) and the eleventh feeding port (port 11), respectively, and the eighteenth antenna element 1643-2 of the twelfth antenna 1643 may be electrically connected to the twelfth feeding port (port 12). According to an embodiment, in the fifth antenna array 1660, the nineteenth antenna element 1661-1 of the thirteenth antenna 1661 may be connected to the thirteenth feeding port (port 13), the twenty first antenna element 1662-1 and the twenty second antenna element 1662-2 of the fourteenth antenna 1662 may be connected to the fourteenth feeding port (port 14) and the fifteenth feeding port (port 15), respectively, and the twenty fourth antenna element 1663-2 of the fifteenth antenna 1663 may be electrically connected to the sixteenth feeding port (port 16).

Referring to FIG. 18B, the three antennas 1641, 1642, 1643 of the third antenna array 1640 may have a feeding structure substantially identical to the structure illustrated in FIG. 18A, and may be configured as folded dipole type antenna elements 1644, 1645, and 1646. According to an embodiment, the three antennas 1661, 1662, 1663 of the fifth antenna array 1660 may have a feeding structure substantially identical to the structure illustrated in FIG. 18A, and may be configured as folded dipole type antenna elements 1664, 1665, and 1666.

Referring to FIG. 18C, in the configuration illustrated in FIG. 18B, the tenth antenna 1644 and the twelfth antenna 1646 may be configured as general dipole type antennas 1641 and 1643, and the eleventh antenna 1645 may be configured as a folded dipole type. However, the disclosure is not limited thereto, and at least one antenna among the folded dipole type antennas 1645, 1664, 1665, and 1666 may also be configured as at least one of the general dipole antennas 1642, 1661, 1662, and 1663, as illustrated in FIG. 18A.

Figure 19A:
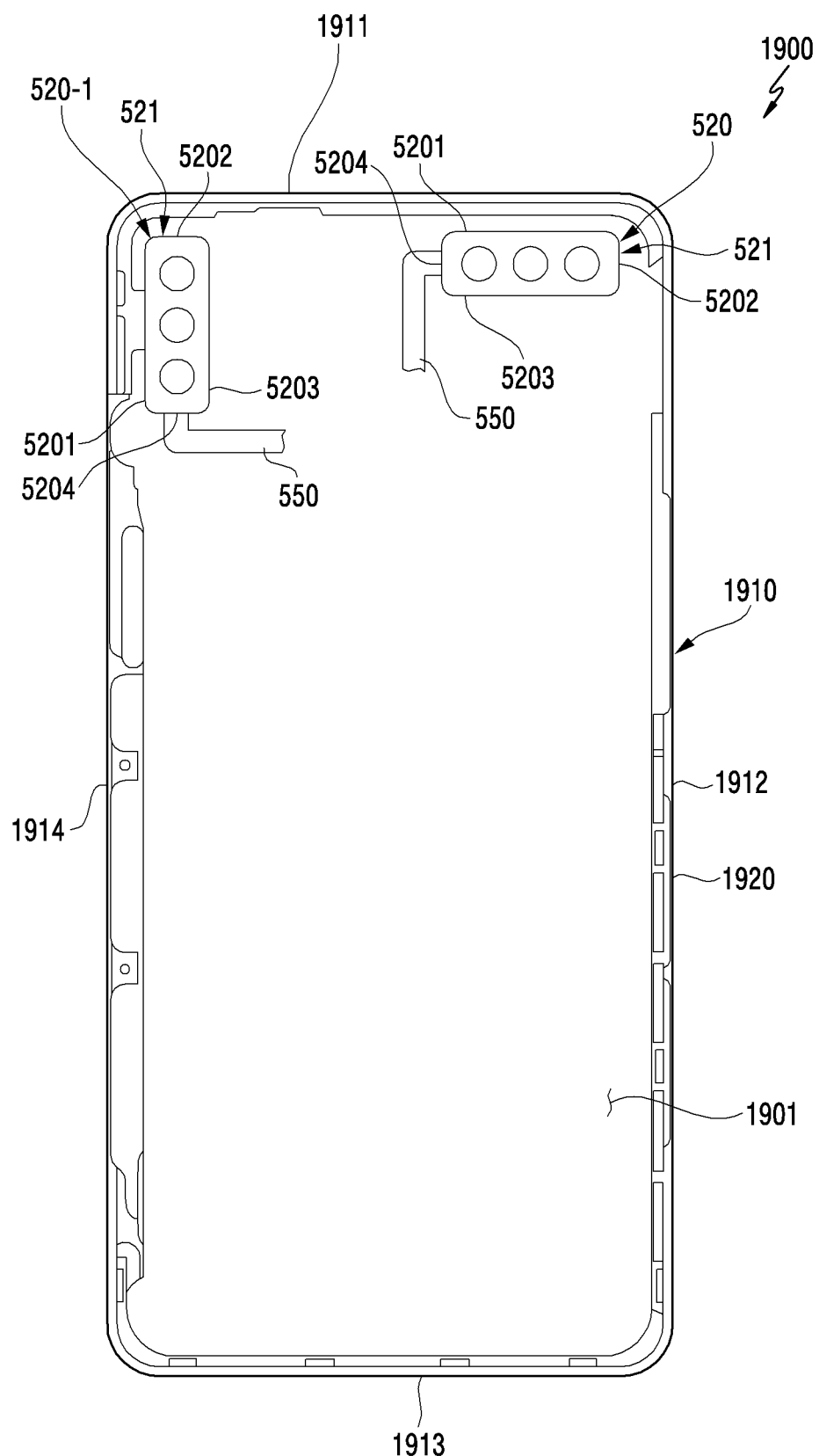
FIGS. 19A and 19B are diagrams illustrating an arrangement of communication devices according to various embodiments of the disclosure.
Figure 19B:
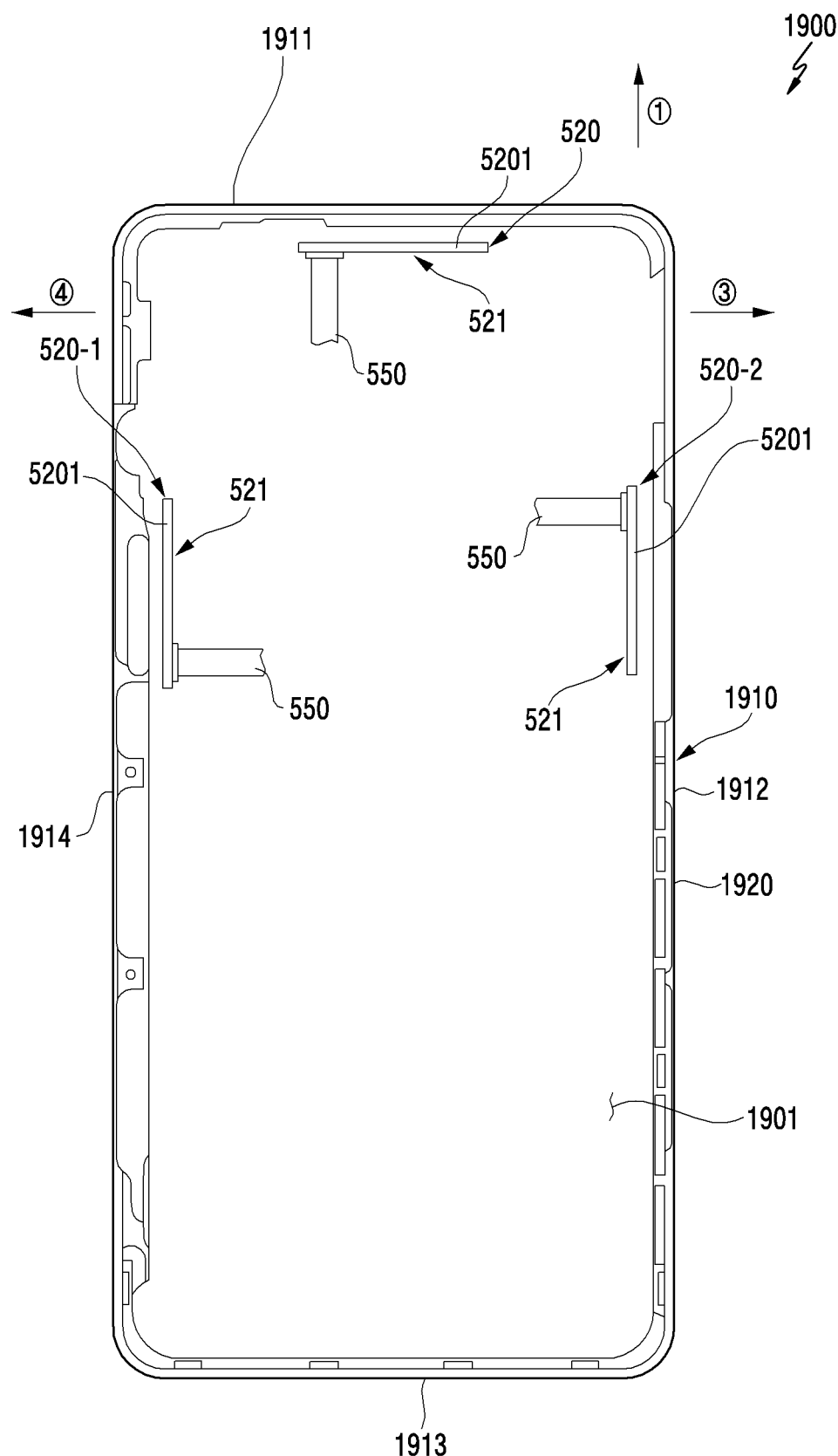

FIGS. 19A and 19B are diagrams illustrating an arrangement of communication devices according to various embodiments of the disclosure.

Communication devices 520, 520-1, 520-2 in FIGS. 19A and 19B may be at least partially similar to the communication devices 321, 322, 323, and 324 in FIG. 3A, the communication device 400 in FIG. 4A, the communication device 510 in FIG. 5, the communication device 600 in FIG. 6, the communication device 710 in FIG. 7a, the communication device 1010 in FIG. 10a, the communication device 1020 in FIG. 10c, the communication device 1030 in FIG. 10E, the communication device 1040 in FIG. 10G, the communication device 1130 in FIG. 11A, the communication device 1150 in FIG. 11B, the communication device 1200 in FIG. 12, the communication device 1500 in FIG. 15A, or the communication device 1600 in FIG. 16, or may include other embodiments of the communication devices.

Referring to FIG. 19A, an electronic device 1900 may include a housing 1910. According to an embodiment, the housing 1910 may include a side member 1920. According to an embodiment, at least a partial area of the side member 1920 may be formed of a conductive member, and may be implemented as a unit conductive portion by a non-conductive portion, to be operated as an antenna radiator.

According to various embodiments, the housing 1910 may include a first part 1911 having a first length, a second part 1912 extending perpendicular to the first part 1911 and having a second length, a third part 1913 extending from the second part 1912 to be parallel to the first part 1911 and have the first length, and a fourth part 1914 extending from the third part 1913 to be parallel to the second part 1912 and having the second length.

According to various embodiments, a first communication device 520 or a second communication device 520-1 may be disposed in an inner space 1901 of the electronic device 1900. According to an embodiment, the first communication device 520 or the second communication device 520-1 may be disposed in at least one corner portion of the electronic device 1900 having substantially a quadrangular shape.

According to various embodiments, a first side part 5201 of the first communication device 520 may be disposed to be adjacent to the first part 1911 of the housing 1910, and a second side part 5202 of the first communication device 520 may be disposed to be adjacent to the second part 1912 of the housing 1910. An electrical connection member 550 (e.g. a power terminal and/or an RF terminal) of the first communication device 520 may extend toward the center of the electronic device 1900 from a fourth side part 5204 of the first communication device 520. As another example, the electrical connection member 550 may extend toward the center of the electronic device 1900 from a third side part 5203 of the first communication device 520. According to various embodiments, a first side part 5201 of the second communication device 520-1 may be disposed to be adjacent to the fourth part 1914 of the housing 1910, and a second side part 5202 of the second communication device 520-1 may be disposed to be adjacent to the first part 1911 of the housing 1910.

According to various embodiments, the first communication device 520 may generate a beam pattern toward a back plate (e.g. the back plate 211 in FIG. 2B) of the electronic device.

Referring to FIG. 19B, a first communication device 520, a second communication device 520-1, or a third communication device 520-2 may be disposed in a partial area of edges of the electronic device 1900. According to an embodiment, the first communication device 520 may be disposed such that a second surface (e.g. the second surface 412 in FIG. 4A) of a substrate 521 of the first communication device 520 is oriented toward the first part 1911 and disposed substantially at the center of the first part 1911 of the housing 1910. According to an embodiment, when viewed from above a second plate (e.g. the second plate 211 in FIG. 2B) of the electronic device 1900, the first communication device 520 may be disposed such that a first side part 5201 of the substrate 521 of the first communication device 520 is parallel to the first part 1911 of the housing 1910. According to an embodiment, the second communication device 520-1 may be disposed such that a second surface (e.g. the second surface 412 in FIG. 4A) of a substrate 521 of the second communication device 520-1 is parallel and adjacent to the fourth part 1914 of the housing 1910 in a partial area of the fourth part 1914. According to an embodiment, the third communication device 520-2 may be disposed such that a second surface (e.g. the second surface 412 in FIG. 4A) of a substrate 521 of the third communication device 520-2 is parallel and adjacent to the second part 1912 of the housing 1910 in a partial area of the second part 1912.

According to various embodiments, the first communication device 520 may generate a beam pattern toward the first part 1911 of the housing 1910 (e.g. in ① direction). According to various embodiments, the second communication device 520-1 may generate a beam pattern toward the fourth part 1914 of the housing 1910 (e.g. in ④ direction). According to various embodiments, the third communication device 520-2 may generate a beam pattern toward the second part 1912 of the housing 1910 (e.g. in ③ direction).

According to various embodiments, although not illustrated, the communication devices 520, 520-1, and 520-2 illustrated in FIGS. 19A and 19B may be arranged in at least a partial area of the corners or the edges of the electronic device 1900 having substantially a rectangular shape, or may be arranged in both corners and edges.

According to various embodiments, the areas of the housing 1910 corresponding to the portions in which the communication devices 520, 520-1, and 520-2 are mounted may be formed of a material (e.g. a dielectric material) different from a conductive material in order to prevent a degradation of a radiation performance of the communication devices. However, the disclosure is not limited thereto, and holes may be formed through the housing in the beam generation directions of the communication device in the corresponding areas of the housing 1910, or the areas may be replaced with a metal periodic structure (e.g. a metal grid) through which a beam can pass.

According to various embodiments, an electronic device (e.g. the electronic device 200 in FIG. 2A) may include: a housing (e.g. the housing 210 in FIG. 2A) including a first plate (e.g. the first plate 202 in FIG. 2A), a second plate (e.g. the second plate 211 in FIG. 2B) oriented in a direction opposite to the first plate, and a side member (e.g. the side support structure 218 in FIG. 2A) surrounding a space between the first plate and the second plate; an antenna structure (e.g. the antenna array 720 in FIG. 7A) including at least one plane parallel to the second plate, wherein the antenna structure includes a first element (e.g. the first element 712 in FIG. 7A) disposed on the plane, a second element (e.g. the second element 713 in FIG. 7A) spaced apart from the first element on the plane when viewed from above the plane, and a third element (e.g. the third element 714 in FIG. 7A) spaced apart from the second element on the plane when viewed from above the plane, the second element being disposed between the first element and the third element; and a wireless communication circuit (e.g. the wireless communication circuit 715 in FIG. 7A) electrically configured to transmit and receive a signal having a frequency range of 10 GHz-100 GHz, wherein the wireless communication circuit includes a first electrical path (e.g. the first electrical path 7121 in FIG. 7A) connected to the first element, a second electrical path (e.g. the second electrical path 7131 in FIG. 7A) connected to a first point on the second element, the first point being closer to the first element than to the third element, a third electrical path (e.g. the third electrical path 7132 in FIG. 7A) connected to a second point on the second element, the second point being closer to the third element than to the first element, and a fourth electrical path (e.g. the fourth electrical path 7141 in FIG. 7A) connected to the third element, and wherein the wireless communication circuit is configured to provide a phase difference between a first signal from the first point and a second signal from the second point.

According to various embodiments, the phase difference may be 180 degrees.

According to various embodiments, the first element (e.g. the first element 712 in FIG. 7A), the second element (e.g. the second element 713 in FIG. 7A), and the third element (e.g. the third element 714 in FIG. 7A) may have symmetrical shapes with an identical diameter.

According to various embodiments, the first point (e.g. the first point 7131 in FIG. 7A) may be disposed between a center of the second element (e.g. the second element 713 in FIG. 7A) and the first element (e.g. the first element 712 in FIG. 7A), and the second point (e.g. the second point 7132 in FIG. 7A) may be disposed between the center of the second element (e.g. the second element 713 in FIG. 7A) and the third element (e.g. the third element 714 in FIG. 7A).

According to various embodiments, the first element (e.g. the first element 1152 in FIG. 11B), the second element (e.g. the second element 1153 in FIG. 11B), and the third element (e.g. the third element 1155 in FIG. 11B) may configure a first row (e.g. the first row 1180 in FIG. 11B), and the antenna structure may further include a dipole antenna array (e.g. the second antenna array 1190 in FIG. 11B) disposed in a second row parallel to the first row.

According to various embodiments, an electronic device may include: a housing (e.g. the housing 210 in FIG. 2A) including a first plate (e.g. the first plate 202 in FIG. 2A), a second plate (e.g. the second plate 211 in FIG. 2A) oriented in a direction opposite to the first plate, and a side member (e.g. the side support structure 218 in FIG. 2A) surrounding a space between the first plate and the second plate; an antenna structure (e.g. the antenna 450 in FIG. 4A) including at least one plane parallel to the first plate and including a first antenna element (e.g. the antenna element 420 in FIG. 4A) disposed on the plane; and a wireless communication circuit (e.g. the wireless communication circuit 430 in FIG. 4A) electrically configured to transmit and receive a signal having a frequency range of 10 GHz-100 GHz, wherein the wireless communication circuit includes electrical paths (e.g. the electrical paths 421 and 422 in FIG. 4A) electrically connected to a plurality of points spaced apart from each other on the first antenna element, respectively, and wherein the wireless communication circuit provides at least one phase difference between at least two signals from the plurality of points.

According to various embodiments, at least two of the plurality of points may be symmetric with each other with respect to a center of the first antenna element.

According to various embodiments, the first antenna element (e.g. the antenna element 620 in FIG. 6) may be symmetric with respect to a virtual line crossing a center of the first antenna element, and the plurality of points may include a first point (e.g. the first point 621 in FIG. 6) disposed at one side of the first element with respect to the line, and a second point (e.g. the second point 623 in FIG. 6) disposed to be symmetric with the first point at the other side with respect to the line.

According to various embodiments, the first antenna element may include a third point (e.g. the third point 622 in FIG. 6) disposed at 90-degree from the first point with respect to the center, and a fourth point (e.g. the fourth point 624 in FIG. 6) disposed to be symmetric with the third point on the first antenna element, and the third point and the fourth point may be electrically connected to the wireless communication circuit (e.g. the wireless communication circuit 630 in FIG. 6).

According to various embodiments, the electronic device may further include a substrate (e.g. the substrate 410 in FIG. 4B) in which a plurality of insulation layers are laminated, and the first antenna element (e.g. the antenna element 420 in FIG. 4B) may be disposed on a first plane (e.g. the first plane 4101 in FIG. 4B) among the insulation layers of the substrate.

According to various embodiments, the wireless communication circuit may be electrically connected to the first antenna element by using the electrical paths (e.g. the electrical paths 421 and 422 in FIG. 4B) arranged to extend through the insulation layers of the substrate.

According to various embodiments, the electrical paths (e.g. the electrical paths 421 and 422 in FIG. 4E) may be electrically connected to at least two conductive pads (e.g. the conductive pads 423 and 424 in FIG. 4E) correspondingly arranged on a second plane (e.g. the second plane 4101 in FIG. 4E) different from the first plane among the insulation layers of the substrate, and the at least two conductive pads may be located such that the pads can be capacitively coupled to the antenna element.

According to various embodiments, the electronic device may further include a second antenna element (the second antenna element 426 in FIG. 4F) disposed on a third plane (e.g. the third plane 4101 in FIG. 4F) among the insulation layers, spaced apart from the first antenna element (e.g. the first antenna element 420 in FIG. 4F), the at least two second conductive pads (e.g. two conductive pads 423 and 424 in FIG. 4F) may be arranged between the first antenna element and the second antenna element, and the second antenna element may be located such that second antenna element can be capacitively coupled to the at least two second conductive pads.

According to various embodiments, the wireless communication circuit (e.g. the wireless communication circuit 430 in FIG. 4F) may transmit or receive a signal having a first frequency band through the first antenna element (e.g. the antenna element 420 in FIG. 4F), and may transmit or receive a signal having a second frequency band different from the first frequency band through the second antenna element (the second antenna element 426 in FIG. 4F).

According to various embodiments, the electronic device may further include a switching device (e.g. the switching device 1015 in FIG. 10B) configured to selectively switch the plurality of electrical paths.

According to various embodiments, the electronic device may further include at least one conductive pattern (e.g. the conductive patterns 1121 and 1122 in FIG. 11A) configured on a periphery of the first antenna element (e.g. the antenna elements 1232 and 1234 in FIG. 11A) and electrically connected to the wireless communication circuit (e.g. the wireless communication circuit 1170 in FIG. 11A) at least two points.

According to various embodiments, the at least one conductive pattern (e.g. the conductive patterns 1121 and 1122 in FIG. 11A) may include a dipole antenna or a folded dipole antenna.

According to various embodiments, the at least one conductive pattern (e.g. the conductive patterns 1121 and 1122 in FIG. 11A) may include a first conductive pattern and a second conductive pattern electrically connected to the wireless communication circuit.

According to various embodiments, the electronic device may further include a substrate (e.g. the substrate 1131 in FIG. 11A) including a first surface (e.g. the first surface 1103 in FIG. 11A) oriented toward the first plate (e.g. the first plate 202 in FIG. 2A) and a second surface (e.g. the second surface 1104 in FIG. 11A) oriented toward the second plate (e.g. the second plate 211 in FIG. 2B), and the first antenna element (e.g. the antenna element 1132 in FIG. 11A) may be disposed on the second surface.

According to various embodiments, the first antenna element (e.g. the antenna element 1132 in FIG. 11A) may include a metal pattern formed on the substrate, a metal plate attached to the substrate, a flexible printed circuit board (FPCB), or a conductive paint applied to the substrate.

The embodiments described and shown in the specification and the drawings have presented specific examples in order to easily explain the technical contents of embodiments and help understanding of embodiments, and are not intended to limit the scope of embodiments. Therefore, the scope of various embodiments should be construed to include, in addition to the embodiments disclosed herein, all changes and modifications that are derived on the basis of the technical idea of various embodiments.

The invention claimed is:
1. An electronic device comprising:
a housing including a first plate, a second plate oriented in a direction opposite to the first plate, and a side member surrounding a space between the first plate and the second plate;
an antenna structure including at least one plane parallel to the first plate and including a first antenna element disposed on the plane; and
a wireless communication circuit electrically configured to transmit and receive a signal having a frequency range of 10 GHz-100 GHz,
wherein the wireless communication circuit includes a plurality of electrical paths electrically connected to a plurality of points spaced apart from each other on the first antenna element, respectively,
wherein the wireless communication circuit provides at least one phase difference between at least two signals from the plurality of points, wherein at least two of the plurality of points are symmetric with each other with respect to a center of the first antenna element, wherein the first antenna element is symmetric with respect to a line crossing a center of the first antenna element, and wherein the plurality of points comprise a first point disposed at one side of the first antenna element with respect to the line, and a second point disposed to be symmetric with the first point at another side with respect to the line.

2. The electronic device of claim 1, wherein each of the plurality of electrical paths comprises a phase shifter.

3. The electronic device of claim 1, wherein the first antenna element comprises a third point disposed at 90-degree from the first point with respect to the center, and a fourth point disposed to be symmetric with the third point on the first antenna element, and wherein the third point and the fourth point are electrically connected to the wireless communication circuit.

4. The electronic device of claim 1, further comprising:

a substrate in which a plurality of insulation layers are laminated, wherein the first antenna element is disposed on a first plane among the insulation layers of the substrate.

5. The electronic device of claim 4, wherein the wireless communication circuit is electrically connected to the first antenna element by using the electrical paths arranged to extend through the insulation layers of the substrate.

6. The electronic device of claim 4, wherein the electrical paths are electrically connected to at least two conductive pads correspondingly arranged on a second plane different from the first plane among the insulation layers of the substrate, and wherein the at least two conductive pads are located such that the pads can be capacitively coupled to the first antenna element.

7. The electronic device of claim 4, further comprising:

a second antenna element disposed on a third plane among the insulation layers, spaced apart from the first antenna element, wherein at least two second conductive pads are arranged between the first antenna element and the second antenna element, and wherein the second antenna element is located such that second antenna element can be capacitively coupled to the at least two second conductive pads.

8. The electronic device of claim 7, wherein the wireless communication circuit transmits or receives a signal having a first frequency band through the first antenna element, and transmits or receives a signal having a second frequency band different from a signal having the first frequency band through the second antenna element.

9. The electronic device of claim 1, further comprising:

a switching device configured to selectively switch the plurality of electrical paths.

10. The electronic device of claim 1, further comprising:

at least one conductive pattern configured on a periphery of the first antenna element and electrically connected to at least two points of the wireless communication circuit.

11. The electronic device of claim 10, wherein the at least one conductive pattern comprises a dipole antenna or a folded dipole antenna.

12. The electronic device of claim 11, wherein the at least one conductive pattern comprises a first conductive pattern and a second conductive pattern electrically connected to the wireless communication circuit.

13. The electronic device of claim 1, further comprising:

a substrate including a first surface oriented toward the first plate and a second surface oriented toward the second plate, wherein the first antenna element is disposed on the second surface.

14. The electronic device of claim 1, wherein the first antenna element comprises a metal pattern formed on a substrate, a metal plate attached to the substrate, a flexible printed circuit board (FPCB), or a conductive paint applied to the substrate.

* * * * *